(12) United States Patent
Mowris et al.

(10) Patent No.: US 9,671,125 B2
(45) Date of Patent: Jun. 6, 2017

(54) FAN CONTROLLER

(71) Applicants: Robert J. Mowris, Olympic Valley, CA (US); John Walsh, Bozeman, MT (US)

(72) Inventors: Robert J. Mowris, Olympic Valley, CA (US); John Walsh, Bozeman, MT (US)

(*) Notice: Subject to any disclaimer, the term of this patent is extended or adjusted under 35 U.S.C. 154(b) by 0 days.

(21) Appl. No.: 15/358,131

(22) Filed: Nov. 22, 2016

(65) Prior Publication Data
US 2017/0115025 A1 Apr. 27, 2017

Related U.S. Application Data

(63) Continuation-in-part of application No. 15/251,978, filed on Aug. 30, 2016, now Pat. No. 9,500,386, which is a continuation-in-part of application No. 15/144,806, filed on May 2, 2016, which is a continuation-in-part of application No. 14/168,503, filed on Jan. 30, 2014, now Pat. No. 9,328,933, which is a continuation-in-part of application No. 13/427,542, filed on Mar. 22, 2012, which is a continuation-in-part of application No. 13/085,119, filed on Apr. 12, 2011, now Pat. No. 8,763,920.

(60) Provisional application No. 61/324,229, filed on Apr. 14, 2010.

(51) Int. Cl.
  F24F 11/053 (2006.01)
  F24H 9/20 (2006.01)
  F24F 11/00 (2006.01)

(52) U.S. Cl.
  CPC .......... *F24F 11/053* (2013.01); *F24H 9/2064* (2013.01); *F24F 2011/0002* (2013.01)

(58) Field of Classification Search
  CPC ...... F24F 11/04; F24F 11/053; F24F 11/0076; F24F 2011/0075
  See application file for complete search history.

(56) References Cited

U.S. PATENT DOCUMENTS

2,394,920 A   12/1942   Kronmiller
3,192,162 A   6/1965    Bauer et al.
3,454,073 A   7/1969    Man
(Continued)

FOREIGN PATENT DOCUMENTS

WO   PCT/US1996/009118   6/1996

OTHER PUBLICATIONS

California Energy Commission (CEC) Published Report No. CEC-500-2008-056.
ICM Controls Instructions.

*Primary Examiner* — Marc Norman
(74) *Attorney, Agent, or Firm* — Kenneth L. Green; Averill & Green

(57) ABSTRACT

Method for controlling an HVAC ventilation fan in heating or cooling mode and varying the fan-off time delay as a function of heat source or cool source operational time. Method for increasing heater ventilation fan speed from the low speed used for heating to the high speed used for cooling. Method for maintaining the heat pump reversing valve signal at the same position throughout the cool or heat source operational and extended variable fan-off time delay. Method for closing economizer dampers at the end of the cool or heat source operational time while continuing to operate the ventilation fan for an extended variable fan-off time delay.

30 Claims, 33 Drawing Sheets

(56) References Cited

U.S. PATENT DOCUMENTS

| | | | |
|---|---|---|---|
| 4,075,864 A | | 2/1978 | Schrader |
| 4,136,730 A | | 1/1979 | Kinsey |
| 4,493,194 A | | 1/1985 | Briccetti |
| 4,684,060 A | | 8/1987 | Adams et al. |
| 4,842,044 A | | 6/1989 | Flanders et al. |
| 5,050,488 A | * | 9/1991 | Beasley ................ F24F 1/0007 454/321 |
| 5,142,880 A | | 9/1992 | Bellis |
| 5,882,233 A | | 3/1999 | Idehara |
| 6,282,910 B1 | | 9/2001 | Helt |
| 6,684,944 B1 | | 2/2004 | Byrnes et al. |
| 6,940,051 B2 | | 9/2005 | Tateishi |
| 7,140,551 B2 | | 11/2006 | Pauw |
| 7,191,826 B2 | | 3/2007 | Byrnes |
| 7,240,851 B2 | | 7/2007 | Walsh, Jr. |
| 8,362,725 B2 | | 1/2013 | Becerra et al. |
| 2003/0223172 A1 | | 12/2003 | Priest |
| 2005/0150651 A1 | * | 7/2005 | Halsey ................ F24F 11/0076 165/267 |
| 2010/0187318 A1 | | 7/2010 | Yu |
| 2011/0234368 A1 | | 9/2011 | Huang |
| 2012/0104108 A1 | | 5/2012 | Westberg et al. |
| 2012/0248211 A1 | | 10/2012 | Warren et al. |
| 2015/0060038 A1 | | 3/2015 | Lau |
| 2015/0060557 A1 | | 3/2015 | Lau |
| 2015/0159905 A1 | | 6/2015 | Lau |
| 2016/0223219 A1 | | 8/2016 | Lau |
| 2016/0245544 A1 | | 8/2016 | Walsh |

\* cited by examiner

FAN CONTROLLER

CROSS-REFERENCE TO RELATED APPLICATIONS

The present application claims the priority of U.S. Provisional Patent Application Ser. No. 61/324,229 filed Apr. 14, 2010, and is a Continuation In Part of U.S. patent application Ser. No. 13/085,119 filed Apr. 12, 2011, and is a Continuation In Part of U.S. patent application Ser. No. 13/427,542 filed Mar. 22, 2012, and is a Continuation In Part of U.S. patent application Ser. No. 14/168,503 filed Jan. 30, 2014, and is a Continuation In Part of U.S. patent application Ser. No. 15/144,806 filed May 2, 2016, and is a Continuation In Part of U.S. patent application Ser. No. 15/251,978 filed Aug. 10, 2016 which applications are incorporated in their entirety herein by reference.

BACKGROUND OF THE INVENTION

The present invention relates to a Heating, Ventilation, Air Conditioning (HVAC) fan controller device and in particular to a circuit obtaining signals from thermostat or equipment control terminals and providing signals to control the ventilation fan and/or equipment.

Residential and commercial HVAC system power consumption in the United States accounts for 30% of average summer peak-day electricity loads, 14% of total electricity use, and 44% of total natural gas use, as reported by the US Energy Information Agency Residential and Commercial Energy Consumption Surveys from 2003 and 2009.

Known HVAC systems circulate cool or warm air to a conditioned space where the temperature is controlled by a thermostat to maintain thermal comfort conditions at a set point temperature typically within plus or minus 1 degree Fahrenheit (° F.). Fan controls for direct-expansion cooling systems typically turn ON the fan when the cooling apparatus is energized and turn OFF the fan when the cooling apparatus is de-energized. Similarly, fan controls for electric, hydronic, and Heat Pump (HP) heating systems turn ON the fan when the heating apparatus is energized and turn OFF the fan when the heating apparatus is de-energized. Fan controls for gas furnaces typically provide a temperature or fixed fan-on time delay after the furnace has been turned ON to allow time for the heat exchanger to heat up after the burner has been ignited. Fan controls for gas furnaces also provide a temperature or fixed fan-off time delay after the furnace has been turned OFF to recover some of the heating energy stored in the heat exchanger. The temperature-based fan delays either use bimetal switches or temperature sensors to turn on the fan when air leaving the heat exchanger is hot or turn off the fan when air leaving the heat changer is cool.

U.S. Pat. No. 6,684,944 (Brynes et al, 2004) and U.S. Pat. No. 6,695,046 (Brynes et al, 2004) disclose a variable speed fan motor control for forced air heating/cooling systems using an induction-type fan motor controlled by a controller circuit which is operable to continuously vary the speed of the fan motor during a start-up phase and a shut-down phase of the heating and/or cooling cycle. The controller circuit includes temperature sensors which are operable to control start-up and shutdown of the fan motor over continuously variable speed operating cycles in response to sensed temperature of the air being circulated by the fan. Brynes discloses control of the heater fan motor speeds to low, medium, or medium-high used for heating.

U.S. Pat. No. 4,369,916 (Abbey 1983) discloses a 120 VAC heating or cooling system fan override relay control to immediately start the blower to circulate air when the heating or cooling element turns on and continue to operate the override for a fixed timed interval by a time delay relay after the heating or cooling element turns OFF. U.S. Pat. No. 4,369,916 teaches starting the blower fan instantly when the heating element is turned on and not waiting for the heat exchanger to reach operational temperatures before turning on the ventilation fan at a low speed used for heating.

U.S. Pat. No. 6,464,000 (Kloster 2002) discloses is a temperature controlled device for a two-stage furnace: 1) low fan speed for low heat mode, and 2) higher fan speed for high heat mode. Kloster '000 teaches a two-speed fan for two-stage heating system. The higher fan speed is limited to available heater fan speeds and the high speed is only used for high heat mode.

U.S. Pat. No. 4,684,060 (Adams 1987) discloses a furnace fan control using a separate fan relay not integral to the furnace assembly and a timing circuit receiving a "burner on signal" produced when a thermostat, or some other circuit, senses burner operation and closes (which is delayed until 20 to 35 seconds after heat source activation). The '060 patent "burner on signal" is thus energized 20 to 35 seconds after the thermostat W terminal provides a signal to turn on the furnace. The delay in time is based on 15-seconds for an inducer blower to circulate air and purge the combustion chamber of gas, 5 to 10 seconds for the inducer blower to close a pressure switch and energize the hot-surface igniter and open the gas valve to ignite the burner, 5 to 10 seconds for the furnace to prove the burner has ignited. The '060 patent discloses a fixed fan-off time delay of 2 minutes based on 0 to 2 minutes of burner operation, a fan-off time delay of 2 to 4 minutes based on 2 to 4 minutes of burner operation, and a fixed fan-off time delay of 4 minutes for all burner operational times greater than 4 minutes. The fan-off time delay of the '060 patent is based on the principle that all of the available stored heat in the system is present when the heat exchanger reaches operational temperature (the '060 patent assumes this requires 4 minutes of operation), and no additional stored heat accumulated after the heat exchanger reaches operational temperature. For furnace operation less than 4 minutes, Adams '060 wastes energy and causes thermal comfort issues by circulating unwarmed air into the conditioned space before the heat exchanger is hot enough to provide satisfactory operating temperatures. Gas furnaces generally require at least 4 minutes of time for the heat exchanger to warm up and reach an operational temperature unless there is a fault causing short-cycling such as a blocked air filter or cracked heat exchanger. Therefore, the '060 patent '060 effectively only provides a fixed-fan-off time delay of 4 minutes since all furnaces require at least 4 minutes of time to reach operating temperature and store enough heat to support an extended fan-off time delay.

U.S. Pat. No. 5,248,083 (Adams 1993) discloses an adaptive furnace controller using analog temperature sensing to maintain a constant preselected heat exchanger temperature (i.e., 120 Fahrenheit) during operation and operates the fan time delay until a fixed lower heat exchanger temperature (i.e., 90 Fahrenheit) is reached. The adaptive furnace control regulates a controllable valve to adjust burner firing rate, thereby holding heat exchanger operating temperature constant to create constant ON/OFF times based on the previous cycle ON/OFF times of the furnace by regulating circulation blower speed. By increasing blower speeds to shorten "on" times or decreasing blower speeds to increase "on" times, and thereby achieving optimum cycle times.

U.S. Pat. No. 8,141,373 (Peterson et al. 2012) discloses a method of controlling a circulation fan based on a number of different factors such as indoor/outdoor environmental conditions, HVAC schedule period, time of year, or a pseudo random operation. The purpose of Peterson's disclosure is to move air through a controlled space when the HVAC system is not calling for heating or cooling to increase the comfort level of the occupants, or in some cases to increase the indoor air quality by bringing in a fraction of outdoor air.

ICM Controls, Inc. (www.icmcontrols.com) has manufactured an on-delay control and an off-delay control for HVAC circulating fans for more than 25 years. The ICM fan delay control has a single input and a single output and is connected between the fan "G" terminal of a thermostat and an HVAC fan relay used to energize the HVAC fan, and provides manually-selected fixed-time delays extending HVAC fan operation.

The California Energy Commission (CEC) published report number CEC-500-2008-056 in 2008 titled "Energy Performance of Hot Dry Air Conditioning Systems" (CEC '056). Table 23 on page 65 of the CEC '056 report provides laboratory test measurements of sensible Energy Efficiency Ratio (EER) and savings from a fixed 5-minute fan-off time delay and an end of compressor cycle (i.e., zero) time delay for compressor cycle operation of 5, 10, and 15 minutes. The report describes a fixed fan-off time delay of five minutes provided decreasing sensible EER values of 8.5, 8, and 7.75 for compressor operational times of 5, 10, and 15 minutes. FIG. 48 on page 66 of the CEC '056 report provides test results of packaged unit latent recovery showing sensible EER versus time for tests with a fixed 10-minute fan-off time delay for compressor operation of 30, 5, and 10 minutes and a 20-minute fan-off time delay for compressor operation of 15 minutes. On page 66 regarding the third test at the 55-minute mark, the report states: "It is evident that the longer compressor on cycle requires a longer 'tail' to approach the efficiency achieved by the five minute compressor on cycle within a 10 minute 'tail.'" Graphically extrapolating the "tail" of the third test based on its slope to achieve a 9.6 sensible EER requires a 30-minute fan-off time delay. This might be theoretically possible under adiabatic laboratory conditions, but impossible to achieve under field conditions in actual buildings due to hot attics, duct losses, infiltration, solar radiation, and outdoor heat conduction through the building shell. The sensible EER is the ratio of total sensible cooling capacity measured in British thermal units (Btu) divided by total AC electric power measured in Watt-hours (Wh). While the CEC '056 report provides information which may hypothetically improve sensible cooling efficiency under adiabatic laboratory conditions, a need remains to optimize sensible cooling performance in actual buildings.

U.S. Pat. No. 5,142,880 (Bellis, 1992) discloses a solid state control circuit for use in connection with existing low-voltage thermostat terminals of a split-system or packaged HVAC system having a refrigerant system compressor and condenser with outdoor fan and an evaporator and gas-fired furnace or electrical heating elements with indoor blower fan. The '880 patent relates generally to systems for increasing the efficiency of Air Conditioning (AC) units by continuing the blower run time for a fixed time period after the compressor is turned OFF. Specifically, the '880 patent discloses an AC control unit comprising a low voltage room thermostat fan terminal, a low voltage compressor relay terminal, a timing circuit means, a sensitive gate triac, and a power triac. The '880 patent also discloses a method for controlling the on-off time of an indoor fan that is controlled by and associated with an indoor thermostat for a room AC system. The apparatus of the '880 patent is not programmable or adaptable. The delay is related to the supply voltage, which varies from system to system. Bellis provides constant current to the triac gates on the order of 6 milliamps. The total current draw is even higher than that when all components are included. Many systems have do not accommodate this much current draw through control relays without causing a humming noise which irritates the user. The Bellis design momentarily de-energizes the relay when switch from thermostat driven fan to his delay, which may cause relay chatter and excessive wear. Bellis does not provide for an override function if the unit fails.

U.S. Pat. No. 5,582,233 (Noto 1996) discloses a device used to extend the fan run time using a family of fixed time delays, and also periodically activates the fan during times the system is not calling for heating or cooling. The '233 patent requires the device to have access to the 24 VAC signals from the AC transformer. This requirement precludes the device from operating using connections limited to the thermostat since most thermostats do not have both the hot and neutral legs of the transformer. Household wiring only provides the hot (red) signal to the transformer.

U.S. Pat. No. 4,842,044 (Flanders et al., 1989) provides a heating and cooling control system that works by energizing a fan or other fluid circulating device to circulate fluid and effect thermal transfer of energy from the fluid to the spaces being heated and by de-energizing the circulating means at a selected time interval after de-energization of the heating and control system. The '044 patent also claims a heating control system comprising a switching means to effect energization of the fluid circulating means, a switching control means that is energizable in response to operation of the control circuit, and an additional circuit means that energizes the switching control means a selected time interval after de-energization of the heating system. The '044 patent is intended to increase the time the fan is turned on after a heating cycle to improve energy efficiency. The device draws power continuously from the gas solenoid through a 680 ohm resistor, and this method has proven to be problematic in practice. Too much current drawn in this way, can cause a humming noise in the gas valve and false operation. The '044 patent also enables the fan relay to activate the blower as soon as the gas valve is activated. This results in cool air being circulated throughout the home since the plenum is not sufficiently warm. Normal heat operation retards the blower until the temperature in the plenum reaches a preset operating temperature. The '044 patent also requires the addition of a relay circuit. This relay must be active the entire time the fan is to be OFF, creating a significant current draw even when the system is in not calling for heating or cooling. The '044 patent also describes fixed delays. It has no way to adapt the fan delay times either by user input or by the compressor run time. The delays provided by the '044 patent are also subject to the variations of the components selected. Additionally, although Flanders touches on the subject of how his invention works when the fan switch on the thermostat is moved from the AUTO position to the ON position, as described, there is no way for the fan to come on when the occupant requests.

U.S. Pat. No. 4,136,730 (Kinsey 1979) teaches of a device that intervenes with the controls coming from a thermostat and going to the heating/cooling system. The '703 patent discloses a fixed upper limit to the time that the compressor or heating source can be activated and then his invention adds additional time to the blower fan. This activity can increase the efficiency of an air conditioner system by allowing a certain amount of water to condense on the evaporator coil and then re-evaporating this water to cool the home. The amount of water collected varies based on the humidity of the ambient air. Having a fixed compressor run time with a fixed blower time can create a less efficient system than the current invention. In many environments, limiting the compressor run time and counting on evaporative cooling to reduce the home's temperature increases the time required to cool the home. In many cases, the desired set point may never be achieved.

U.S. Pat. No. 7,240,851 (Walsh 2007) discloses about a furnace fan timer. The device disclosed in the '851 patent is strictly a timer with a user programmable interval and duration. The device runs continuously in a never ending loop counting down minutes before operating the fan and then counting the minutes to keep the fan activated. The device disclosed in '851 patent is not compatible with air conditioner systems. Most thermostats connect the fan switch to the air conditioner compressor switch when operating in the automatic fan mode. In systems with air conditioners, the device disclosed in '851 patent activates the air conditioner compressor when it turns on the fan. This requires users to turn OFF the circuit breakers for their air conditioner systems when using his device. The device disclosed in '851 patent has two interchangeable wire connections.

U.S. Pat. No. 2,394,920, (Kronmiller 1946), discloses an HVAC thermostat device to control room temperatures using a pair of thermally responsive bimetallic strips mounted within a circular-shaped housing to control space cooling or heating equipment using low voltage signals.

U.S. Pat. No. 7,140,551, (de Pauw 2006) discloses a similar HVAC thermostat device with a simplified user interface and circular-shaped housing to control space cooling or heating equipment using low voltage signals.

European Patent EP0830649 B1 and U.S. PCT/US1996/009118 (Shah 2002) disclose an adaptive method for a setback thermostat using the intersection of the space temperature with a sloped recovery temperature line which approximates the change in temperature as a function of time during recovery of the temperature controlled space from a setback temperature, to determine the time at which recovery to the occupancy temperature should begin. The '118 patent application computes and updates the slope of the temperature recovery line based on the time between actually achieving the desired next set point temperature and the next set point time associated with the next set point. If the space heating or cooling load changes, recovery starts at a time more compatible with the current heating or cooling load in order to complete recovery at or near the desired time.

U.S. Pat. No. 4,172,555 (Levine 1979) discloses a thermostat controller system for a building heating and/or cooling system including a stored program of desired temperatures which are to be attained within the building at predetermined times within a repetitive time cycle. The '555 patent discloses a method to determine the optimum time to turn on the heating and/or cooling system to meet the next programmed temperature by turning the system on and then off for a short period of time and the temperature change which results in the building as a result of the transient operation is measured. The time at which the furnace must be switched on to attain the next programmed temperature is then determined as a function of the rate of temperature change as determined by the transient switching and the difference between the instantaneous and the future programmed temperature.

Based on the prior art a need remains to practically optimize sensible cooling and heating performance in actual buildings.

BRIEF SUMMARY OF THE INVENTION

The present invention addresses problems not addressed by the prior art.

Known gas furnace heating systems are controlled by thermostats which energize a W terminal to turn on the gas furnace which turns on an induced-draft combustion fan to clear the combustion chamber, followed by energizing a hot-surface igniter and opening a gas valve to ignite and prove a burner, followed by a temperature-based or fixed fan-on delay, to allow a heat exchanger to warm up followed by energizing a furnace-fan relay to turn on the heating ventilation fan at a low speed used for heating. Maintaining a lower heater ventilation fan speed results in increased heat soak within the heating system and the portion of the heat generated by the heat-source not delivered to conditioned space is lost to the environment. For a gas furnace, the amount of heat soak increases as the heating system is operated for longer periods of time leaving significantly more unrecovered energy and higher temperatures (i.e., 260 to 350 degrees Fahrenheit) in the heat exchanger after the ventilation fan is turned OFF. Known gas furnace fan controllers recover some of this energy by providing a temperature delay or a fixed-time delay to extend fan operation after the furnace has been turned OFF. Known fan-off delays leave a significant amount of unrecovered heating energy in the heat exchanger that is wasted and lost to the environment after the heat-source and the ventilation fan are tuned OFF. This decreases the heating system efficiency and increases operational time and energy use.

Known direct-expansion cooling systems are controlled by thermostats which turn on a cooling ventilation fan to a high speed used for cooling when the air conditioning compressor cool-source is energized and turn OFF the fan when the cool-source is de-energized. When the cool-source is de-energized there is a significant amount of cold refrigerant left inside the evaporator and cold water condensed on the evaporator coil which is not used to deliver sensible cooling capacity to the conditioned space. For a direct-expansion air conditioning system, the amount of recoverable sensible cooling capacity from the evaporator increases from zero to an upper limit as the cooling system is operated for longer periods of time after the ventilation fan is turned OFF. This sensible cooling capacity is lost to the environment after the cool source and the cooling ventilation fan are tuned OFF. This decreases the cooling system efficiency and increases operational time and energy use.

If an air conditioning system has faults such as dirty air filters, blocked evaporator/condenser coils, low refrigerant charge, iced evaporator, faulty expansion device, restrictions, non-condensables, or low thermostat setpoint, then longer compressor operation can result in less sensible cooling capacity available for recovery, short off-cycle times, and a decreasing fan-off time delay compared to a non-faulted air conditioning system.

Known heat pump, electric resistance, and hydronic heating systems are controlled by thermostats which turn on the heater ventilation fan when the heat-source is energized and turn OFF the fan when the heat-source is de-energized. Hydronic heating and cooling systems circulate a liquid from a central location to a heat exchanger in a Forced Air Unit (FAU). Known heat pump, electric resistance, and hydronic heating systems do not provide a fan-on delay. Nor do heat pump, electric resistance, and hydronic heating systems provide a fan-off time delay due to lower heat exchanger temperatures of 130 to 180 degrees Fahrenheit which are 31 to 63% less than gas furnace heat exchanger temperatures. During the start-up period there is no useful heating delivered by the fan which can waste fan energy and cause thermal comfort issues for building occupants. When the heat-source is de-energized there is a significant amount of heating energy left in the heat exchanger coil which is not used to deliver heating capacity to the conditioned space, and this heating capacity is lost to the environment after the heat-source and the heating blower fan are tuned OFF. This decreases efficiency and increases the heat pump, electric resistance, or hydronic heating system operational time and energy use.

If a heat pump heating system has faults such as dirty air filters, blocked evaporator/condenser coils, low refrigerant charge, iced evaporator/condenser, faulty expansion device, restrictions, non-condensables, or high thermostat setpoint, then longer compressor operation can result in less sensible heating capacity available for recovery, short off-cycle times, and a decreasing fan-off time delay compared to a non-faulted heat pump system.

If a hydronic heating system has faults such as dirty air filters, low water temperature, blocked heating coil, faulty circulation pump, or high thermostat setpoint, then longer operation can result in less heating capacity available for recovery, short off-cycle times, and a decreasing fan-off time delay compared to a non-faulted hydronic heating system.

The prior art does not suggest or disclose apparatus or methods for gas furnace heating systems to monitor a thermostat W terminal to determine heat-source operational time or energize a fan relay normally controlled by the thermostat G terminal in cooling mode and turn on the ventilation fan to a high speed used for cooling after a short time period when the heat exchanger has reached its maximum temperature to deliver more heating output to satisfy the thermostat temperature sooner and save heat-source energy. The prior art also does not suggest or disclose an extended variable fan-off time delay that increases from zero to a maximum and/or decreases to a minimum or zero as a function of heat-source or cool-source operational time and HVAC system type such as gas furnace, hydronic, electric resistance and heat pump systems based on measurements of signals present on thermostat or equipment terminals. The prior art also does not suggest or disclose how to use signals present on thermostat or equipment terminals to determine the HVAC system type such as gas furnace, hydronic, electric resistance and heat pump systems or heating or cooling mode of operation.

The prior art does not suggest or disclose apparatus or methods for monitoring and controlling an HVAC system economizer controller to optimize ventilation by providing an average outdoor airflow for the cooling or heating operational time period that is less than the outdoor airflow provided by the known economizer damper position, but greater than the minimum outdoor airflow required for the building occupancy. Nor does the prior art suggest or disclose apparatus or methods to minimize economizer damper position at the end of the cooling or heating cycle to reduce outdoor airflow and continue to operate the system fan/blower for an extended fan-off time delay as a function of cool-source or heat-source operational time to recover additional sensible cooling or heating capacity and deliver additional cooling or heating capacity to the conditioned space to improve energy efficiency, lengthen the off cycle time, and reduce energy use.

The present invention addresses the above and other needs by providing a fan controller comprising an AC-DC converter, a zero crossing detector, a signal conditioner, a microprocessor, a switching device, an optional user interface, and optional battery, and leads connected between HVAC thermostat terminals or an HVAC equipment terminal block and a system transformer, to provide efficient control of an HVAC fan. The fan controller microprocessor receives signals present on thermostat terminals or equipment terminals and determines forced air unit system type, mode of operation, and appropriate signal outputs to enable variable fan-on time delays, high speed fan operation during heating mode for applicable systems, and variable fan-off time delays to reduce energy use and improve energy efficiency of the HVAC system.

In accordance with one aspect of the invention the fan controller can determine the following forced air unit system type and modes of operation based on signal inputs to the microprocessor: 1) a direct-expansion air conditioning system in cooling mode, 2) a heat pump system in cooling mode, 3) a gas furnace system in heating mode, 4) a heat pump system in heating mode, 5) a hydronic coil system type in heating mode, and 6) an electric resistance heating system in heating mode.

In accordance with another aspect of the invention for direct-expansion air conditioning systems in cooling mode, the fan controller can energize a fan relay after a short fan-on time delay period P0 as a function of the previous HVAC system off-cycle time duration P11 to allow the refrigerant in the air conditioning evaporator to cool down before energizing the fan relay in order to avoid delivering undesirable warm air into the conditioned space to improve customer satisfaction and cooling efficiency compared to known fan control.

In accordance with one aspect of the invention for direct-expansion air conditioning systems in cooling mode, the fan controller can energize the fan relay for an extended variable fan-off time delay P2 after an air conditioning compressor has stopped operating where the variable fan-off time period P2 is a function of the air conditioning compressor cool-source operational time P4 as a function of signals present on thermostat or equipment terminals. The extended variable fan-off time delay period P2 increases sensible cooling from the evaporator coil to increase cooling capacity delivered to the conditioned space, improve overall efficiency, extend the off cycle time, and save energy. The variable fan-off time delay period P2 in cooling mode may also be determined as a function of Outdoor Air Temperature (OAT), Mixed-Air Temperature (MAT), Supply Air Temperature (SAT), Temperature Split (TS) across the evaporator, or the computed rate of change of any of these temperatures. The rate of change of any of these temperatures requires monitoring and storing at least two temperatures and coincident times and computing a rate of change of temperature with respect to time.

In accordance with another aspect of the invention for a gas furnace system in heating mode, the fan controller can increase the heater blower fan speed from the low speed used for heating to the high speed used for cooling after a short delay time period P1 after the heat exchanger has reached its approximate maximum temperature to improve heat transfer, deliver more heating capacity and increase warm air movement and circulation in the conditioned space to satisfy the thermostat set point in less time to reduce heating system operation, and therefore reduce energy use and improve heating efficiency compared to known fan control.

In accordance with one aspect of the invention for a gas furnace system in heating mode, the fan controller can continue the HVAC blower fan operation for an extended variable fan-off time delay period P2 after the gas furnace heat-source has stopped operating. The variable fan-off time delay period P2 is determined as a function of heat-source operational time P3 and HVAC system type and mode of operation based on signals present on a thermostat or equipment terminals. The extended variable fan-off time delay period P2 recovers additional heat from the heat exchanger to increase heating capacity delivered to the conditioned space, improve overall efficiency, extend the off cycle time, and saves energy. The variable fan-off time delay period P2 in heating mode may also be determined as a function of OAT, MAT, SAT, Temperature Rise (TR) across the heat exchanger, TT, Hydronic Hot Water Supply Temperature (HHWST), or the rate of change of any of these temperatures.

For HVAC units with economizers, the present invention may also monitor cool-source and heat-source operational time and partially or completely close the economizer dampers at the end of the cool-source or heat-source operational time and implement a fan-off time delay with the economizer dampers closed to recover additional sensible cooling or heating capacity and deliver additional cooling or heating capacity to the conditioned space to improve energy efficiency, lengthen the off cycle time, and reduce energy use.

The present invention can use Fault Detection Diagnostics (FDD) to determine whether or not the HVAC system fan/blower is operating continuously prior to the thermostat calling for cooling or heating. For HVAC systems with economizers, if the fan is operating continuously prior to the thermostat calling for heating or cooling, then the economizer will open the dampers to a minimum open position to provide unconditioned outdoor airflow into the HVAC system and building to meet indoor air quality requirements. This can cause the building conditioned space temperature to increase above the thermostat set point in cooling mode or cause the conditioned space temperature to decrease below the thermostat set point in heating mode. If the outdoor air temperature is 20 degrees Fahrenheit (F) above the cooling set point or 20 F below the heating set point and the fraction of outdoor airflow is 15 to 60% of the total system airflow, then the cool source or heat source can turn ON and OFF frequently causing a well-known fault referred to as "short cycling" characterizing an ON-OFF frequency of approximately 5 minutes. The present invention uses FDD methods to close the economizer dampers after a threshold fan-only operational time. With the dampers closed, less unconditioned outdoor air is drawn into the economizer dampers, HVAC system, and building conditioned space when the fan is operating by itself when the building, and this reduces the frequency and duration of cool-source and heat-source operational time especially when the building is unoccupied.

Laboratory tests indicate that closed economizer dampers provide approximately 16 to 28% outdoor airflow and partially opened economizer dampers provide approximately 25 to 33% outdoor airflow up to an upper limit of 55 to 73% outdoor airflow when dampers are fully opened. Laboratory tests indicate approximately 3 to 11% of economizer outdoor airflow is caused by unintended air leakage through the economizer perimeter gap where the economizer frame attaches to the HVAC cabinet. The economizer perimeter gap allows unintended, uncontrolled, and unconditioned outdoor airflow to enter the economizer, HVAC system, and conditioned space when the ventilation fan is operating. Sealing the economizer perimeter gap allows recovery of more evaporatively cooled air from the air conditioning evaporator coil during the variable fan-off time delay period in cooling mode. Sealing also allows recovery of more heating energy from the heat exchanger during the variable fan-off time delay period in heating mode. The present invention discloses methods to seal the economizer perimeter gap to reduce unintended outdoor air leakage and save energy. The economizer hood must be removed in order to properly seal the economizer perimeter gap. Materials used to seal the economizer perimeter gap may include at least one of: adhesive tape sealant, adhesive sealant, mastic sealant, or weatherstripping.

In accordance with another aspect of the invention for heat pump, electric resistance, or hydronic systems in heating mode, the fan controller can energize a fan relay after a short fan-on time delay period P0 as a function of the previous HVAC system off-cycle time duration P11 to allow the hydronic heating coil to heat up before energizing the fan relay in order to avoid delivering undesirable cool air to the conditioned space to improve customer satisfaction and heating efficiency compared to known fan control.

In accordance with another aspect of the invention for heat pump, electric resistance, or hydronic systems in heating mode, the fan controller can energize a fan relay after an extended variable fan-off time delay period P2 after the air conditioning compressor or the heat-source turn-off allows recovery of additional cooling from an evaporator to increase sensible cooling capacity, or heat from a heat exchanger delivered to the conditioned space, thereby improving efficiency, extending the off cycle time, and saving energy.

In accordance with another aspect of the invention, the fan controller provides an extended fan-off time delay P2 based on monitoring of a thermostat "G" terminal (provides a fan relay signal) or a thermostat "Y" terminal (provides an AC compressor signal) or a thermostat "W" terminal (provides a heat-source signal) or a heat pump reversing valve "O" or "BR" terminal (provides a heating or cooling reversing valve signal).

In accordance with another aspect of the invention, the fan controller increases the sensible cooling or heating capacity delivered to the conditioned space and improves the application energy efficiency ratio of an air conditioning system or the heating efficiency of a heating system. In known HVAC systems, the HVAC fan is turned OFF when the compressor or the heat-source are turned OFF or shortly after the compressor or the heat-source are turned OFF. The cooling evaporator is typically very cold when the compressor is turned OFF and the heating coil or heat exchanger are very hot when the heat-sources are turned OFF. Continuing to run the HVAC fan for a period of time P2 after the AC compressor or the heat-source are turned OFF, as a function of AC compressor cool-source operational time P4 or heat-source operational time P3 based on signals present on thermostat or equipment terminals provides additional cooling or heating to the conditioned space. The additional cooling takes advantage of cold water which has condensed on the evaporator coils. By running the HVAC fan after the compressor has stopped, the cold water is evaporated and the system functions as an evaporative cooler, especially in hot dry climates. Additional heating takes advantage of very hot heating coil or heat exchanger temperatures. Increasing the delivered sensible cooling or heating capacity extends the off cycle time duration P11, reduce cool-source operational time P4 or heat-source operational time P3, and increase energy efficiency. The sensible cooling or heating capacity are responsible for satisfying the thermostat set point, which determines air conditioner or furnace operational time and energy use. Laboratory studies have shown the fan controller improves gas furnace, heat pump, or hydronic heating efficiency by 4 to 21 percent above systems having known fixed-time delays and 8 to 30 percent above systems having no time delay. For heating systems with degraded conventional temperature delay sensors, the fan controller improves heating efficiency by 9 to 30 percent. Laboratory studies have shown the efficiency fan controller improves cooling efficiency 4 to 23 percent above systems having known fixed-time delays and 7 to 41 percent above systems having no time delay.

In accordance with still another aspect of the invention, there is provided a fan controller apparatus connected by as few as three electrical leads to terminals of common HVAC thermostats or equipment terminal blocks. The fan controller uses the information from the thermostat to determine an extended time delay for the fan as a function of the run time of the compressor or a fan switch or the heat-source based on signals present on thermostat or equipment terminals. In one embodiment, all delay calculations are done autonomously using an algorithm as a function of AC compressor/fan run time or heat-source run time based on signals present on thermostat or equipment terminals. The delays improve HVAC unit sensible cooling and heating capacity, and energy efficiency.

In accordance with another aspect of the invention, there is provided a fan controller easily connected to existing HVAC systems. Many new air conditioning systems incorporate a fixed fan-off delay directly into their new products. Older air conditioning systems do not include any fan-off time delay. The fan controller allows the delay to be applied to the new and the older HVAC systems.

In accordance with still another aspect of the invention, there is provided a fan controller including a microprocessor, an AC/DC converter, a zero crossing detector, and one or more switching devices. The fan controller may be an external fan controller connected directly to existing HVAC thermostat terminals or equipment terminal leads with minimal need for rewiring. The fan controller receives power present in the HVAC thermostat leads or the 24 VAC HVAC equipment transformer. The fan controller can operate with a minimum of three leads which can be connected directly to the wiring presently connected to known HVAC thermostats or equipment terminal blocks. The fan controller generally only requires electrical connection to an existing 24 VAC transformer, and control terminals of the thermostat.

In accordance with yet another aspect of the invention, there is provided a fan controller including at least one switching device. Many suitable switching devices may be used to provide the requisite function. When the switching device is an electro-mechanical switch, the fan controller further can include a battery to power the microprocessor when the switch is closed, or receive 24 VAC power from the AC transformer. In one embodiment, the switching device is a triac. The fan controller selectively gates the triac for milliseconds, and in doing so, has a total current draw on the order of 100 microamps allowing use of the fan controller without an additional power source added to the HVAC system. The triac draws very little power when the heating/cooling system is not active since there is no relay to be controlled.

In accordance with still another aspect of the invention, the fan controller uses a 60 Hz electrical signal as a time base providing precise timing which does not vary from system to system or due to aging or temperature of the components.

In accordance with another aspect, there is provided a fan controller which controls the fan relay through the entire cycle without interruption, preventing relay chatter and excessive wear.

In accordance with still another aspect, the fan controller restores all thermostat connections to their original states when turned OFF, providing continued HVAC system function if the fan controller fails.

In accordance with yet another aspect, the fan controller does not limit the amount of time the compressor operates and thus maintains system efficiency. The fan controller relies on the thermostat to determine when the desired set point has been reached, and only then does it extend the fan run time. This ensures occupant comfort and provides for the efficiency gains during and at the end of the cycle.

In accordance with yet another aspect, the fan controller works with HVAC systems including both heating and air conditioning. Known HVAC systems require a user interface to enter information. The fan controller may contain a user interface, but does not require one. The fan controller measures the amount of time the compressor was operating and determines an efficient fan operational time automatically. The fan controller interrupts the signal from the thermostat to the fan relay and overrides the fan control. The fan controller can monitor the supply fan, the heat-source, or the compressor operation, and turn OFF the supply fan during unoccupied time periods to reduce unoccupied supply fan operational energy.

In accordance with another aspect of the invention, there is provided a fan controller using fan speeds native to the HVAC system. The fan controller does not require temperature sensors to control the fan and does not modulate the 120/240 volt signals to control fan speed.

BRIEF DESCRIPTION OF THE SEVERAL VIEWS OF THE DRAWINGS

The above and other aspects, features and advantages of the fan controller will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the present invention. This description is not to be taken in a limiting sense, but is made merely for the purpose of describing one or more preferred embodiments of the invention. The scope of the invention should be determined with reference to the claims.

Figure 1A:
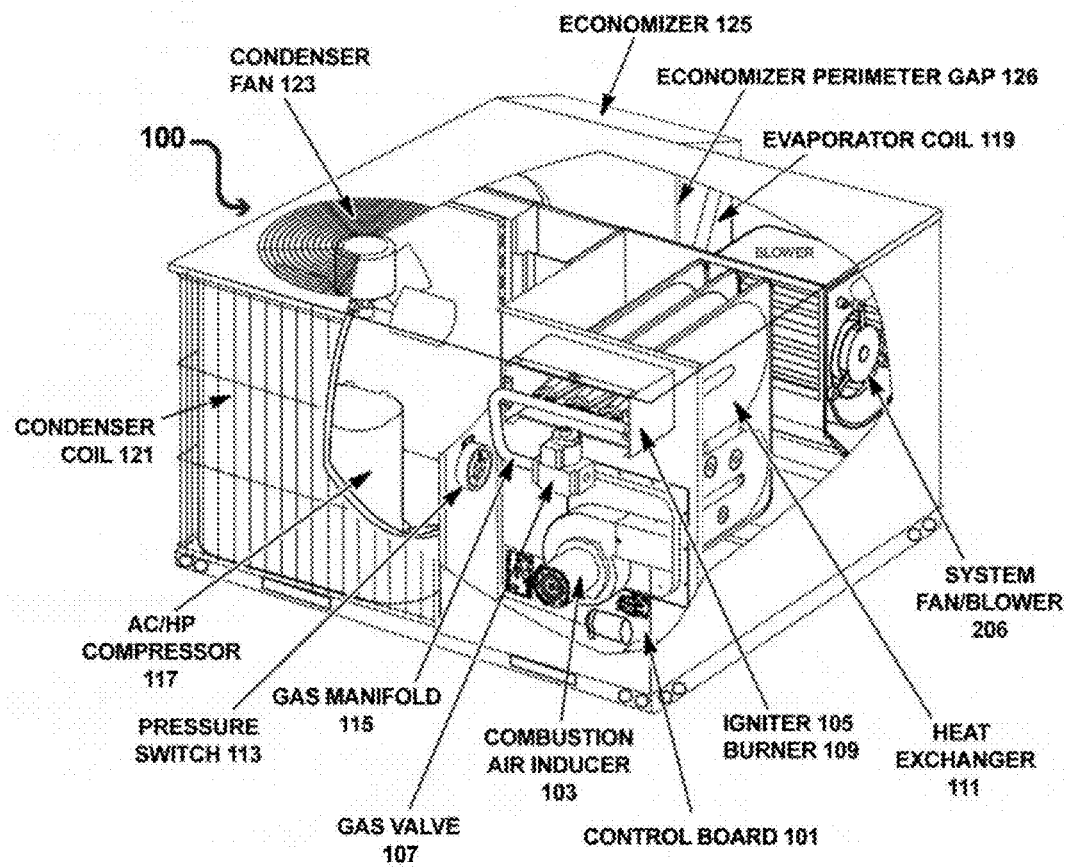
FIG. 1A shows a Heating, Ventilation, and Air Conditioning (HVAC) system according to the present invention.
Figures 1B, 1C:
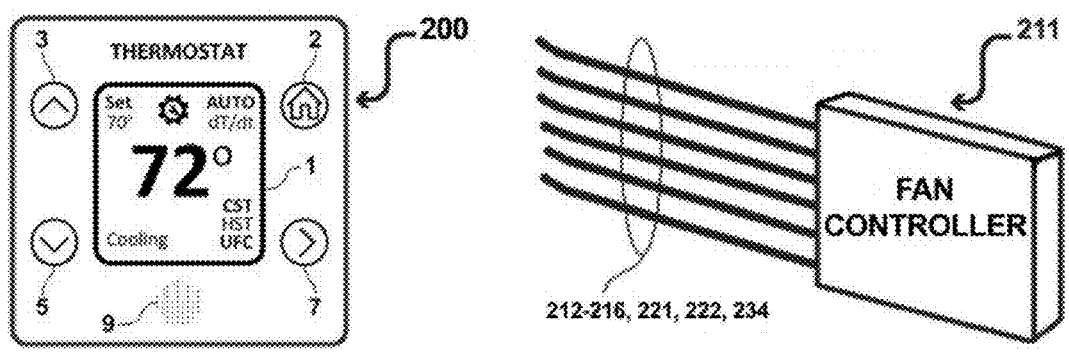
FIG. 1B shows a thermostat according to the present invention.
FIG. 1C shows a fan controller according to the present invention.

FIG. 1A shows a Heating Ventilating and Air Conditioning (HVAC) systems 100, FIG. 1B shows a thermostat 200 used to control the HVAC system, and FIG. 1C shows a fan controller 211 which may be connected to a control board 101 of the HVAC system 100, or to the thermostat 200, to enable methods for efficiently controlling the ventilation fan and economizer 125 on different types of HVAC systems 100 operating in heating and cooling modes, using existing signals present on terminals of an existing thermostat or equipment control terminals. Not shown on FIG. 1A is the economizer perimeter gap 126 of the economizer frame where it connects to the HVAC system cabinet and this gap allows unintended and uncontrolled outdoor airflow to enter the economizer, HVAC system, and conditioned space whether or not the ventilation fan is operating. The HVAC system 100 includes the control board 101 and depending on the HVAC system type other elements include: a combustion air inducer 103, an igniter 105, a gas valve 107, a burner 109, a heat exchanger 111, a pressure switch 113, a gas manifold 115, an AC/HP compressor 117, an evaporator coil 119, a condenser coil 121, a condenser fan (and motor) 123, an economizer 125, and a system fan/blower 206.

Figure 2:
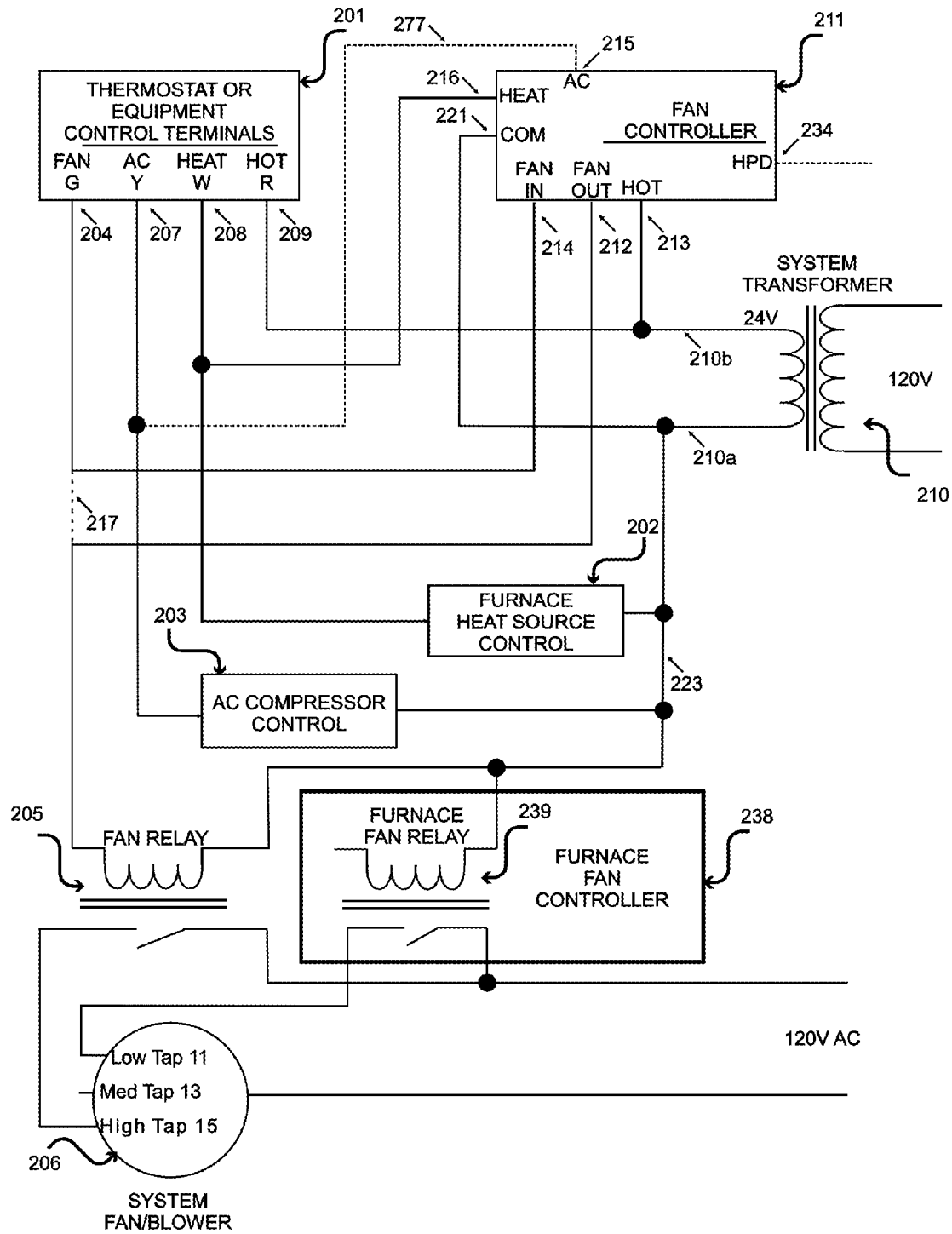
FIG. 2 shows a fan controller according to an embodiment of the present invention connected to a gas furnace HVAC system.

The fan controller 211 includes input signal wires 213 through 216 are configured to receive signals from thermostat or equipment control terminals 201 (FIG. 2). The fan controller input signal wire 234 is configured to receive a hot signal from a thermostat R terminal 209 or a hot signal from a system transformer hot leg 210b (FIG. 2).

The thermostat 200 shown in FIG. 1B includes at least one of: 1) an internal fan controller embodied in methods implemented in software and hardware integral to the thermostat 200; and 2) an external fan controller 211 installed in the wall behind the thermostat 200. The thermostat 200 includes a display 1, a home button 2, an up button 3, a down button 5, a screen button 7, and an occupancy sensor 9. The thermostat 200 display 1 shows other embodiments of the invention including a maintenance symbol (cog with a wrench inside) to indicate maintenance is required, a Cooling Satisfaction Time (CST) symbol indicating a method used to calculate a fan-off time delay P2 as a function of the measured cool-source operational time P7 based on CST, a Heat Satisfaction Time (HST) symbol indicating a method used to calculate a fan-off time delay P2 as a function of heat-source operational time P9 based on HST, and a rate of change of temperature with respect to time (dT/dt) that is compared to an off-cycle rate of change of temperature with respect to time dT/dt-off to calculate a fan-off time delay P2. The thermostat 200 display 1 also shows an Unoccupied Fan Controller (UFC) symbol indicating an occupancy sensor 9 and a UFC diagnostic method are active. The UFC indicates an embodiment wherein the thermostat 200 monitors the fan signal and in the absence of an occupancy signal, cool-source signal or heat-source signal, in this embodiment the thermostat 200 de-energizes the G terminal connected to fan relay 205 and turns off the system fan/blower 206 after a minimum fan-only time period to save energy when the fan has been accidentally left on by itself The fan controller 211 includes unique features to receive electric power and determine an HVAC system type and a heating or a cooling mode of operation. Based on the HVAC system type and mode of operation, the fan controller 211 monitors signals on the thermostat or equipment control terminals 201 to determine an extended fan-off time delay P2 as a function of heat-source operational time P3 or cool-source operational time P4.

The fan controller 211 determines HVAC system type and heating or cooling mode of operation, for direct-expansion air conditioning systems and gas furnace, heat pump, electric resistance, and hydronic heating systems. For gas furnace heating systems, the apparatus and methods include energizing the heater blower fan from the low speed used for heating to the high speed used for cooling after delay time period P1 to deliver more heating output to satisfy the thermostat sooner and save heat-source energy. For heat pump, electric resistance, and hydronic heating systems, the apparatus and methods include energizing the fan relay after a short fan-on time delay P0 as a function of the previous HVAC system 100 off-cycle time duration P11. For each specific HVAC system 100 type and cooling or heating mode of operation, the apparatus and methods uniquely vary the extended fan-off time delay P2 as a function of air conditioning compressor cool-source operational time P4 or heat-source operational time P3 based on signals present on thermostat or equipment terminals. For a gas furnace, the extended fan-off delay time P2 is increased when the heat-source operational time P3 increases based on signals present on thermostat or equipment terminals. For heat pump, hydronic, or electric, resistance heating systems the extended fan-off delay time P2 is decreased when the heat-source operational time P3 increases based on signals present on thermostat or equipment terminals due to lower outdoor air temperatures and increased heating loads which reduce the temperature increase delivered by heat pump, hydronic, or electric, resistance heating systems. Heat pump heating capacity and temperature rise are directly proportional to outdoor air temperature. Lower outdoor air temperatures cause longer heat pump operation and less heat available to support an extended fan-off time delay. Hydronic heating coils receive hot water from water heaters. Low outdoor air temperatures cause longer hydronic heater operation and the water heater cannot keep up with demand causing lower water heating supply temperatures which cause less heat available to support an extended fan-off time delay. Electric resistance heating elements are ineffective at storing heat and with longer operation due to cold weather less heat is available to support an extended fan-off time delay.

The fan controller 211 apparatus and methods may be incorporated within a thermostat 200 or incorporated into an HVAC system 100 such as a control board 101 or incorporated into an HVAC system 100 with an economizer to perform the fan controller 211 methods disclosed herein.

Figure 30:
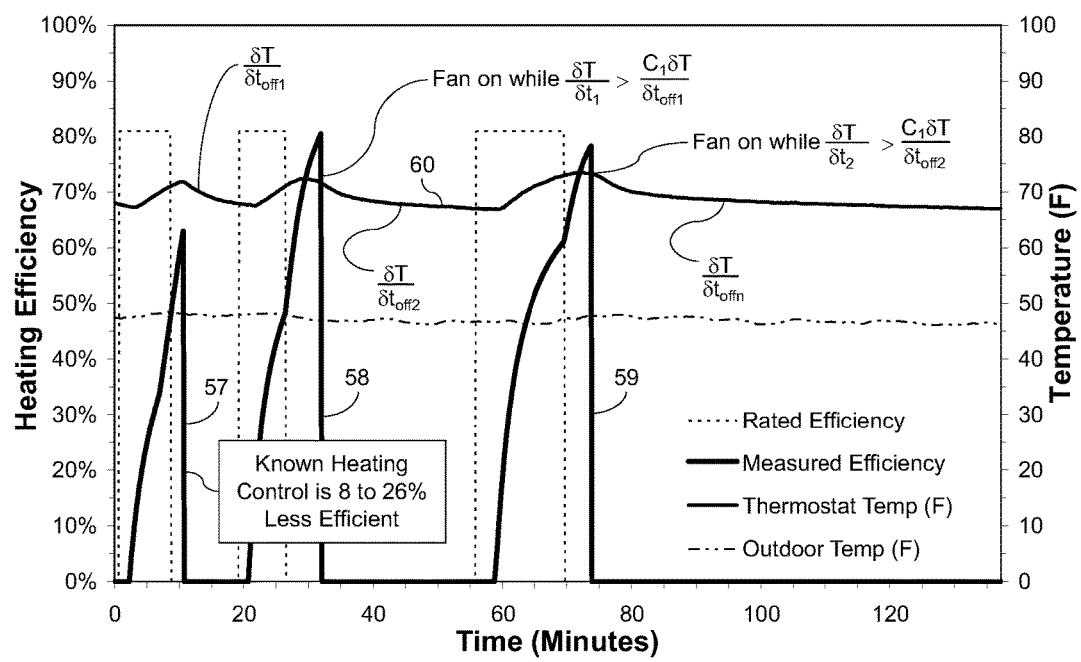
FIG. 30 shows a graph of heating efficiency, outdoor air temperature, indoor thermostat temperature, and rate of change of indoor thermostat temperature versus time of operation for a gas furnace heating system with various heat-source operational times P3 and variable fan-off operational time P2 for the fan control according to an embodiment of the present invention.
Figure 31:
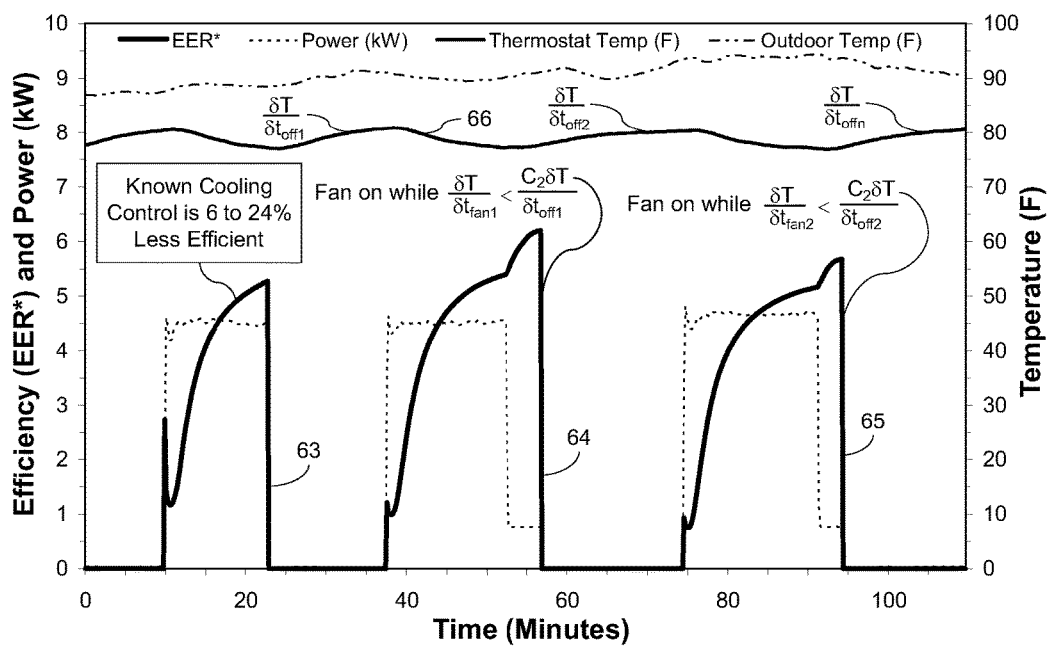
FIG. 31 shows a graph of cooling efficiency (Energy Efficiency Ratio, EER), cooling system power, outdoor air temperature, indoor thermostat temperature, and rate of change of indoor thermostat temperature versus time of operation for a direct-expansion air conditioning cooling system with various cool-source operational times P4 and variable fan-off operational time P2 for the fan control according to an embodiment of the present invention.

An embodiment of the thermostat 200 of the present invention may provide variable fan-off time delays as a function of current or previous cool-source or heat-source operational times and off-cycle times based on signals present on thermostat or equipment control terminals 201. A variable fan-off time delay may also be based on the thermostat temperature rate of change with respect to time (dT/dt) using a resistance temperature detector (RTD) or other type of temperature sensor (see FIG. 1B). Accurate measurements of the dT/dt during the off-cycle could be used as a proxy for the cooling or heating load during the off-cycle. For cooling shown in FIG. 31, the thermostat can extend the variable fan-off time delay while the current dT/dt is less than a previous cooling off-cycle dT/dt or an inflection point of zero plus or minus a confidence interval tolerance. For heating shown in FIG. 30, the thermostat can extend the variable fan-off time delay while the current dT/dt is greater than a previous heating off-cycle dT/dt or a current dT/dt inflection point of zero plus or minus a confidence interval tolerance. FIG. 30 shows the fan-off time delay P2 for heating continuing as long as the dT/dt is greater than an inflection point of zero for curves 58 and 59. FIG. 31 shows the fan-off time delay P2 in cooling continuing as long as the dT/dt is less than an inflection point of zero for curves 64 and 65. In both of these figures, the fan-off time delay P2 is terminated when the dT/dt reaches an inflection point of zero plus or minus a confidence interval tolerance.

An embodiment of the thermostat 200 of the present invention may provide a variable fan-off time delay as a function of the time required for the cooling or heating apparatus to satisfy the thermostat temperature (see FIG. 1B). The Heating Satisfaction Time (HST) is defined as the time required for the heating apparatus to increase the thermostat temperature from the setpoint minus the differential to the setpoint plus the differential. The Cooling Satisfaction Time (CST) is defined as the time required for the cooling apparatus to decrease the thermostat temperature from the setpoint plus the differential to the setpoint minus the differential. The Off Time (OT) is the time between heating or cooling cycles. The cooling fan-off time delay is a function of the CST and OT and the heating fan-off time delay is a function of the HST and OT. Long CST or HST combined with short OT indicate a faulted system where the fan-off time delay decrease with increasing CST and HST. Short CST or HST and long OT indicate a non-faulted system where the fan-off time increases with increasing CST or HST. For hydronic and heat pump heating systems, the fan-off time delay generally increases from zero to a maximum and then decreases to a minimum or zero as a function of HST and OT. For gas furnace heating systems, the fan-off time delay generally increases from zero to a maximum and then decreases slowly to a minimum as a function of HST and OT. For direct-expansion air conditioning systems, the fan-off time delay generally increases from zero to a maximum and then decrease to a minimum or zero as a function of CST and OT.

An embodiment of the thermostat 200 of the present invention may improve efficiency and reduce short-cycling losses by varying the cooling or heating operational time based on calculating the current thermostat satisfaction time equal to the difference between thermostat temperature and setpoint temperature plus default differential divided by dT/dt, and if thermostat satisfaction time is less than the optimal steady-state efficiency operational time for cooling or heating, then the thermostat continues to operate the cooling or heating until the optimal steady-state efficiency operational time has been reached. If the thermostat differential to end cooling or heating operation is increased, then the thermostat differential to begin cooling or heating operation is proportionately increased to maintain a consistent setpoint. If the cooling or heating operational time is considerably longer than an optimal steady-state cooling or heating operational time greater than an upper limit of continuous operation (i.e., greater than 1.5 hours) or short-cycling (i.e., less than or equal to 5 minutes operation), then the thermostat displays a maintenance symbol (cog with a wrench inside) to indicate maintenance is required for dirty air filter, dirty or blocked evaporator or condenser coil, low refrigerant charge, excess outdoor air, duct leakage, restriction, non-condensables, faulty contactor or capacitor, or other fault.

An embodiment of the thermostat 200 of the present invention may optimize cooling or heating energy efficiency and operational time by varying the thermostat temperature differential based on the current dT/dt times the difference between a minimally optimal efficiency operational time and the current operational time. If the thermostat differential to end cool- or heat-source operation is increased, then the thermostat differential to begin cool- or heat-source operation is proportionately increased to maintain a consistent setpoint. This embodiment provides the same cooling or heating setpoint as a known thermostat, but the temperature differential varies to optimize cool-source or heat-source energy efficiency.

An embodiment of the thermostat 200 of the present invention may provide a variable fan-off time delay based on the current dT/dt being less than a previous cooling off-cycle dT/dt. For heating, the thermostat can extend the variable fan-off time delay based on the current dT/dt being greater than a previous heating off-cycle dT/dt. The embodiment may also provide a decreasing fan-off time delay if the cool- or heat-source operational time is greater than a maximum and the off-cycle time is less than a minimum threshold to adjust the fan-off time delay to account for faults that might reduce cooling or heating capacity and efficiency resulting in less cooling or heating energy available for recovery during the fan-off time delay.

Figure 20:
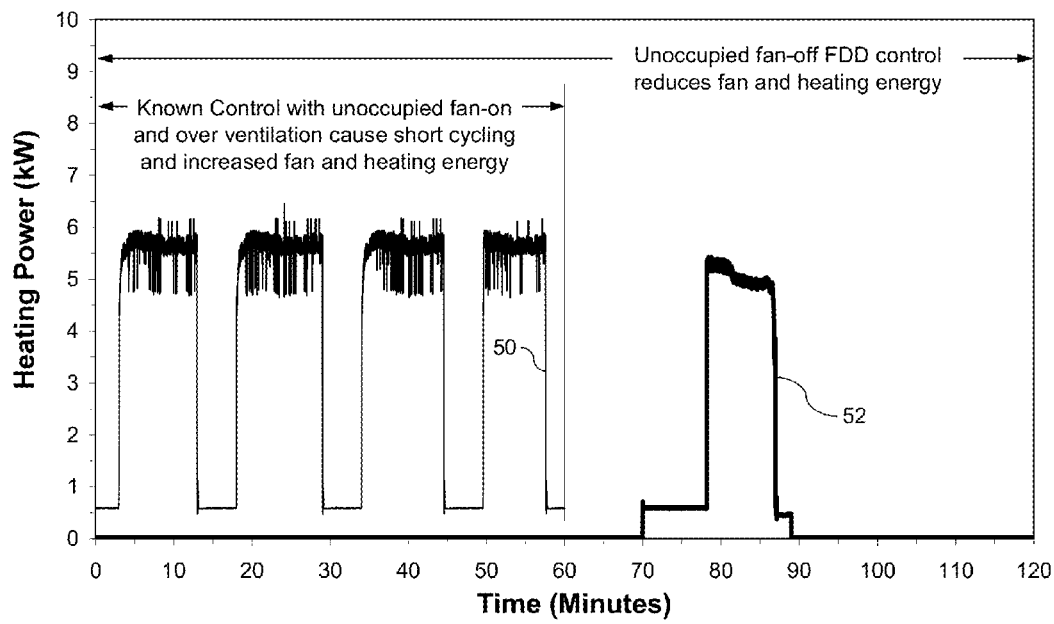
FIG. 20 shows a graph of total heating system power (kW) versus time of operation for a known fan control with constant fan operation during unoccupied periods of time causing over ventilation, constant fan power, short cycling of the heat source, and increased heating power consumption and a graph showing unoccupied fan-off control reduces fan and heating power consumption and short cycling according to an embodiment of the present invention.
Figure 21:
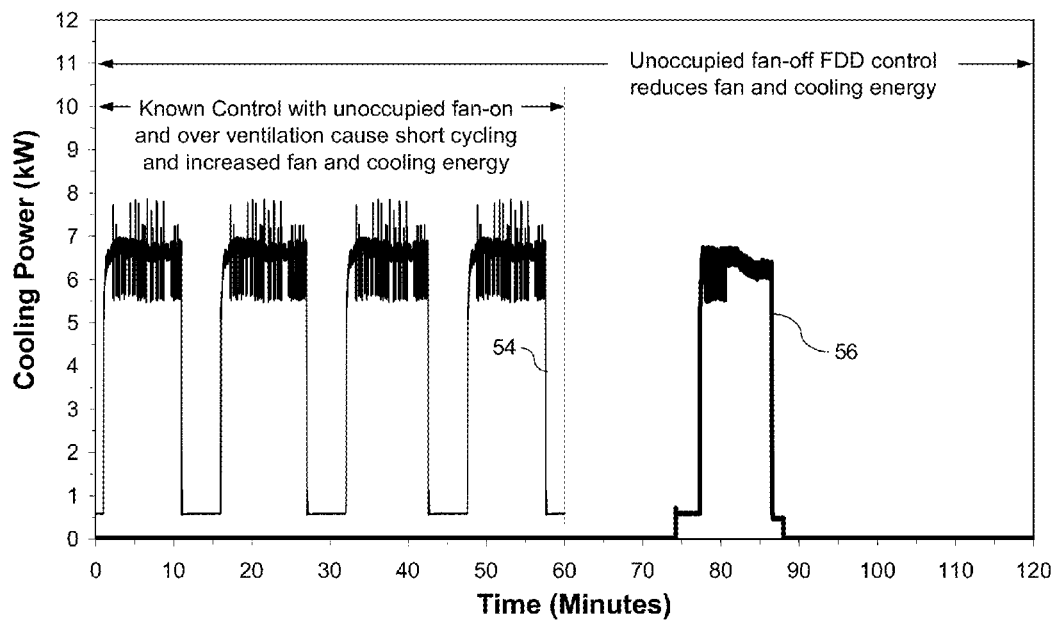
FIG. 21 shows a graph of total cooling system power (kW) versus time of operation for a known fan control with constant fan operation during unoccupied periods of time causing over ventilation, constant fan power, short cycling, and increased cooling power consumption and a graph showing unoccupied fan-off control reduces fan and cooling power consumption and short cycling according to an embodiment of the present invention.

An embodiment of the fan controller 211 monitors the fan signal and in the absence of a cool-source or heat-source signal, the fan controller 211 de-energizes the fan relay 205 and turns off the system fan/blower after a minimum fan-only time period to save energy when the fan has been accidentally left on by itself (see FIGS. 20 and 21).

An embodiment of the thermostat 200, monitors the fan signal and in the absence of an occupancy signal, cool-source signal or heat-source signal, the thermostat 200 de-energizes the G terminal connected to fan relay 205 and turns off the system fan/blower 206 after a minimum fan-only time period to save energy when the fan has been accidentally left on by itself An embodiment of the thermostat 200 of the present invention may maintain a heat pump reversing valve position continuously throughout both the compressor operational time and fan-off time delay for cooling and heating mode of operation to ensure maximum energy recovery from the heat pump indoor coil. Known thermostats do not maintain a heat pump reversing valve position continuously throughout the compressor operational time and fan-off time delay and which can cause a loss of cold refrigerant stored in the evaporator at the end of the compressor operational cycle and less cooling energy available to recover during the fan-off time delay period (see FIG. 22).

For HVAC systems 100 with economizers, an embodiment of the present invention may use wireless communication technology to receive a demand reduction signal from a system operator and implement a peak demand reduction method by partially or completely closing economizer dampers during a peak demand event to reduce cooling or heating loads to reduce energy consumption. The degree of closing may be determined based on the quantity of outdoor airflow delivered by the HVAC economizer dampers during normal operational time.

For HVAC systems 100 with economizers, an embodiment of the fan controller 211 may also monitor economizer operation to determine when it is advantageous to partially or completely close the economizer dampers during normal operation to deliver a required minimum amount of outdoor airflow to satisfy indoor air quality requirements and also deliver more sensible cooling or heating capacity to satisfy the thermostat sooner and reduce energy use.

For HVAC units with economizers, an embodiment of the fan controller 211 may also monitor cool-source and heat-source operational time and partially or completely close the economizer dampers at the end of the cool-source or heat-source operational time and implement a fan-off time delay with the economizer dampers closed to recover additional sensible cooling or heating capacity and deliver additional cooling or heating capacity to the conditioned space to improve energy efficiency, lengthen the off cycle time, and reduce energy use.

FIGS. 2-6 show the fan controller 211 connected to various HVAC systems 100 including gas furnace HVAC system with direct-expansion air conditioning, hydronic HVAC system with direct-expansion air conditioning, electric resistance HVAC system with direct-expansion air conditioning, or heat pump HVAC system with direct-expansion air conditioning. The fan controller 211 receives low-voltage signals from the thermostat or equipment terminals 201 and determines the system type, mode of operation, and appropriate low-voltage fan output signal 212 to control the fan relay 205 and the system fan/blower 206. The fan controller 211 enables variable fan-on time delays, high speed fan operation during heating mode for applicable systems, and variable fan-off time delays in cooling and heating mode to reduce energy use and improve energy efficiency of HVAC systems 100. The fan controller 211 receives the low-voltage fan signal on a thermostat "G" terminal 204 to the fan signal input 214. The fan controller 211 receives the Air-Conditioning (AC) or Heat Pump (HP) compressor cool-source signal on a thermostat "Y" terminal 207 to the fan controller AC signal input 215. The fan controller 211 receives the heat-source signal on a thermostat "W" terminal 208 or the HP reversing valve signal on a thermostat "O" terminal 235 or "BR" terminal 236 to the fan controller heat signal input 216. The fan controller receives the Heat Pump Detection (HPD) signal input 234 from the system transformer Hot leg 210b when connected by a wire 265 or connected by a wire with a diode 275 to control the fan relay 205 and system blower/fan 206 for a heat pump system.

FIG. 2 shows the fan controller 211 connected to a gas furnace HVAC system 100 with AC compressor control 203 for direct-expansion cooling and a furnace heat-source 202 for heating. The fan controller 211 includes the following low-voltage signal inputs connected to existing thermostat or equipment control terminals 201, a low-voltage signal output to control a fan relay 205, and a hot and common connection to receive power:

1) Fan signal "G" on terminal 204 transmits voltage signals to the fan controller 211 through fan input lead 214;

2) optional cooling signal AC "Y" on terminal 207 transmits voltage signals to the fan controller 211 through AC input lead 215 (indicated by dashed line 277);

3) heat-source signal HEAT "W" on terminal 208 transmits voltage signals to the fan controller low-voltage heat-source or HP reversing valve signal input 216;

4) system transformer 210 common 24 VAC signal is connected to the fan controller 211 through Hot input lead 221;

5) system transformer Hot "R" on terminal 209 is connected to the fan controller 211 by Hot lead 213;

6) an optional Heat Pump Detection (HPD) input lead 234 is shown on fan controller 211 with a dashed line to enable connection to the Hot leg 210b to enable control of a fan relay 205 and system blower/fan 206 for a heat pump system (see FIG. 5 and FIG. 6); and 7) fan controller fan signal output 212 connected to fan relay 205 to control system fan/blower 206.

FIG. 2 shows a dashed line 217 where the original thermostat fan signal wire to the fan relay 205 has been disconnected in order to route this signal to the fan controller 211 and transfer control of the fan relay 205 to the fan controller 211. The fan Controller 211 transmits a low-voltage control signal to the fan relay 205 through fan Controller 211 fan signal output 212.

FIG. 2. also shows the furnace fan controller (238) supplied by the manufacturer of the gas furnace HVAC equipment which is used to control the high voltage furnace fan relay (239) to control the system fan/blower (206) at the low-speed when the gas furnace HVAC system 100 is operating in heating mode. Blower fans typically have multiple speed taps to change the fan speed depending on the system external static pressure and design airflow and cooling or heating capacity requirements. For a gas furnace system in heating mode, the furnace fan controller (238) typically provides a short fan-on time delay for the furnace heat exchanger to reach operational temperatures before energizing the low-speed relay (239) to turn ON the blower fan (206) in the low speed used for heating. The furnace blower controller fan-on time delay is typically based on a timer or temperature sensor. The fan relay (205) is used by the thermostat for cooling and fan-only operation and is typically connected to the high-speed tap of the system fan/blower (206) to operate the fan in the high-speed used for cooling. The fan controller (211) provides a 24 VAC low-voltage signal output (212) to interrupt the low-voltage fan signal on a thermostat "G" terminal (204) to the high-speed relay (205) to control the high-speed relay (205).

Figure 3:
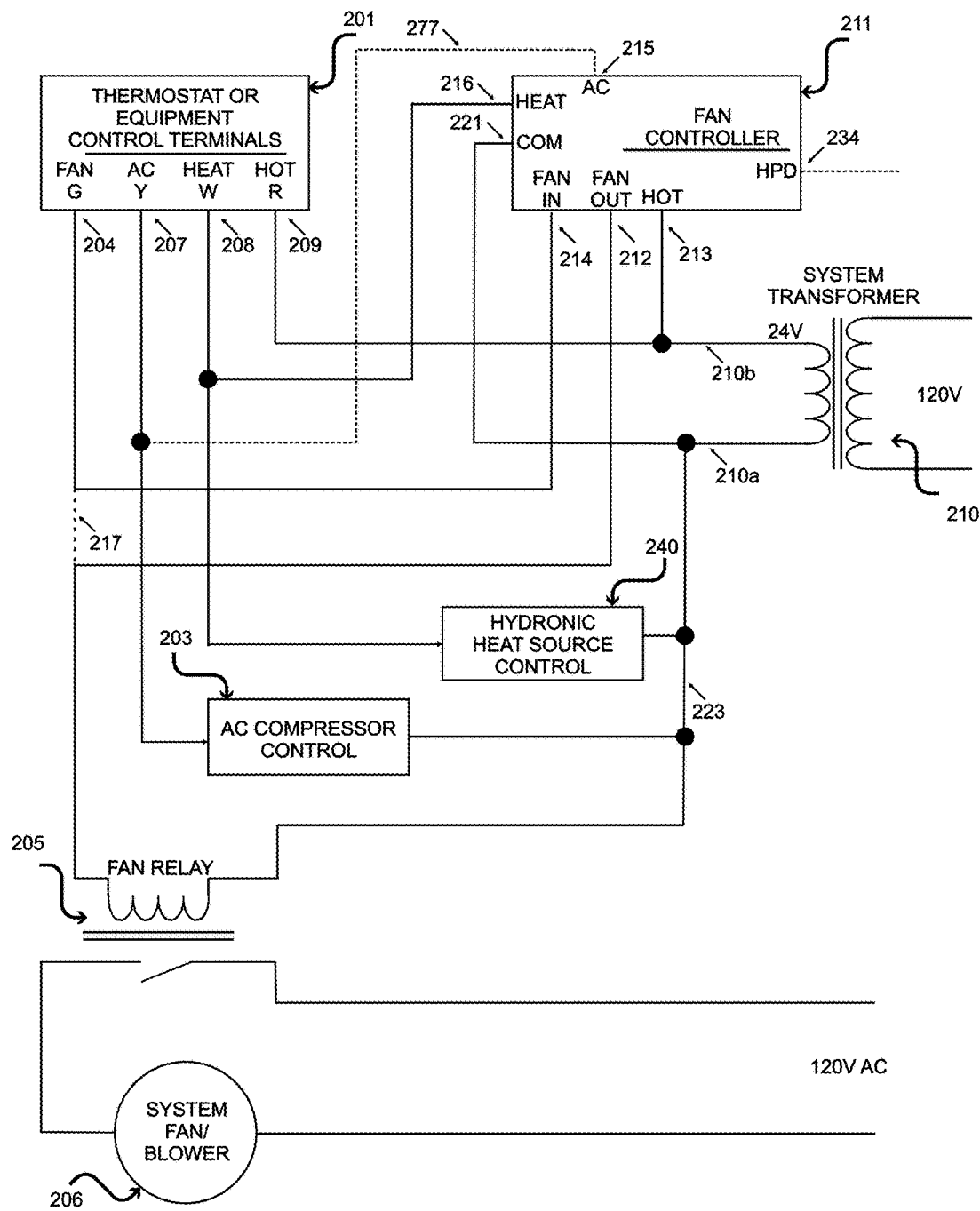
FIG. 3 shows a fan controller according to an embodiment of the present invention connected to a hydronic HVAC system.

FIG. 3 shows the fan controller 211 connected to a hydronic HVAC system 100 with AC compressor control 203 for direct-expansion cooling and hydronic heat-source 240 for heating. The fan controller 211 shown in FIG. 3 provides all the same low-voltage signal inputs, output, power connections, and dashed line 217 shown in FIG. 2. FIG. 3 does not show a furnace fan controller (238) or furnace fan relay (239) since hydronic HVAC systems typically only have one fan relay (205). If a hydronic HVAC system 100 has a separate fan controller (238) then the fan control functionality shown in FIG. 2 may apply.

Figure 4:
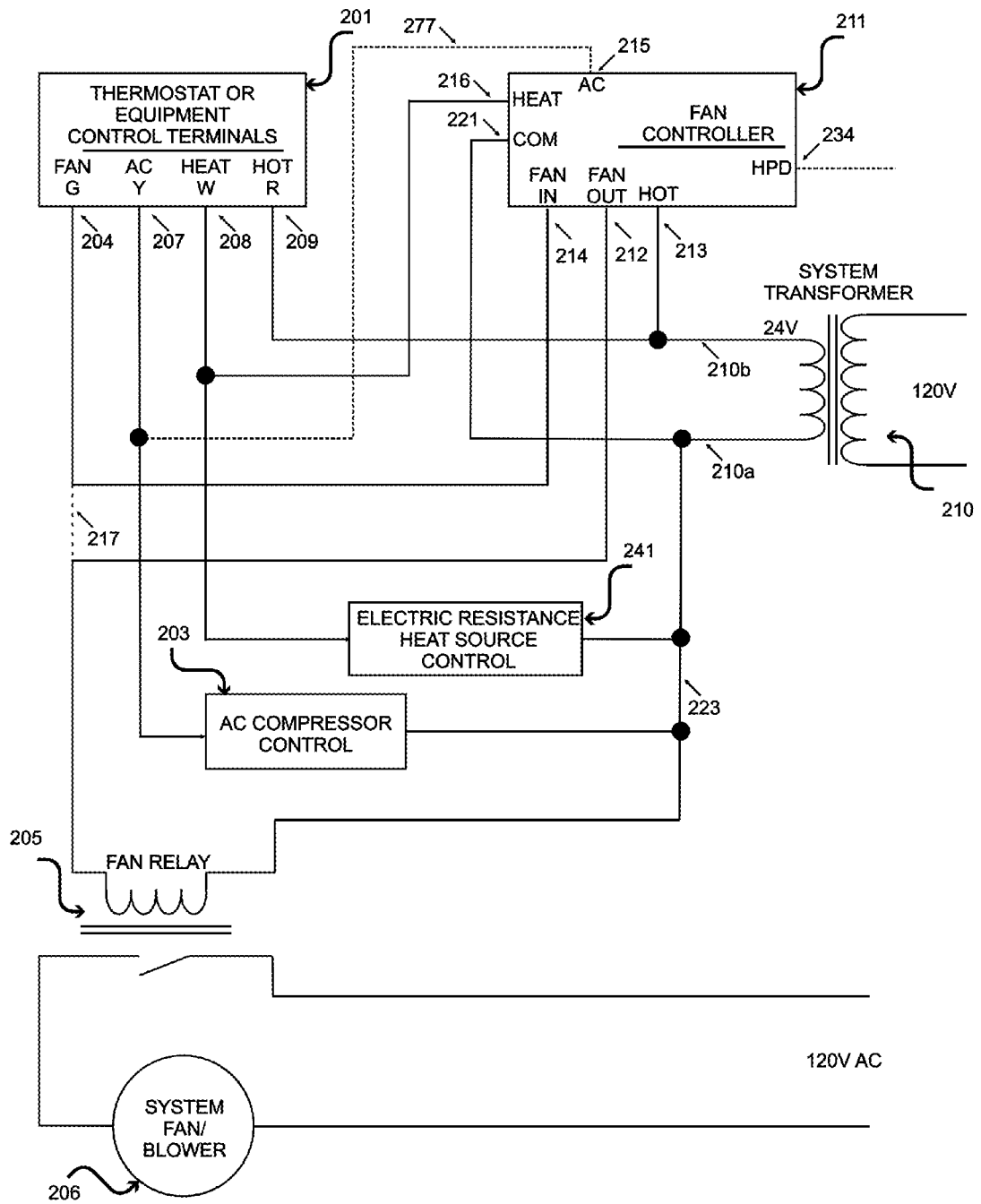
FIG. 4 shows a fan controller according to an embodiment of the present invention connected to an electric resistance HVAC system.

FIG. 4 shows the fan controller 211 connected to an electric resistance HVAC system 100 with AC compressor control 203 for direct-expansion cooling and electric resistance heat-source 241 for heating. The fan controller 211 shown in FIG. 4 provides all the same low-voltage signal inputs, output, power connections, and dashed line 217 shown in FIG. 2. FIG. 4 does not show a furnace fan controller 238 or furnace fan relay 239 since electric resistance HVAC systems typically only have one fan relay 205. If an electric resistance HVAC system 100 had a separate fan controller (238) then the fan control functionality shown in FIG. 2 may apply.

Figure 5:
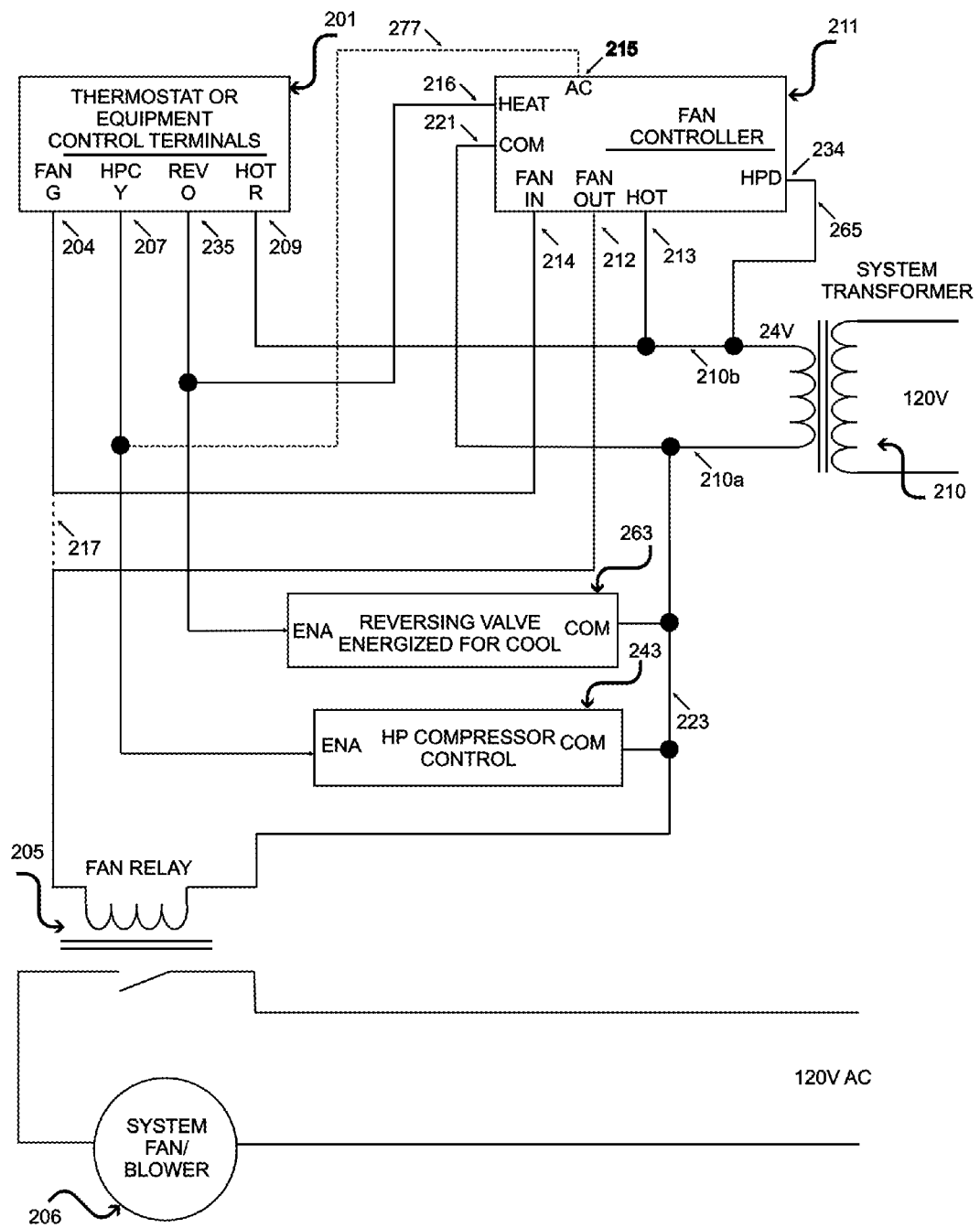
FIG. 5 shows a fan controller according to an embodiment of the present invention connected to a heat pump HVAC system with reversing valve energized for cooling.

FIG. 5 shows the fan controller 211 connected to a heat pump HVAC system 100 with AC compressor control 203 for direct-expansion cooling and heat pump reversing valve 263 energized for cooling. The fan controller 211 shown in FIG. 5 provides all the same low-voltage signal inputs, output, power connections, and dashed line 217 shown in FIG. 2. The reversing signal REV "O" on terminal 235 transmits voltage signals to the fan controller 211 through heat input lead 216. FIG. 5 shows a wire connection 265 between the system transformer Hot "R" on terminal 209 to the fan controller 211 HPD input (234) allows the fan controller to detect and control the fan relay 205 for a heat pump HVAC system 100 with a reversing valve energized in cooling mode. FIG. 5 does not show a furnace fan controller (238) or furnace fan relay 239 since heat pump HVAC systems typically only have one fan relay 205. If a heat pump HVAC system 100 had a separate fan controller (238) then the fan control functionality shown in FIG. 2 could apply.

Figure 11:
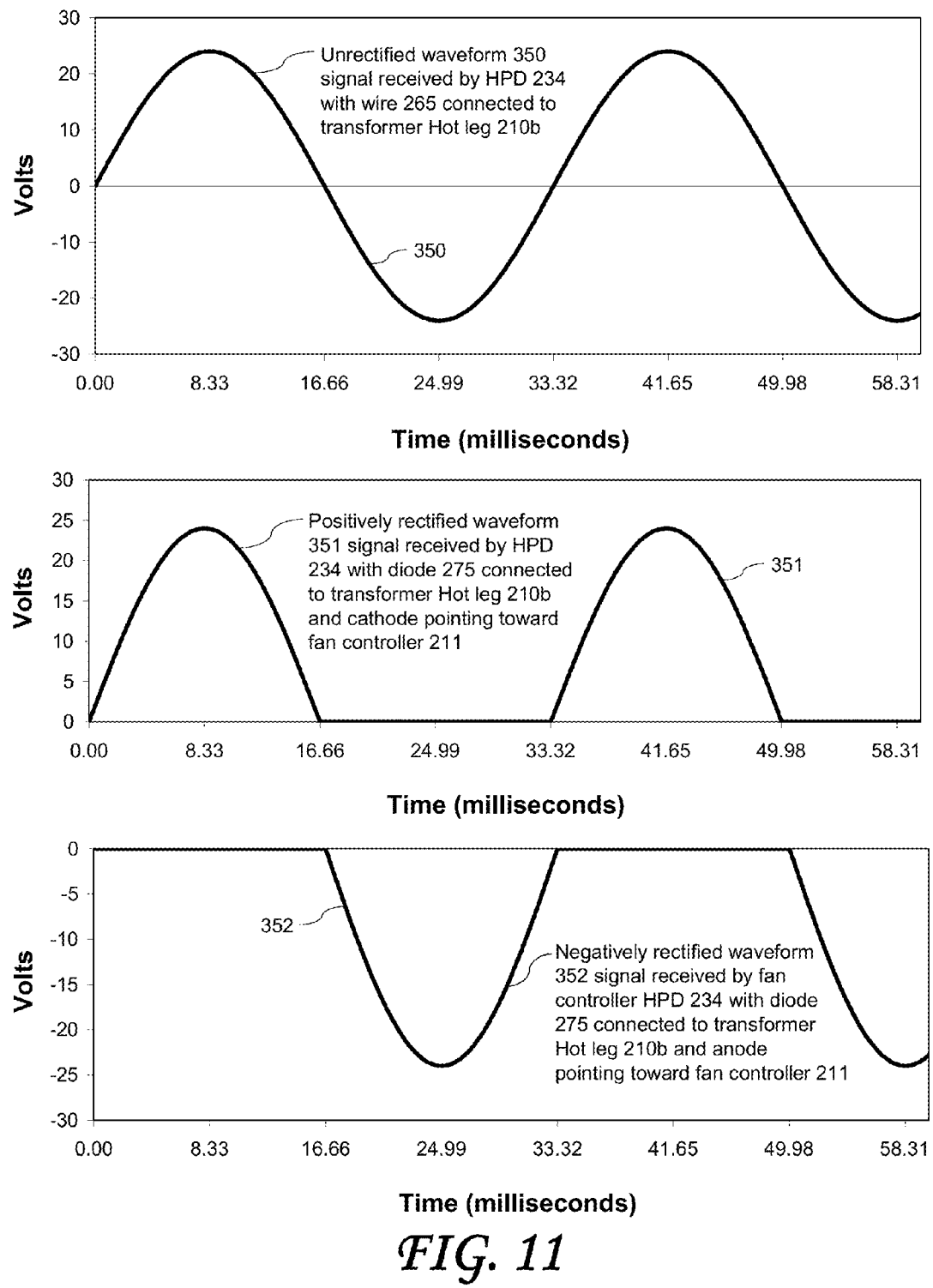
FIG. 11 shows three diagrams of the waveforms possible on fan controller Heat Pump Detection (HPD) signal input 234 used by the fan controller to detect the presence of whether or not the fan controller is connected to a heat pump and whether or not the heat pump reversing valve is energized for cooling or heating, according to the present invention.

FIG. 11 shows three diagrams of the waveforms possible on HPD input 234. The signal received by HPD 234 when connected by a wire 265 to system transformer Hot lead 210b is represented by waveform 350. This is an active unrectified low-voltage signal and current flows in both the positive and negative cycles. Waveform 351 represents the signal received by HPD 234 when there is a diode 275 connected between HPD 234 and the transformer hot lead 210b with the cathode pointing toward the fan controller 211. This waveform is positively rectified and current only flows in the positive cycle. Waveform 352 represents the signal received by HPD 234 when there is a diode 275 connected between HPD 234 and the transformer hot lead 210b with the anode pointing toward the fan controller 211. This waveform is negatively rectified and current only flows in the negative cycle.

Figure 6:
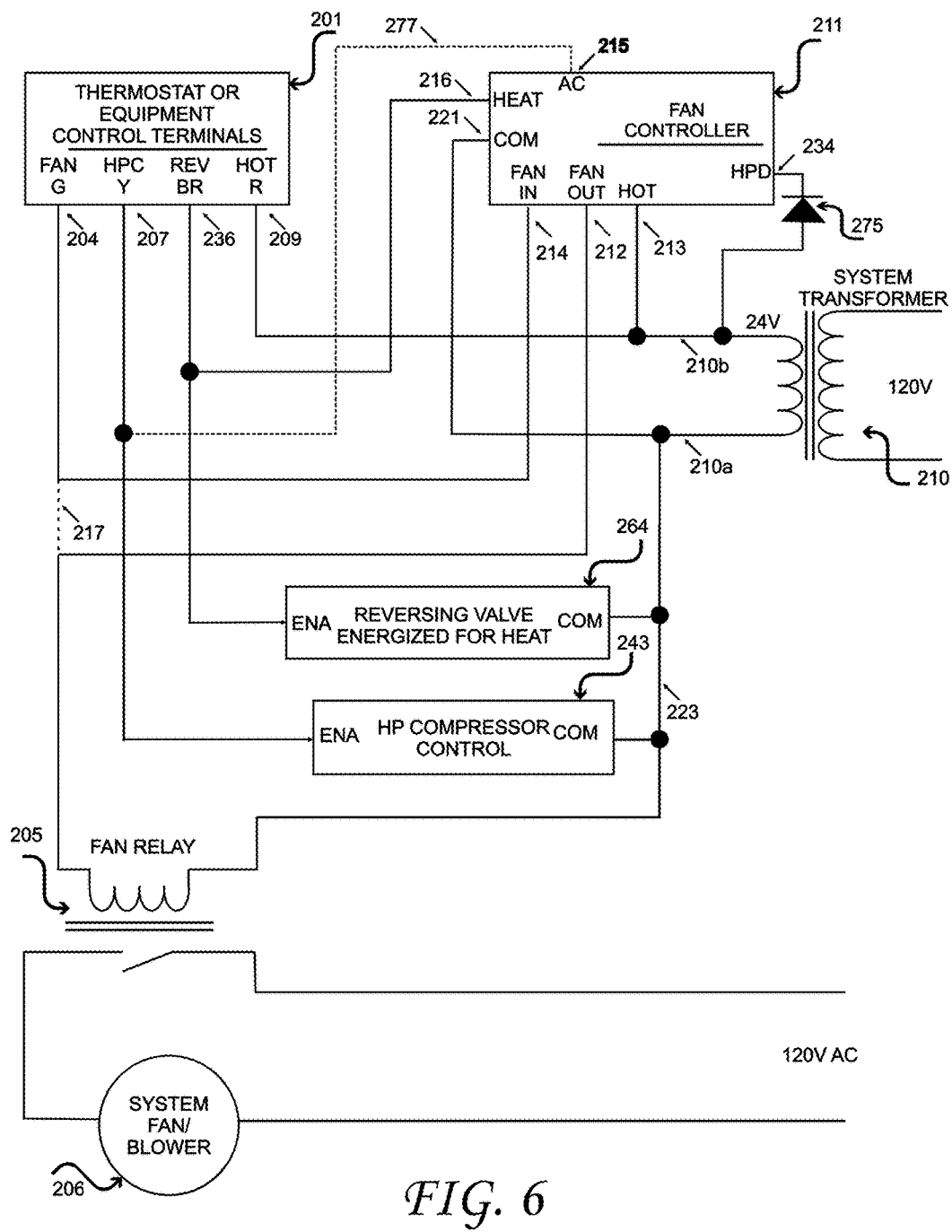
FIG. 6 shows a fan controller according to an embodiment of the present invention connected to a heat pump HVAC system with reversing valve energized for heating.

FIG. 6 shows the fan controller 211 connected to a heat pump HVAC system 100 with AC compressor control 203 for direct-expansion cooling and heat pump reversing valve 263 energized for heating mode. The fan controller 211 shown in FIG. 6 provides all the same low-voltage signal inputs, output, power connections, and dashed line 217 shown in FIG. 2. The reversing signal REV "BR" on terminal 236 transmits voltage signals to the fan controller 211 through heat input lead 216. The connection between the system transformer Hot "R" on terminal 209 to the fan controller 211 HPD lead 234 with a diode 275 allows the fan controller to detect and control the fan relay 205 and system blower/fan 206 for a heat pump HVAC system 100 with a reversing valve energized in heating mode. FIG. 6 does not show a furnace fan controller (238) or furnace fan relay (239) since heat pump HVAC systems typically only have one fan relay (205).

The diode 275 shown in FIG. 6 only allows current to flow to the fan controller 211 on positive cycles of the system transformer hot signal on terminal 209. By seeing current flowing only during the positive cycle and not on the negative cycle, the fan controller 211 is commanded to control the fan relay (205) for a heat pump system with reversing valve energized for heating mode. The dashed line 217 indicates where the original thermostat fan signal wire to the fan relay 205 has been disconnected in order to route this signal to the fan controller 211 input 214. The fan controller transmits a low-voltage control signal to the fan relay 205 through fan controller 211 signal output 212.

When installed on most gas furnace HVAC systems in heating mode, the fan controller activates the 24 VAC low-voltage signal output 212 which causes the high-speed relay 205 to drive the fan/blower 206 at the high-speed used for cooling. On some gas furnace HVAC systems the fan relay 205 on the OEM blower controller 238 might be connected to the low or medium speed tap on the system fan/blower 206 and the system fan/blower 206 then operates at the low or medium speed. To achieve optimal performance in gas furnace heating mode, the fan controller 211 can be configured to include a high-voltage relay to directly drive the high-speed tap of the fan/blower 206 and circumvent the OEM blower controller board 238 default fan speeds and operate the fan/blower 206 at the high-speed used for cooling after the time P1 has expired, and continue operating the fan/blower at high speed throughout the heat-source operational time P3 and the extended fan-off time delay period P2.

Figure 7:
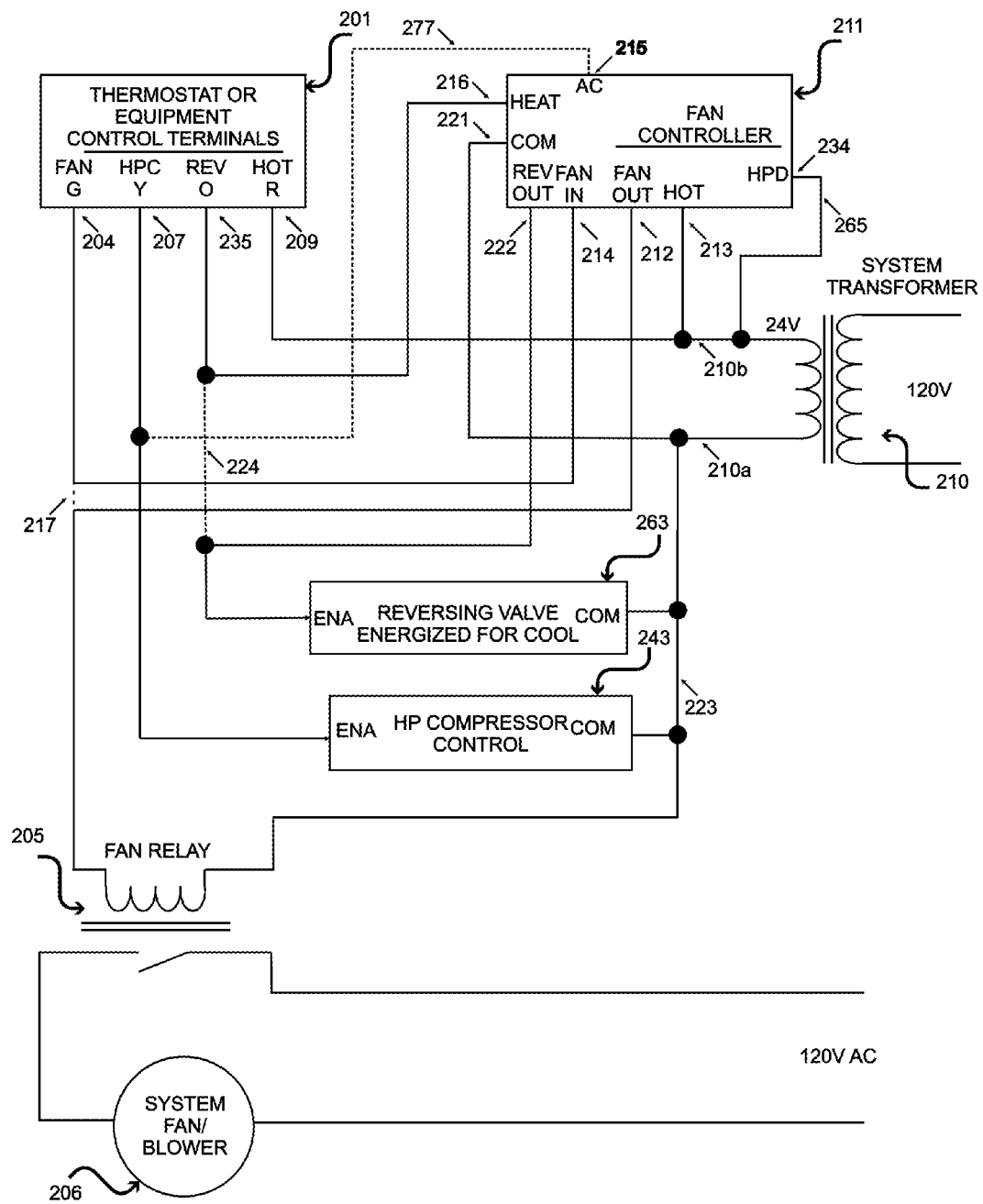
FIG. 7 shows a fan controller according to an embodiment of the present invention connected to a heat pump HVAC system with reversing valve energized for cooling.

FIG. 7 shows components of the fan controller used for a heat pump HVAC system 100 with reversing valve energized for cooling. The embodiment in FIG. 7 shows a dashed line 223 where the original thermostat REV signal 235 has been disconnected in order to route this signal to the fan controller 216 and transfer control of the reversing valve 263 to the fan controller 211 using fan controller output 222. The fan controller 211 transmits a low-voltage control signal to the reversing valve 263 through REV output 222 to maintain the same position for the reversing valve during the fan-off time delay period after the compressor turns off, to maximize energy recovery. Some heat pump thermostats or controllers de-energize the heat pump reversing valve 263 at the end of the HP compressor cooling cycle to equalize refrigerant system pressure. The optional fan controller REV output 222 energizes the reversing valve 263 for the entire duration of the fan-off delay time maximize sensible energy recovery from the heat pump. The fan controller 211 can perform a similar function for a heat pump with reversing valve energized in heating 264 by maintaining a low-voltage output signal to the fan controller REV output 222 during the fan-off time delay for heating.

Figure 8:
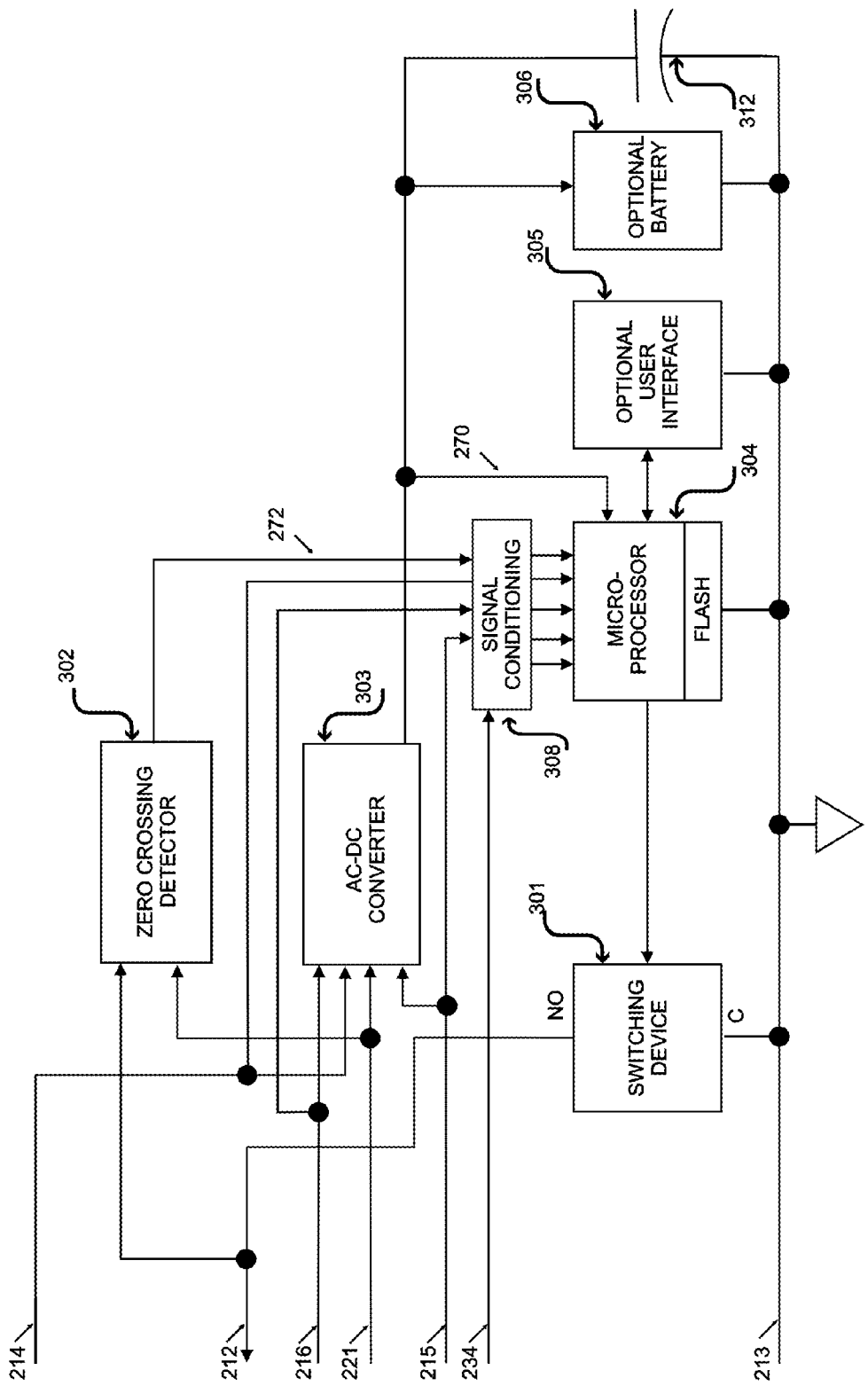
FIG. 8 shows elements of the fan controller according to an embodiment of the present invention for HVAC systems with direct-expansion air conditioning, gas furnace, heat pump, electric resistance, or hydronic heating.
Figure 9:
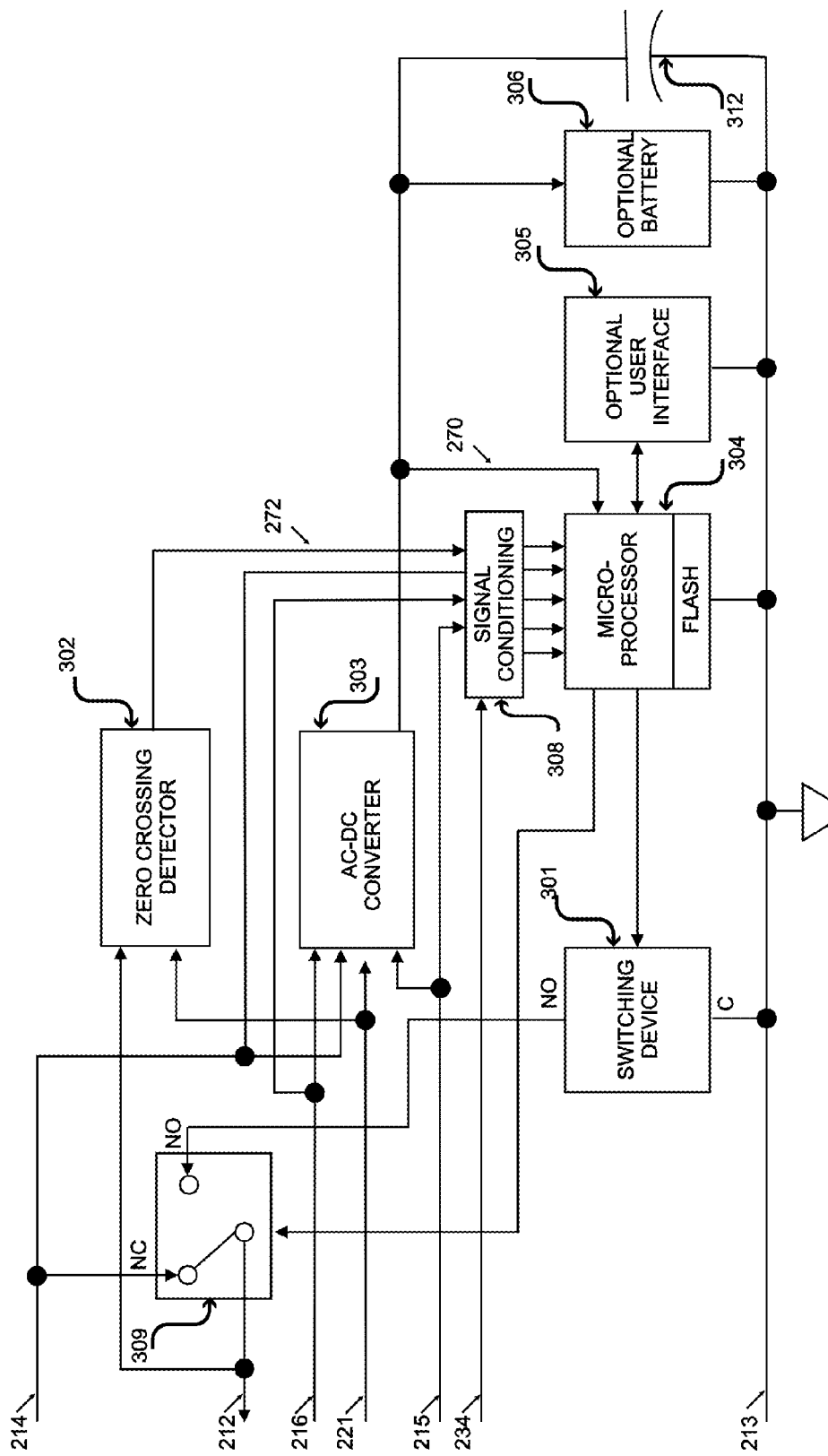
FIG. 9 shows elements of another embodiment of the fan controller according to the present invention with a normally closed relay 309 which connects the input lead 214 signal from the thermostat to the fan relay control 212 for HVAC systems with direct-expansion air conditioning, gas furnace, heat pump, electric resistance, or hydronic heating.

FIG. 8 shows components of the fan controller 211 used for systems with gas furnace, electric resistance, heat pump or hydronic heating. FIG. 9 shows components of another embodiment of the fan controller with a normally closed relay switch 309 which connects the input lead 214 signal from the thermostat to the fan relay control 212. When the switch 309 shown in FIG. 9 is present, if the fan controller 211 device fails, the FAN "G" 204 is connected to the fan relay 205 and the system performs as if the fan controller 211 was not in the control loop. In normal operation, when the fan controller 211 is controlling the fan relay 205, the relay switch 309 is enabled and the switching device 301 output is presented to the fan relay control signal 212.

The switch 301 acts as a direct control of the fan relay 205 and indirect control of the system fan/blower motor 206. It is indirect because the switch 301 controls the fan relay 205, and the fan relay 205 controls the high-voltage signals going directly to the system fan/blower motor 206. Switch 301 works for systems where the default fan speed is the high speed used for cooling. For systems where the default fan speed is the low or medium speed used for heating, a high-voltage switch allows the fan controller 211 to directly control the system fan/blower motor 206. A double-pole double-throw relay could be in place of switch 301. The normally closed contacts could connect the furnace fan control board output to the low speed tap on the system fan/blower 206. The normally open contacts could connect 120/240 VAC to the high-speed used for a cooling tap. For gas furnace heating systems, the microprocessor activates the relay at the end of time period P1 and the system fan/blower 206 is controlled by the fan controller 211 to go from the low-speed used for heating to the high-speed used for cooling after time P1. For air conditioning systems where the default fan speed is the low or medium speed, the fan controller microprocessor 304 activates the high-voltage switch for the system fan/blower 206 to operate at the high-speed used for cooling after the fan-on time delay P0 (if applicable), continue through the cool-source operational time P4 or heat-source operational time P3, and then continue through the extended fan-off time delay period P2. This provides increased cooling or heating capacity in order to satisfy the thermostat in less time and save energy. In this way, the fan controller 211 directly controls the system fan/blower speed, rather than indirectly as with switch 301 and fan relay 205.

The embodiments shown in FIG. 8 and FIG. 9 show an optional user interface 305 which may be used to configure the microprocessor 304 to provide fan controller control for a specific HVAC system 100 type. The user interface is generally optional because the fan controller apparatus is capable of determining system type and heating or cooling mode of operation based on signals received from thermostat or equipment terminals.

The fan controller 211 receives the following signal inputs from the thermostat:

fan input 214 from the thermostat "G" terminal 204;

AC compressor input 215 from the thermostat "Y" terminal 207;

heat-source input 216 from the thermostat "W" terminal 206 or from the thermostat "O" terminal 235 or thermostat "BR" terminal 236; and HPD mode input 234 from the thermostat "R" terminal 209 or the system transformer Hot 210*b*.

The fan controller 211 has a single output 212 which is the signal to enable the fan relay 205.

The signal inputs 214, 215, 216, and 234 and an output of the zero crossing detector 302 pass through a signal conditioning circuit 308 before being passed to the microprocessor 304. The signal conditioning circuit 308 shifts the level of the thermostat inputs to a level that does not harm the microprocessor 304. The microprocessor 304 is used to control switching devices 301 and 309. The microprocessor 304 also has an input from a zero crossing detector 302. This zero crossing detector 302 may monitor either the current feeding through the fan relay 205 via signal output 212 or a neutral leg 210*b* (see FIG. 2) of the system transformer 210. When monitoring the signal 212, which is normally an output of the Fan Controller 211 to the fan relay 205, the fan relay 205 has the leg opposite signal 212 tied to the neutral leg 210*b* of the system transformer 210. Current can flow from that neutral leg 210*b*, up through the fan relay 205 and into the Fan Controller 211 since the fan controller 211 ground is referenced to the hot leg 210*b* of the system transformer 210.

The zero crossing detector 302 then presents a zero crossing signal 272 to the microprocessor 304 which enables the microprocessor to determine when the system transformer signal input 221 passes above zero volts and below zero volts. This information is used to count cycles for timekeeping purposes and to determine when to activate the switching device 301. The zero crossing times are also required when the switching device 301 is a triac. To operate the triac as a switch, the triac must be fired at all zero crossing transitions.

The AC-DC converter 303 has inputs from the system transformer 221 as well as the thermostat signal outputs for heat-source enable signal 216, compressor enable signal 215, and fan enable signal 212. Any of these signals can be rectified in the AC-DC converter to provide DC power to the microprocessor 304 and to keep an optional battery 306 charged or supercapacitor 312.

The switching device 301 is controlled by the microprocessor 304 and connects the fan controller 211 input 213 to the fan relay control line 212 which in turn, energizes the fan relay 205. The output of switching device 301 is routed through the normally closed relay 309 which when operating properly is switched by the microprocessor 304 to the normally open position allowing a complete circuit from the switching device 301 to the fan relay control output 212.

There is also an optional user interface 305 which may be used to configure the microprocessor 304 to perform in an alternate manner. An optional battery 306 is also shown which could be used in the event that common wire 221 is not present and the switching device 301 is not a triac.

The wire 265 shown in FIG. 5 is connected from the thermostat "R" terminal 209 or the system transformer Hot 210*b* to the HPD input 234. A low-voltage signal on HPD input 234 is passed through the signal conditioning 308 element before being passed to the microprocessor. By nature of the zero crossing detector 302, the microprocessor 304 knows when thermostat signals should be above ground and below ground. If the HPD input 234 is not connected to the system transformer 210 as shown in FIG. 2, the microprocessor 304 detects a floating signal on HPD input 234 and performs like it is connected to a conventional HVAC system 100. If HPD input 234 is connected to system transformer 210*b* as shown in FIG. 5, then the microprocessor 304 detects the signal on HPD input 234 above and below ground (i.e., active in both cycles) and the fan controller detects a heat pump HVAC system 100 where the reversing valve "O" is normally energized in cooling mode.

The diode 275 shown in FIG. 6 is connected from the thermostat "R" terminal 209 or the system transformer Hot 210*b* to the HPD input 234. When connected with a diode 275 the HPD input 234 has a low-voltage signal during the positive cycle and a floating signal during the negative cycle because of the direction of the diode 275. The microprocessor 304 detects this state and the fan controller detects a heat pump HVAC system 100 where the reversing valve "BR" is normally energized in heating mode. Because the microprocessor 304 is powered by the AC to DC converter 303, using an AC signal, the system is free to define hot and neutral as the opposite of what the original installation intended. The fan controller 211 basically "floats" electronically and as a result is able to use the only wire coming to the thermostat (Hot) as a ground.

The microprocessor 304 performs several major functions. In terms of timing, the microprocessor 304 keeps track of seconds and minutes by either monitoring the output from the zero crossing detector 302, or by counting microprocessor clock cycles. Each positive zero crossing accounts for $\frac{1}{60}$th of a second; therefore, sixty positive crossings occur each second. The seconds are then accumulated to measure the time of operation or non-operation. The negative crossings are also monitored to provide timing for the switching device 301.

The fan controller 211 draws power through the HVAC thermostat or equipment terminal block C common 223 of the 24 VAC transformer 210 (see FIG. 2 through FIG. 6). The switching device 301 could be standard relay type device, a reed relay or some other electro-mechanical device, and could also be a solid state device such as an IET switch or a triac. In the event that an electro-mechanical switch was used, either an optional battery is added to power the microprocessor 304 or the inputs 215, 216 or 221 could provide power through the AC-DC converter when the switch is closed. A preferred embodiment of the fan controller uses only the 24 VAC Hot 213 from the system transformer 210 and a triac 301 and does not require a battery.

The microprocessor 304 continuously monitors all inputs to determine if there is any change to the current system operation. In one embodiment, the microprocessor 304 contains FLASH memory, which allows the unit to store the programming instructions and data when there is no power applied to the unit.

The microprocessor 304 monitors the duration of the fan 205, AC compressor 203, and/or heater 202 operation by the thermostat 201, and adjusts the delay accordingly. If the AC compressor 203 or the heat-source 202 are operated for a short period of time and there is not much condensation on the evaporator or heat in the heat exchanger, then the fan 205 time is extended for a shorter period of time. Likewise, if the AC compressor 203 or the heat-source 202 have operated for a longer period of time, allowing for more condensate or heater 202 runs longer creating more heart soak, then the fan controller 211 causes the fan 205 to run for a longer period of time after the AC compressor 203 or the heat-source 202 have stopped. Timing table and/or algorithms may be modified for particular HVAC system 100, environments, user preferences, and the like.

In the embodiment of the fan controller 211 using a triac as the switching device 301, the microprocessor 304 does not enable the triac at exactly the zero crossing of the 24 VAC signal. Instead, the microprocessor 304 delays an amount of time into the positive going cycle and allows the positive going waveform to provide a small amount of charge into the AC/DC circuitry. After a small charge has been accumulated, the microprocessor 304 enables the triac to pass the remainder of the power through to the fan relay 205. The AC waveform rises for a short period and then completely shorts out for the duration of the cycle, which passes this energy on to the fan relay 205 and thus actuates it. In this way, the fan relay 205 gets the majority of the AC waveform and actuates, while enough charge is stored by the AC/DC circuitry to keep the microprocessor 304 running until the next positive going cycle of the AC waveform.

In another embodiment of the fan controller, a battery 306 is used to supply power to the microprocessor 304 when the fan controller 211 is actuating the fan relay 205. In this embodiment, the 24 VAC signal is passed to the fan relay 205. This method is less complex but increases the cost of the invention and adds an item (the battery 306) that requires maintenance and periodic replacement.

Figure 10:
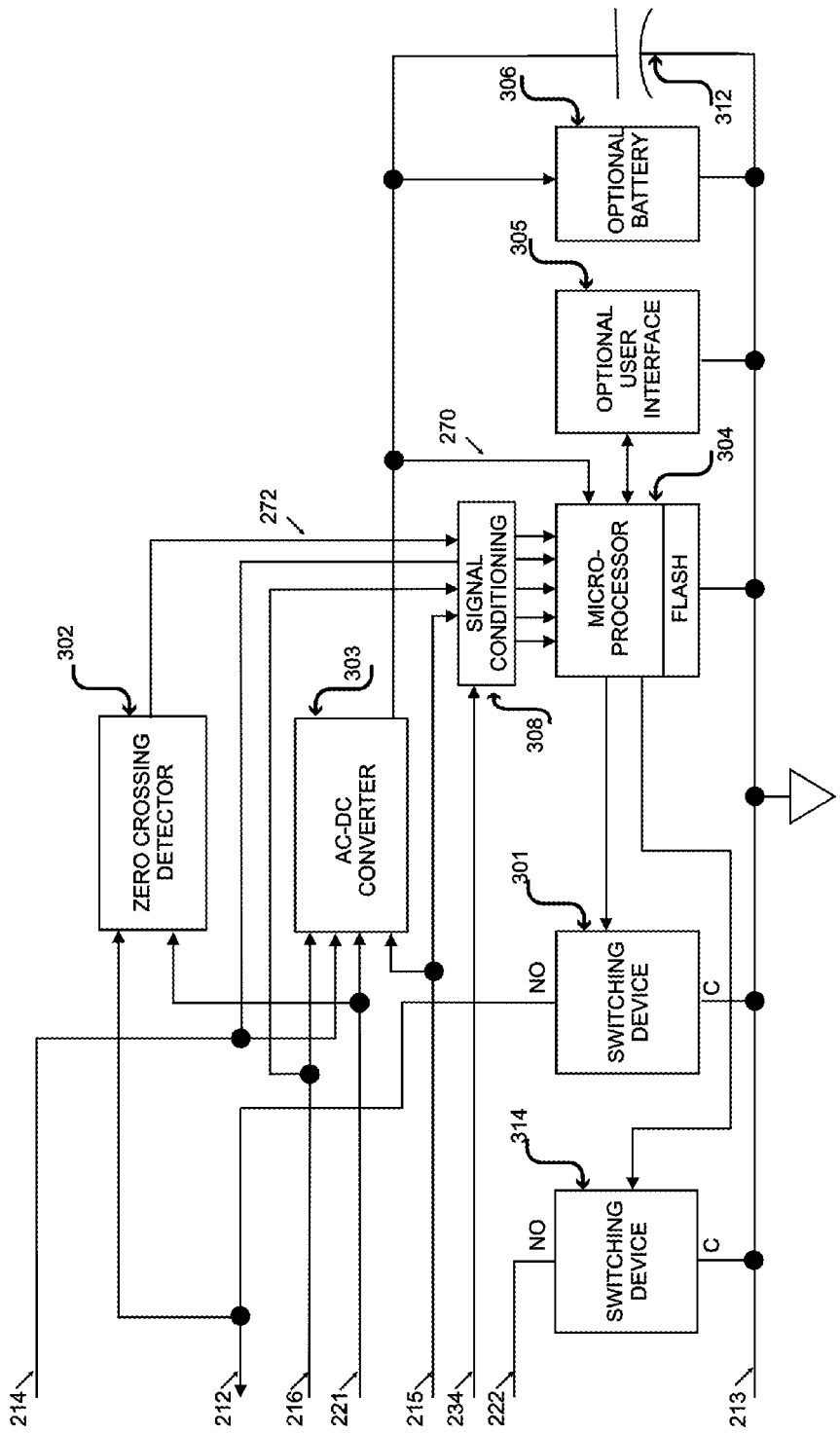
FIG. 10 shows elements of the fan controller according to an embodiment of the present invention with a second switching device 314 which connects the fan controller ground lead 213 which is the transformer hot lead 211b to the fan controller REV output signal control 222 for HVAC systems with a heat pump to maintain the same position for the reversing valve during the fan-off time delay period after the compressor turns off.

FIG. 10 shows elements of another embodiment of the fan controller with a second switching device 314 which connects the fan controller ground lead 213 (which is also the transformer hot lead 211b) to the fan controller REV output signal control 222 for HVAC systems with a heat pump, to maintain the same position for the reversing valve during the fan-off time delay period after the compressor turns off. Some thermostats of HVAC controllers de-energize the reversing valve at the end of AC/HP compressor cycle, which equalizes the refrigerant pressure and temperature between high and low side of the system, causing a loss of available cooling energy during the fan-off time delay. Maintaining the heat pump reversing valve at the same position throughout the cooling cycle and fan-off time delay period, allows more energy to be recovered and delivered to the space to improve sensible cooling capacity and efficiency.

Figure 12:
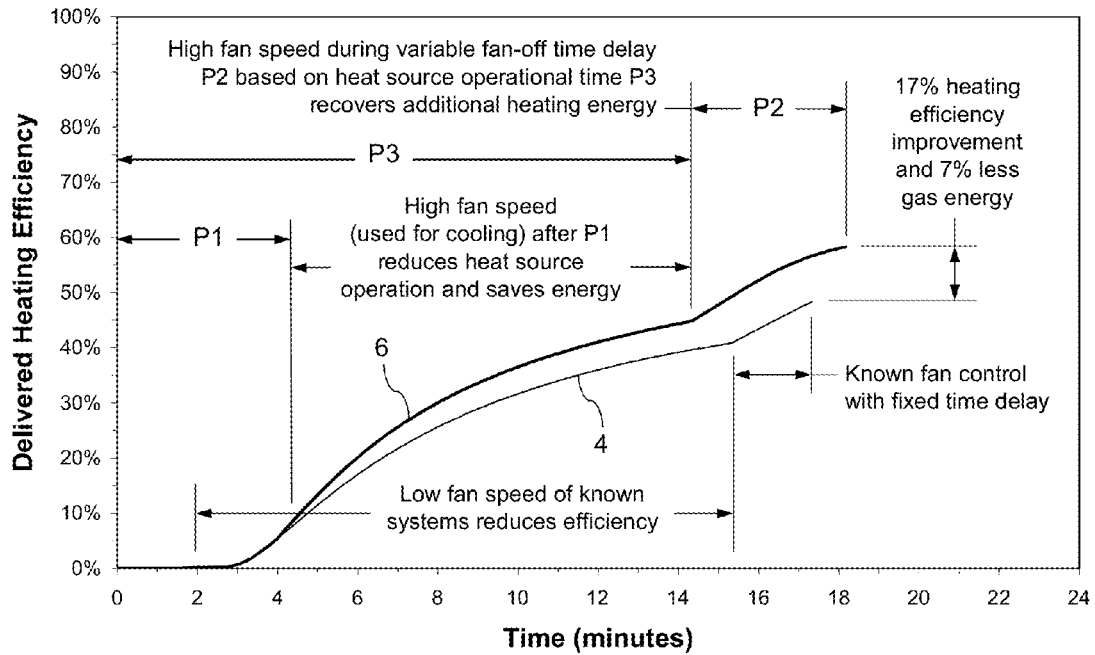
FIG. 12 shows a graph comparing delivered heating efficiency versus time of operation for a gas furnace HVAC system with the known fan control and the fan controller according to the present invention.

FIG. 12 shows a graph comparing delivered heating efficiency versus time of operation for a gas furnace HVAC system 100 with the known HVAC fan control 4 and the fan controller 6. The fan controller 6 improves heating system efficiency and reduces gas furnace operation by increasing fan speed from the low speed used for heating to the high speed used for cooling after delay time period P1 after the heat exchanger reaches maximum temperature. The fan controller 6 also maximizes heat recovery from the heat exchanger after the heat-source is turned OFF with an extended variable fan delay as a function of duration of heat-source operational time P3 based on signals present on thermostat or equipment terminals. Known fixed-time or temperature fan-off delay control 4 wastes more energy by leaving the heat exchanger with significantly higher temperatures of 260 to 380 degrees Fahrenheit. FIG. 12 shows the fan controller 6 improving heating efficiency by 17% and reducing gas use by 7% compared to known control 4.

Figure 13:
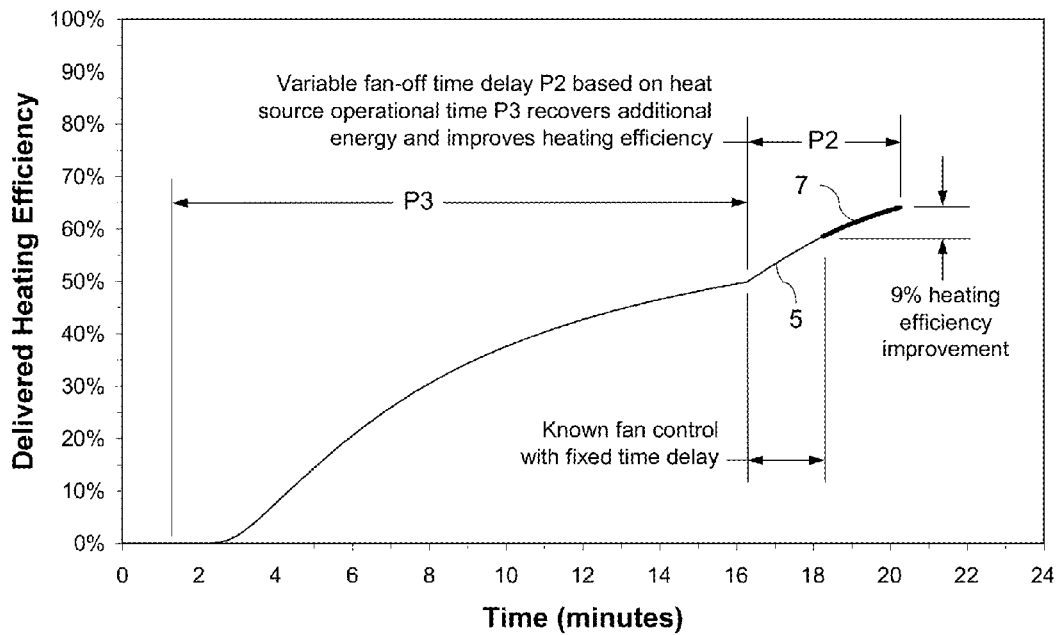
FIG. 13 shows a graph comparing delivered heating efficiency versus time of operation for a gas furnace HVAC system with the known fan control and the fan controller according to the present invention.

FIG. 13 shows a graph comparing delivered heating efficiency versus time of operation for a gas furnace HVAC system 100 with the known HVAC fan control 5 and the fan controller 7. The fan controller 7 maximizes heat recovery from the heat exchanger after the heat-source is turned OFF with an extended variable fan delay as a function of the duration of heat-source operational time P3 based on signals present on thermostat or equipment terminals. Known fixed-time or temperature fan-off delay control 5 wastes more energy by leaving the heat exchanger with significantly higher temperatures of 260 to 380 degrees Fahrenheit. FIG. 13 shows the fan controller 7 improving heating efficiency by 9% compared to known control 5. The fan controller curve 6 shown in FIG. 12 defaults to the fan controller curve 7 on gas furnace HVAC systems for a gas furnace HVAC system 100 with a one-speed fan/blower motor or a gas furnace HVAC system 100 where the low-voltage signal from the thermostat or equipment control terminal 204 controlling the fan relay 205 cannot switch the system fan/blower motor to the high fan speed used for cooling.

Figure 14:
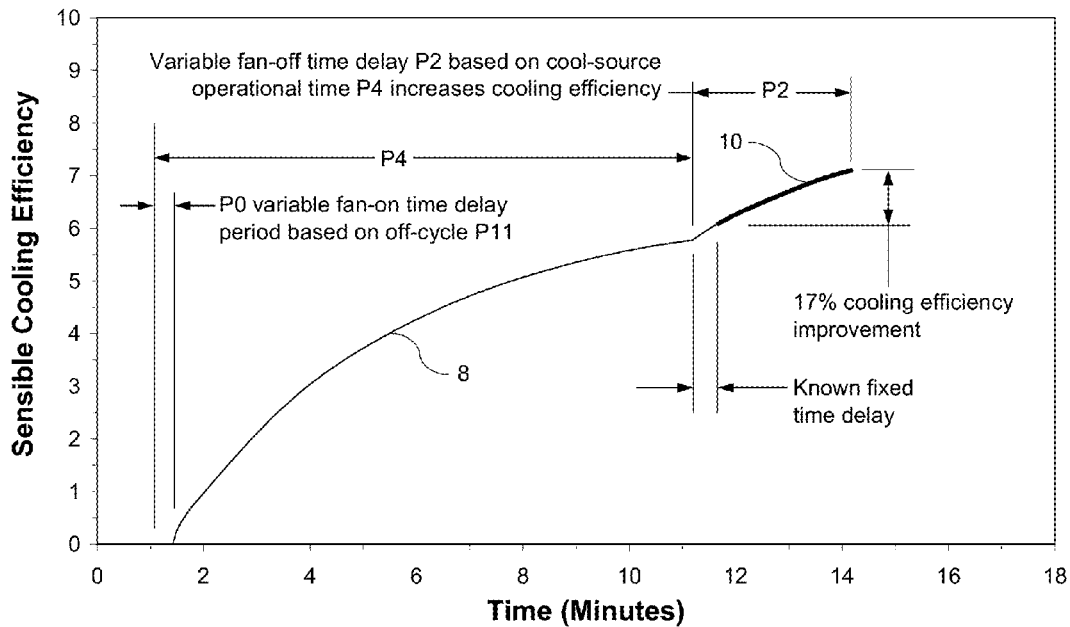
FIG. 14 shows a graph comparing delivered sensible cooling efficiency versus time of operation for a direct-expansion air conditioning system with the known fan control and the fan controller according to the present invention.

FIG. 14 shows a graph comparing delivered sensible cooling efficiency versus time of operation for a direct-expansion air conditioning system with the known fan control 8 and the fan controller 10. The fan controller 10 monitors and controls the HVAC fan and calculates a short fan-on delay P0 based on the previous cooling off-cycle duration P11. The fan controller 10 improves cooling system efficiency and maximizes sensible cooling recovery from the evaporator after the AC compressor is turned OFF with an extended variable fan delay as a function of the duration of AC compressor cool-source operational time P4 based on signals present on thermostat or equipment terminals. Known fixed-time delay control 8 wastes energy by leaving the evaporator with significantly more available yet unrecovered sensible cooling energy. FIG. 14 shows the fan controller 10 improving sensible cooling efficiency by 17% compared to known control 8.

Figure 15:
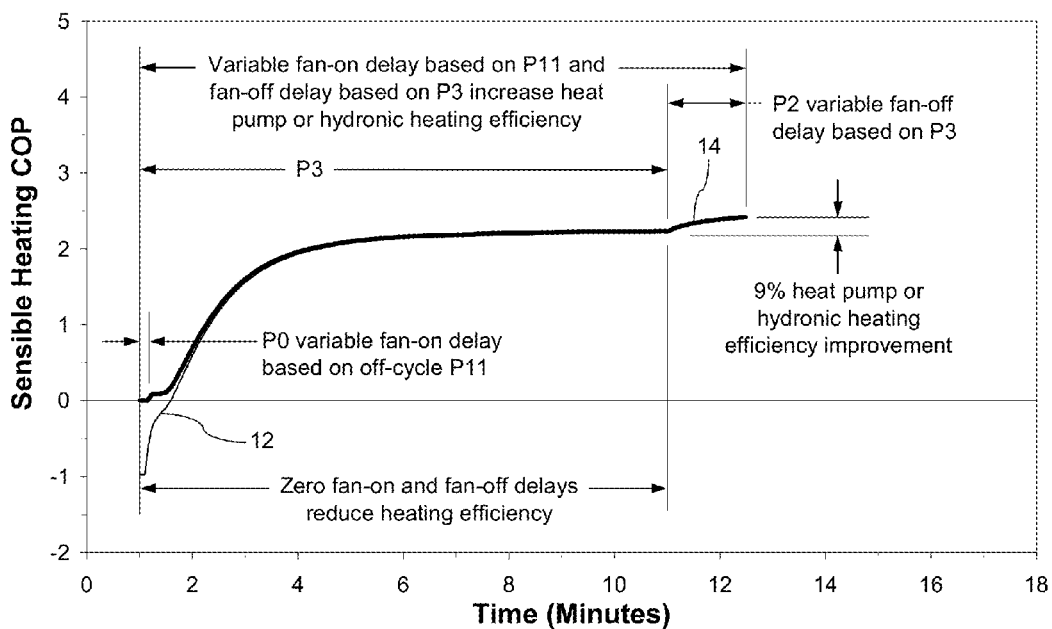
FIG. 15 shows a graph comparing the delivered heating efficiency coefficient of performance (COP) versus time of operation for the heat pump or hydronic HVAC system with the known fan control and the fan controller according to the present invention.

FIG. 15 shows a graph comparing the delivered heating efficiency coefficient of performance (COP) versus time of operation for the heat pump or hydronic HVAC system 100 with the known fan control 12 and fan controller 14. The fan controller 14 monitors and controls the HVAC fan and calculates a short fan-on delay P0 based on the previous heating off-cycle duration P11. The fan controller 14 improves heating efficiency and maximizes heat recovery from the heat pump coil after the HP compressor is turned OFF with an extended variable fan delay as a function of the duration of HP compressor operational time P3 based on signals present on thermostat or equipment terminals. Known fixed fan-off time delay control 12 wastes energy by leaving the heat pump coil with significantly more available yet unrecovered sensible heating energy. FIG. 15 shows the fan controller 14 improving heating efficiency by 9% compared to the known control 12.

Figure 16:
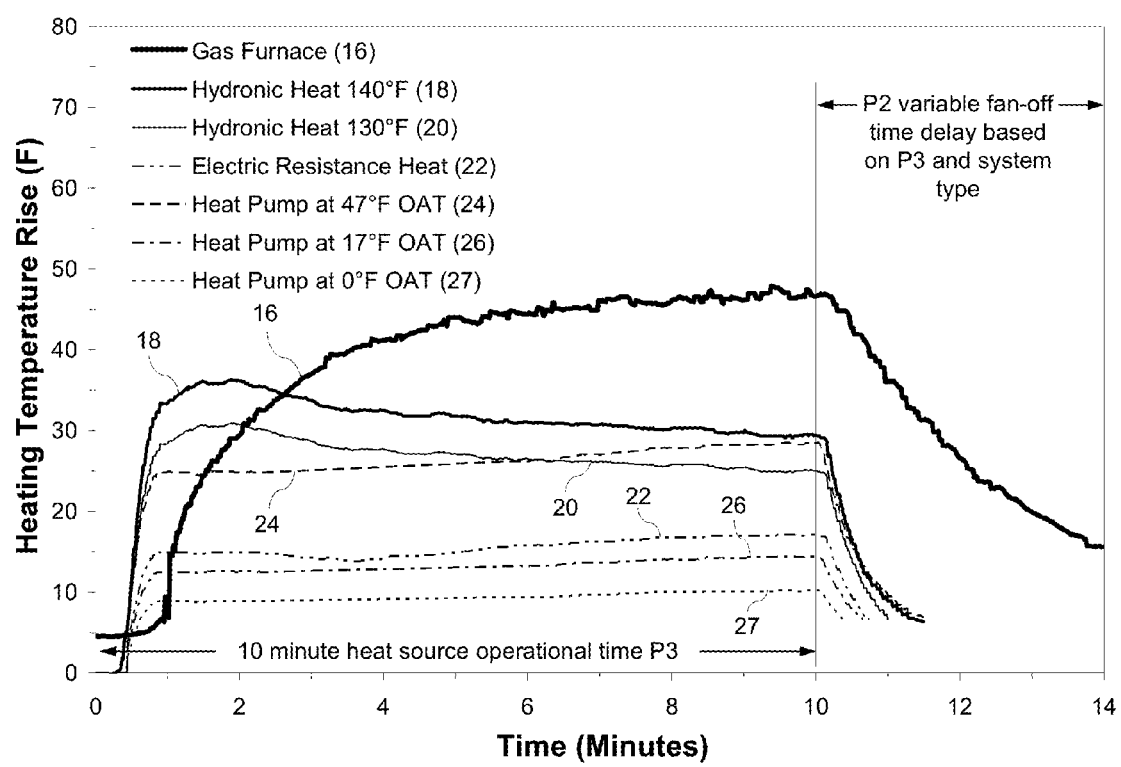
FIG. 16 shows a graph of heating temperature rise across the heat exchanger versus time of operation for different heating system types operating for an equivalent heat-source operational time P3 and variable fan-only operational time P2 for fan control according to an embodiment of the present invention.

FIG. 16 shows a graph comparing heating temperature rise (° F.) across the heat exchanger (i.e., leaving air dry-bulb temperature minus entering dry-bulb temperature) versus time of operation for ten minutes of heat-source operational time P3 and variable fan-off time delays P2 as a function of the ten-minute heat-source operational time P3 based on signals present on thermostat or equipment control terminals. The fan controller curve 16 for a gas furnace provides a final heating temperature rise of 16 degrees Fahrenheit at the end of a Variable fan-off time delay P2 of four minutes based on heat-source operational time P3 of 10 minutes for any Outdoor Air Temperature (OAT). The fan controller curve 18 for a hydronic heating system with 140 degree Fahrenheit hot water provides a final heating temperature rise of seven degrees Fahrenheit at the end of a variable fan-off time delay of 1.5 minutes based on heat-source operational time P3 of 10 minutes. The fan controller curve 20 for a hydronic heating system with 130 degree Fahrenheit hot water provides a final heating temperature rise of seven degrees Fahrenheit at the end of a variable fan-off time delay P2 of one minute based on heat-source operational time P3 of 10 minutes. The fan controller curve 22 for an electric resistance heating system provides a final heating temperature rise of seven degrees Fahrenheit at the end of a variable fan-off time delay P2 of 0.75 minutes based on heat-source operational time P3 of 10 minutes.

The fan controller curve 24 for a heat pump at 47 degrees Fahrenheit OAT provides a final heating temperature rise of seven degrees Fahrenheit at the end of a P2 variable fan-off time delay of 1.5 minutes based on based on heat-source operational time P3 of 10 minutes. The fan controller curve 26 for a heat pump at 17 degrees Fahrenheit OAT provides a final heating temperature rise of seven degrees Fahrenheit at the end of a P2 variable fan-off time delay of 0.7 minutes based on a heat-source operational time P3 of 10 minutes. The fan controller curve 27 for a heat pump at 0 degrees Fahrenheit OAT provides a final heating temperature rise of seven degrees Fahrenheit at the end of a P2 variable fan-off time delay of 0.33 minutes based on a heat-source operational time P3 of 10 minutes.

Figure 17:
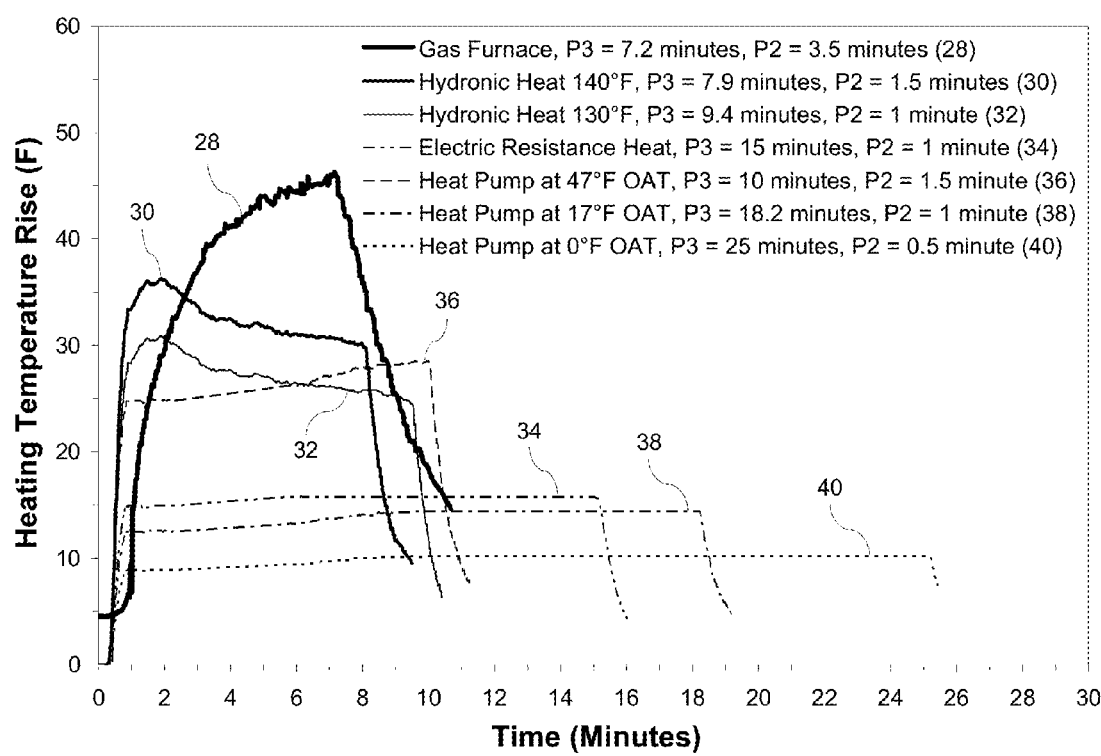
FIG. 17 shows a graph of heating temperature rise across the heat exchanger versus time of operation for different heating system types providing equivalent heating output to satisfy the thermostat based on varying the heat-source operational time P3 and variable fan-only operational time P2 for the fan control according to an embodiment of the present invention.

FIG. 17 shows heating temperature rise (° F.) across the heat exchanger versus time of operation for the gas furnace, hydronic, electric resistance, and heat pump heating systems where each heating system delivers equivalent heating output and the variable fan-off time delay P2 is a function of heat-source operational time P3 based on signals present on thermostat or equipment control terminals. The hydronic hot water supply temperature varies from 130 to 140 degrees Fahrenheit and the heat pump outdoor air temperature (OAT) varies from 0 to 17 to 47 degrees Fahrenheit.

FIG. 17 shows the fan controller curve 28 for gas furnace heating where the extended fan-only operational time P2 is 3.5 minutes based on 7.2 minutes of heat-source operational time P3. For the gas furnace and 3.5 minutes fan-off time delay P2 based on 7.2 minutes of heat-source operational time P3, the final heating temperature rise is 14.6 degrees Fahrenheit at the end of the P2 time period. The gas furnace heating system stores more heating energy in the heat exchanger, enclosure, and plenum as P3 operational time increases independent of OAT.

FIG. 17 also shows the fan controller curve 30 for hydronic heating where the hot water supply is 140 degrees Fahrenheit and the extended fan-only operational time P2 is 1.5 minutes based on 7.9 minutes of heat-source operational time P3 which is used as a proxy for lower OAT. For hydronic heating at 140 degrees Fahrenheit and 1.5 minutes fan-off time delay P2 based on 7.9 minutes of heat-source operational time P3, the final heating temperature rise is 10 degrees Fahrenheit. FIG. 17 also shows the fan controller curve 32 for hydronic heating where the hot water supply is 130 degrees Fahrenheit and the extended fan-only operational time P2 decreases to one minute based on 9.4 minutes of heat-source operational time P3. For hydronic heating at 130 degrees Fahrenheit and 1 minute fan-off time delay P2 based on 9.4 minutes of heat-source operational time P3, the final heating temperature rise is 7 degrees Fahrenheit. Longer heat-source operational time is caused by lower OAT which increases building heat losses and the frequency of heat-source operational time and reduces off-cycle duration P11 providing less time between cycles for the water heater to increase hot water temperatures which causes lower hot water temperatures during and after the thermostat temperature has been satisfied, which reduces energy available for heat recovery from extended fan operation after the hydronic heat-source has been de-energized.

FIG. 17 also shows the fan controller curve 34 for electric resistance heating and the extended fan-only operational time P2 decreased to one minute based on 15 minutes of heat-source operational time P3. For electric resistance heating and 1 minute fan-off time delay P2 based on 15 minutes of heat-source operational time P3, the final heating temperature rise is 5 degrees Fahrenheit. Heat output for an electric resistance heater varies based on power and quantity of heating elements and airflow. For a typical electric resistance heating element, a longer heat-source operational time may be caused by lower OAT, which increases building heat losses and the frequency of heat-source operational time and reduces the off-cycle duration P11. These conditions reduce heat stored in the heating system, thus further reducing energy available for heat recovery from extended fan operation after the electric heat-source has been de-energized.

FIG. 17 also shows the fan controller curves 36, 38, and 40 for a heat pump where the extended fan-off time delay P2 is decreased from 1.5 to 1 minute to 0.5 minutes based on increasing heat-source operational time P3 from 10 minutes at 47 degrees Fahrenheit OAT, 18.2 minutes at 17 degrees Fahrenheit OAT, and 25 minutes at 0 degrees Fahrenheit OAT. For the heat pump, the heat-source operational time P3 is used as a proxy for lower OAT. Longer heat-source operational times P3 are caused by lower OAT which increases building heat losses and reduces heat pump condenser indoor-coil temperatures and heating energy available for heat recovery from extended fan operation after the heat-source has been de-energized. For a heat pump operating at 47 degrees Fahrenheit Outdoor Air Temperature (OAT) and 1.5 minutes of fan-off time delay P2 based on 10 minutes of heat-source operational time P3, the final heating temperature rise is 7 degrees Fahrenheit. For a heat pump operating at 17 degrees Fahrenheit OAT and 1 minute fan-off time delay P2 based on 18.2 minutes P3, the final heating temperature rise is 5 degrees Fahrenheit. For heat pump operating at 0 degrees Fahrenheit OAT and 0.5 minute fan-off time delay P2 based on 25 minutes P3, the final heating temperature rise is 8 degrees Fahrenheit.

Figure 18:
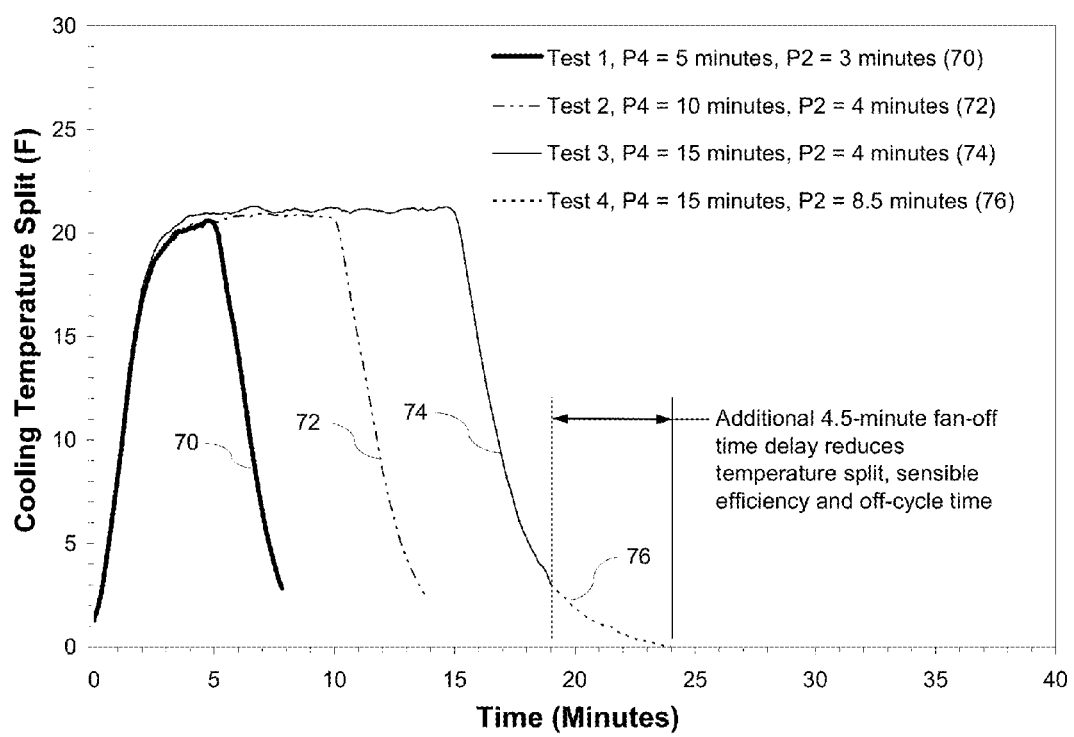
FIG. 18 shows a graph of cooling temperature split across the evaporator of an air conditioning system versus time of operation for various AC compressor operational times P4 and variable fan-only operational time P2 for the fan control according to an embodiment of the present invention.

FIG. 18 shows a graph comparing field measurements of cooling Temperature Split (TS) across the evaporator (i.e., entering evaporator air dry-bulb temperature minus leaving evaporator dry-bulb temperature) versus time of operation for various AC compressor cool-source operational times P4 and fan-only operational times P2. Measurements were made using accurate Resistance Temperature Detector (RTD) dry-bulb sensors located outside the building, inside an HVAC cooling system return air duct and supply air duct, and at the thermostat which controls the HVAC system 100. The average indoor drybulb temperature was 76° F. and the average outdoor drybulb temperature was 91° F.

FIG. 18 Test 1 curve 70 shows a TS of 20.6° F. at the end of 5 minutes of cool-source operational time P4 and TS of 2.8° F. at the end of 3-minutes of fan-off time delay P2 providing a 32% efficiency improvement compared to the same unit with no time delay.

FIG. 18 Test 2 curve 72 shows a TS of 20.7° F. at the end of 10 minutes of cool-source operational time P4 and TS of 2.3° F. at the end of a 4-minute fan-off time delay P2 providing a 15% efficiency improvement compared to the same unit with no time delay.

FIG. 18 Test 3 curve 74 and Test 4 curve 76 provide a practical upper limit of latent cooling for fan-off time delays. Test 3 curve 74 shows a TS of 21.2° F. at the end of 15 minutes of cool-source operational time P4 and a TS of 3.6° F. at the end of 4-minutes of fan-off time delay P2 providing a 10% sensible efficiency improvement compared to the same unit with no time delay.

Test 4 curve 76 shows a TS of 21.3° F. at the end of 15 minutes of cool-source operational time P4. At the end of an 8.5-minute fan-off time delay, the measured TS was 0.15° F. The 8.5-minute fan-off time delay (additional 4.5-minutes) reduced sensible efficiency to 6%, increased the thermostat temperature by more than 1° F. above the set point and caused the compressor to turn on and eliminate the off-cycle.

Test 3 curve 74 provides the practical upper limit 4-minute fan-off time delay followed by an 11.5-minute off-cycle period. For this example, a fan-off time delay longer than 4 minutes reduces efficiency and shortens the off-cycle period.

FIG. 18 demonstrates why laboratory test results presented in the CEC '056 Report are impossible to achieve in the field with actual air conditioners and why the CEC '056 Report did not disclose or suggest methods to calculate extended variable fan-off time delays as a function of air conditioning compressor cool-source operational times.

Impractical and excessively long fan-off time delays disclosed in the CEC '056 report reduce latent recovery and sensible efficiency and also reduce or eliminate the compressor off-cycle time. Hundreds of field and laboratory tests were performed on numerous HVAC units to determine the practical upper limit of the fan-off time delay and develop the variable fan-off time delay P2 based on AC/HP compressor cool-source operational time P4.

Figure 19:
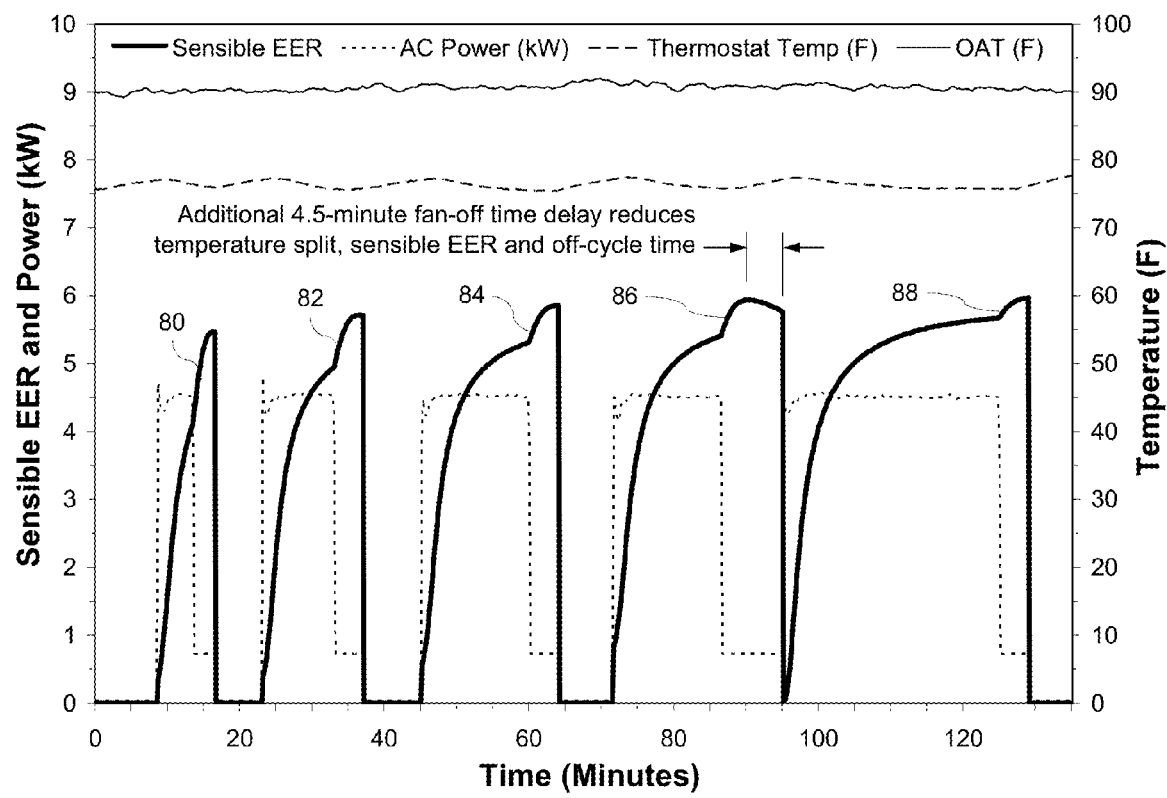
FIG. 19 shows a graph of sensible cooling Energy Efficiency Ratio (EER) and total power (kW) versus time of operation for an air conditioning system with various AC compressor operational times P4 and variable fan-off operational time P2 for the fan control according to an embodiment of the present invention.

FIG. 19 shows a graph comparing field measurements of cooling sensible Energy Efficiency Ratio (EER) and power (kW) versus time of operation for various AC compressor cool-source operational times P4 and fan-only operational times P2. FIG. 19 also shows air temperature (° F.) measured at the thermostat and outdoor air temperature versus time. Curve 80 shows 5 minutes of cool-source operational time and a 3-minute fan-off time delay P2 providing a 32% efficiency improvement compared to the same unit with no time delay. Curve 82 shows 10 minutes of cool-source operational time P4 and a 4-minute fan-off time delay P2 providing a 15% efficiency improvement compared to the same unit with no time delay. Curve 84 shows 15 minutes of cool-source operational time P4 and a 4-minute fan-off time delay P2 providing a 10% efficiency improvement compared to the same unit with no time delay. Curve 86 shows 15 minutes of cool-source operational time P4 and an 8.5-minute fan-off time delay P2 providing a 6.6% efficiency improvement compared to the same unit with no time delay. The additional 4.5-minute fan-off time delay shown in curve 86 eliminates the compressor off-cycle time as indicated by Curve 88 where the AC compressor operational time starts immediately. Curve 88 shows 30-minutes of cool-source operational time P4 and a 4-minute fan-off time delay P2 providing a 5.1% efficiency improvement compared to the same unit with no time delay. The results indicate that a longer fan-off time delay for curve 88 does not improve sensible efficiency.

FIG. 18 and FIG. 19 demonstrate the practical upper limit of the fan-off time delay based on cool-source operational time. The air conditioning system stores some cooling capacity in the form of water condensed onto the evaporator coil. The extended fan-off time delay operates the blower fan after the compressor is off to recover some of the stored cooling capacity by evaporating the water on the coil which reduces the temperature of the air and provides additional sensible cooling capacity to the conditioned space. This process is referred to as latent recovery. The amount of moisture condensed onto the evaporator coil is dependent on the compressor operational time. The amount of moisture that can be converted to sensible cooling is dependent on the airflow and the length of time the fan runs after the compressor is off There are physical limitations to how long the variable fan-off time delay can operate based on how much moisture is condensed onto the evaporator based on compressor operational time and the evaporator airflow rate.

FIG. 20 shows a graph of heating system power (kW) versus time of operation for a known fan control 50 with constant fan operation during unoccupied periods of time causing over ventilation, constant fan power, and increased heating power consumption. Over ventilation can be caused by duct leakage or HVAC economizer dampers being closed or partially open causing an increased amount of cold outdoor air to enter the building which will cause the heating system to operate more frequently during unoccupied periods when the fan is accidentally left on. FIG. 20 also shows an unoccupied fan-off control 52 which turns off the fan and reduces fan and heating system power consumption according to an embodiment of the present invention. The apparatus and methods for turning off the fan during unoccupied periods of time are enabled by the fan controller 211 or in and embodiment of the thermostat 200. The fan controller 211 monitors the fan signal and in the absence of a cool-source or heat-source signal, the fan controller 211 de-energizes the fan relay 205 and turns off the system fan/blower 206 after a minimum fan-only time period to save energy when the fan has been accidentally left on by itself. An embodiment of the thermostat 200 may monitor the fan signal and in the absence an occupancy signal, cool-source signal or heat-source signal, the thermostat 200 may de-energize the fan relay 205 and turns off the system fan/blower 206 after a minimum fan-only time period to save energy when the fan has been accidentally left on by itself.

FIG. 21 shows a graph of cooling system power (kW) versus time of operation for a known fan control 54 with constant fan operation during unoccupied periods of time causing over ventilation, constant fan power, and increased cooling power consumption. Over ventilation can be caused by duct leakage or HVAC economizer dampers being closed or partially open causing an increased amount of hot outdoor air to enter the building which will cause the cooling system to operate more frequently during unoccupied periods when the fan is accidentally left on. FIG. 21 also shows an unoccupied fan-off control 56 which turns off the fan and reduces fan and cooling power consumption according to an embodiment of the present invention. As noted above, the apparatus and methods for turning off the fan during unoccupied periods of time are enabled using an embodiment of the fan controller 211 or thermostat 200 to turn off the fan after a minimum fan-only time period to save energy when the fan has been accidentally left on by itself.

Figure 22:
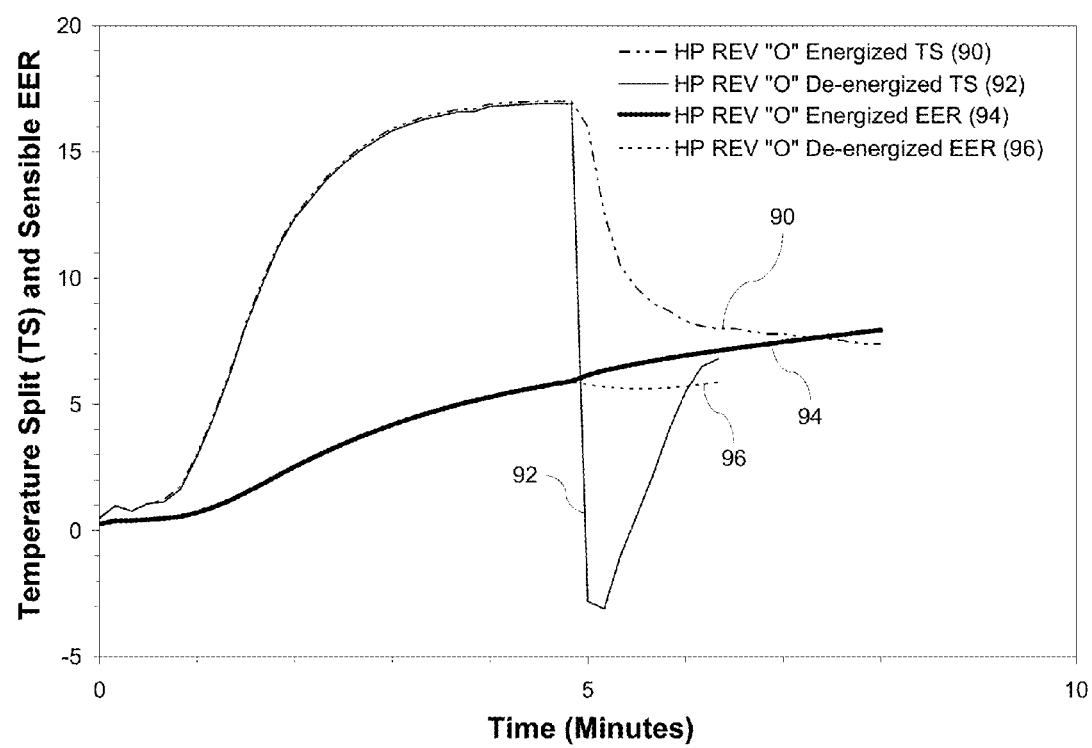
FIG. 22 shows a graph of cooling temperature split (TS) and sensible cooling Energy Efficiency Ratio (EER) versus time of operation for a heat pump with a reversing valve energized in cooling mode for compressor operational time P4 and de-energized at the end of the compressor operational time P4 (curve 92) and the same heat pump with the reversing valve energized throughout the compressor operational time P4 plus fan-off time delay period P2 according to an embodiment of the present invention (curve 90).

FIG. 22 shows a graph of cooling temperature split (TS) and sensible cooling EER versus time of operation for a heat pump with a reversing valve normally energized in cooling mode for compressor operational time P4 and de-energized by the thermostat at the end of the compressor operational time P4. Curve 92 shows how the temperature split is reduced from 16.7° F. to minus 3.1° F. approximately 10 seconds after the reversing valve is de-energized. When de-energized, the reversing-valve spring decompresses and blocks the capillary tube allowing high pressure and high temperature refrigerant vapor to flow to the evaporator coil, increasing the coil temperature from approximately 40 F to approximately 86 F, which immediately increases the supply air temperature, and reduces temperature split and eliminates most of the cooling which was stored in the evaporator at the end of the compressor operational time P4. Curve 96 shows a decline in sensible Energy Efficiency Ratio (EER) during the fan-off time delay due to loss of cooling capacity after the reversing valve is de-energized. Curve 90 shows the gradual TS decrease from 17° F. to 7.4° F. during the 3-minute fan-off time delay. Curve 94 shows the sensible EER increasing by 34% from 5.9 to 7.9 with the reversing valve energized continuously throughout the compressor operational time P4 and continuing to be energized throughout the fan-off time delay P2.

Figure 23:
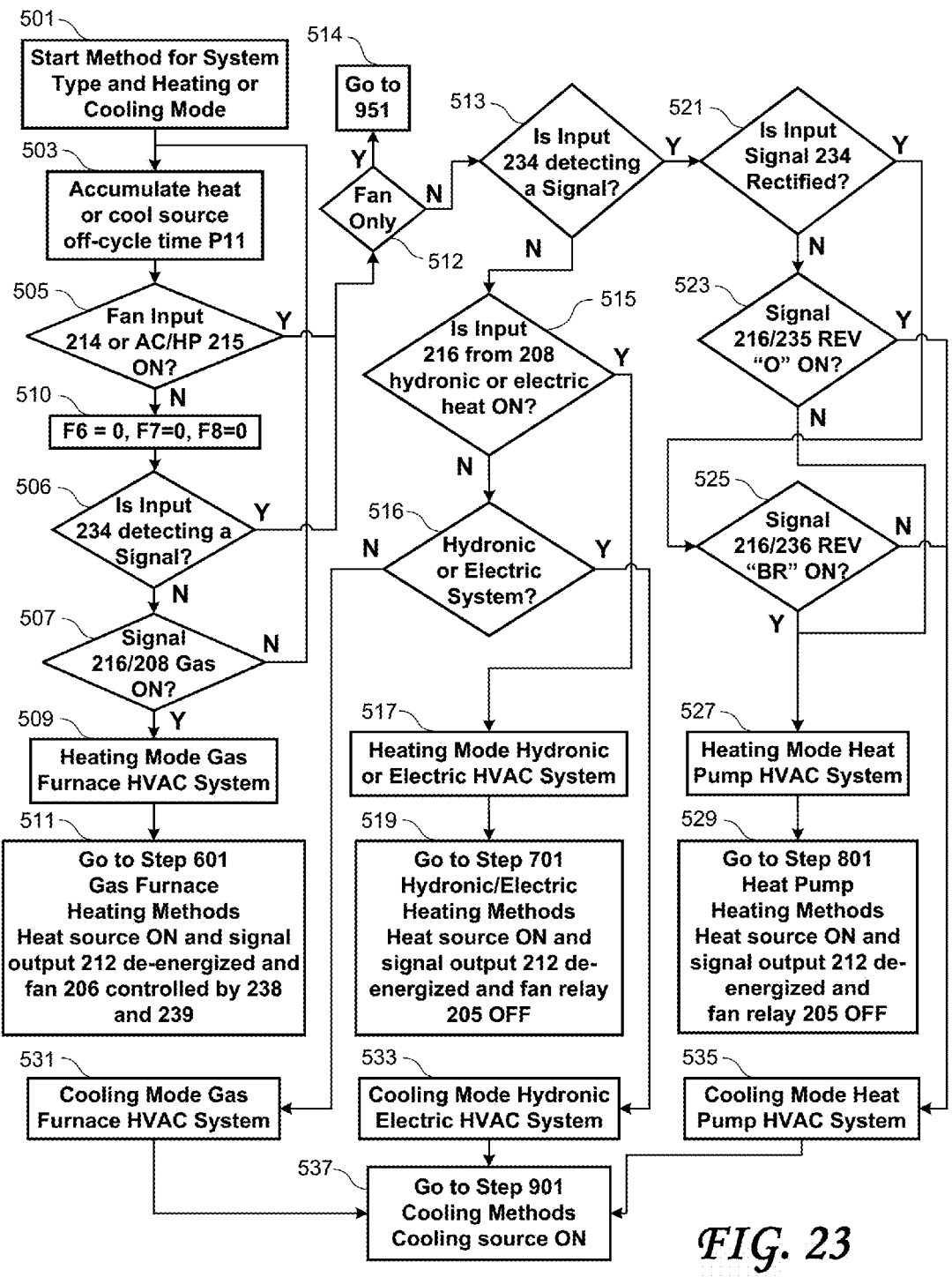
FIG. 23 shows a first method for determining what type of system is connected and what heating or cooling mode to execute, according to an embodiment of the present invention.

FIG. 23 shows a first method used by the fan controller to determine what type heat-source is included in the HVAC system 100 the fan controller is connected to, and whether or not the HVAC system 100 is operating in heating or cooling mode or in the off-cycle. Step 501 is the reset point of the software following completion of the previous variable fan-off delay time P2 in heating or cooling mode or operation. In the embodiment shown in FIG. 9, the optional relay switch 309 is moved from the normally closed position to the normally open position to connect the fan signal output 212 to the switch 301. The relay switch 309 is not included in the embodiment shown in FIG. 8.

At Step 503 the fan controller determines (e.g., accumulates) the off-cycle time P11 where the HVAC system 100 has been idle between heating or cooling periods. P11 is used when there is a fan-on time delay P0 for the start of the fan, or to adjust the fan-off time delay P2 in combination with the previous or current cool-source operational time P4 or heat-source operational time P3. In some systems, the fan start time is delayed by the fan-on time delay P0 before being energized while the heat or cooling source is brought to operational temperature.

At Step 505 the fan controller determines whether or not the fan controller fan signal input 214 is active based on the presence or absence of the low-voltage fan signal on a thermostat "G" terminal 204, or whether or not the fan controller AC/HP signal input 215 is active based on the presence or absence of the low-voltage AC/HP signal on a thermostat "Y" terminal 207. If the fan controller fan signal input 214 is not active, or the fan controller AC/HP signal input 215 is not active, then the fan controller proceeds to Step 510.

At Step 510, the fan controller sets the Fault Detection Diagnostic (FDD) Fan-only Time Accumulation (FTA) variable F6 to zero. F6 variable is used to accumulate fan-only time and is used in the FDD method to close the economizer dampers when F6 is greater than a Threshold Fan-on Time (TFT). In one embodiment the TFT time limit is 10 minutes or adjustable based on Outdoor Air Temperature (OAT), TR, TS, occupancy sensor signals, an indoor air quality requirement, or user inputs.

At Step 510, the fan controller also sets the FDD Fan-on Override (FO) variable F7 to zero. The FO F7 variable is set at the end of all heating or cooling cycles, if the fan is accidentally left on, to indicate that the fan ON signal 214 needs to be overridden to turn the fan OFF when it has accidentally been turned ON.

At Step 510, the fan controller and sets the Fan Accidentally ON (FAO) variable F8 to zero. The F8 variable is used in the FDD method to indicate that the fan is ON by itself prior to a heat-source operational time period P3 or a cool-source operational time period P4. The fan controller examines the FAO F8 variable at the end of all heating or cooling cycles to determine if the cycle was entered from a condition where the fan was accidentally left on. The FO F7 variable is used in the FDD method to turn off the fan if the fan has accidentally been left on at the end of any heat-source or cool-source operational time where the fan was turned ON prior to the heat-source or cool-source operational time.

At Step 512, if the fan controller determines the fan is operating simultaneously with a thermostat call for heating or cooling for a heat pump or hydronic system, then the fan controller proceeds to Step 513. Fan-only operation is defined as the presence of a fan signal and the absence of a heating signal or a cooling signal on the thermostat or equipment terminals or the presence of the HVAC fan control ON setting without a thermostat call for heating or a thermostat call for cooling. At Step 512, if the fan controller determines the fan is operating simultaneously with a thermostat call for heating or cooling for a heat pump or hydronic system, then the fan controller proceeds to Step 513.

At Step 513 the fan controller determines whether or not fan controller signal input 234 is detecting a signal. If fan controller signal input 234 is not detecting a signal, then the fan controller proceeds to Step 515. At Step 515, if fan controller signal input 216 from the thermostat heat "W" signal on terminal 208 is active simultaneously with fan controller signal input 214, then the fan controller sets the HVAC system mode to a hydronic or electric resistance heating system operating in heating mode and sets the mode to heating at Step 517. The fan controller then proceeds to Step 519 and goes to Step 701 fan controller hydronic/electric heating methods (FIG. 26) with the heat-source ON and fan controller signal output 212 de-energized with fan relay 205 and blower fan 206 OFF.

At Step 516, if the fan controller is connected to a hydronic or electric resistance system then the fan controller proceeds to Step 533 and sets the system type to a hydronic or electric HVAC system 100 operating in cooling mode. The fan controller then proceeds to Step 537 and goes to Step 901 fan controller cooling methods (FIG. 28) with cooling source ON.

At Step 506 the fan controller determines whether or not fan controller signal input 234 is detecting a signal through either a wire connection 265 (FIG. 5), or a diode 275 (FIG. 6). When a direct wire connection 265 is present between the 24 VAC transformer 210*b* and fan controller signal input 234, the signal input is active and unrectified (see curve 350 in FIG. 11). When a diode 275 is serially connected between the 24 VAC transformer 210*b* and the fan controller signal input 234, the fan controller signal input 234 is active and either positively or negatively rectified (see curve 351 or 352 in FIG. 11). If fan controller signal input 234 is detecting a signal, either rectified or unrectified, at Step 506, then the fan controller determines that the system type is a heat pump HVAC system 100 proceeds to Step 512.

At Step 506, if fan controller signal input 234 is not detecting a signal, then the fan controller proceeds to Step 507 to determine whether or not fan controller signal input 216 is active from thermostat signal heat "W" on terminal 208. If fan controller signal input 216 is active, the fan controller determines that the system type is a gas furnace HVAC system 100 operating in heating mode at Step 509. The fan controller then proceeds to Step 511 and goes to Step 601 fan controller gas furnace heating methods (FIG. 24) with the heat-source ON and fan controller output 212 de-energized with the blower fan 206 controlled by the OEM blower controller and operating at the default low or medium speed used for heating.

At Step 505, if fan controller signal input 214 is active from the thermostat fan signal 204 or the compressor signal on terminal 207, and then through Step 512 to Step 513 fan controller HPD signal input 234 is not detecting any type of signal, and at Step 515 fan controller signal input 216 from the thermostat heat "W" signal on terminal 208 is not active, and the fan controller is connected to a gas furnace HVAC system 100 at Step 516, then the fan controller proceeds to Step 531 and sets the system type to gas furnace HVAC system 100 operating in cooling mode. The fan controller then proceeds to Step 537 and goes to Step 901 fan controller cooling methods (FIG. 28) with cooling source ON.

The HPD input 234 is used to detect a heat pump HVAC system 100 by connecting the HPD input 234 to the hot side of the system transformer 210*b* or thermostat terminal 209 through wire 265 for a heat pump with reversing valve "O" normally energized for cooling (see FIG. 5) or a wire with a diode 275 for a heat pump with reversing valve "BR" normally energized for heating (see FIG. 6).

If at Step 513 the fan controller determines that input 234 is detecting a signal, then at Step 521, if the fan controller determines that the input signal 234 is rectified (i.e. indicating a diode 275 is present), and if at Step 525 the fan controller determines that the input 216 from thermostat signal HP REV "BR" 236 is active, then at Step 527 the fan controller determines that the system type is a heat pump HVAC system 100 operating in heating mode. The fan controller then proceeds to Step 529 and goes to Step 801 fan controller heat pump heating methods (FIG. 27) with the heat-source ON and fan controller fan output 212 de-energized with fan relay 205 OFF and blower fan 206 OFF.

At Step 525, if the fan controller does not detect an active input on fan controller signal input 216 from thermostat signal HP REV "BR" 236, then at Step 535 the fan controller determines that the system type is a heat pump HVAC system 100 operating in cooling mode. The fan controller then proceeds to Step 537 and goes to Step 901 fan controller cooling methods with cooling source ON (FIG. 28).

If the fan controller determines the HPD input 234 signal is detecting a signal at Step 513, either rectified or unrectified, and Step 521 determines the HPD input 234 signal is not rectified (no diode is connected), and Step 523 detects a floating signal on fan controller input 216 from thermostat signal HP REV "O" 235, then at Step 527 the fan controller determines the heat pump HVAC system 100 is operating in heating mode. The fan controller then proceeds to Step 529 and goes to Step 801 fan controller heat pump heating methods (FIG. 27) with the heat-source ON and fan controller fan output 212 de-energized with fan relay 205 OFF and blower fan 206 OFF.

Figure 28:
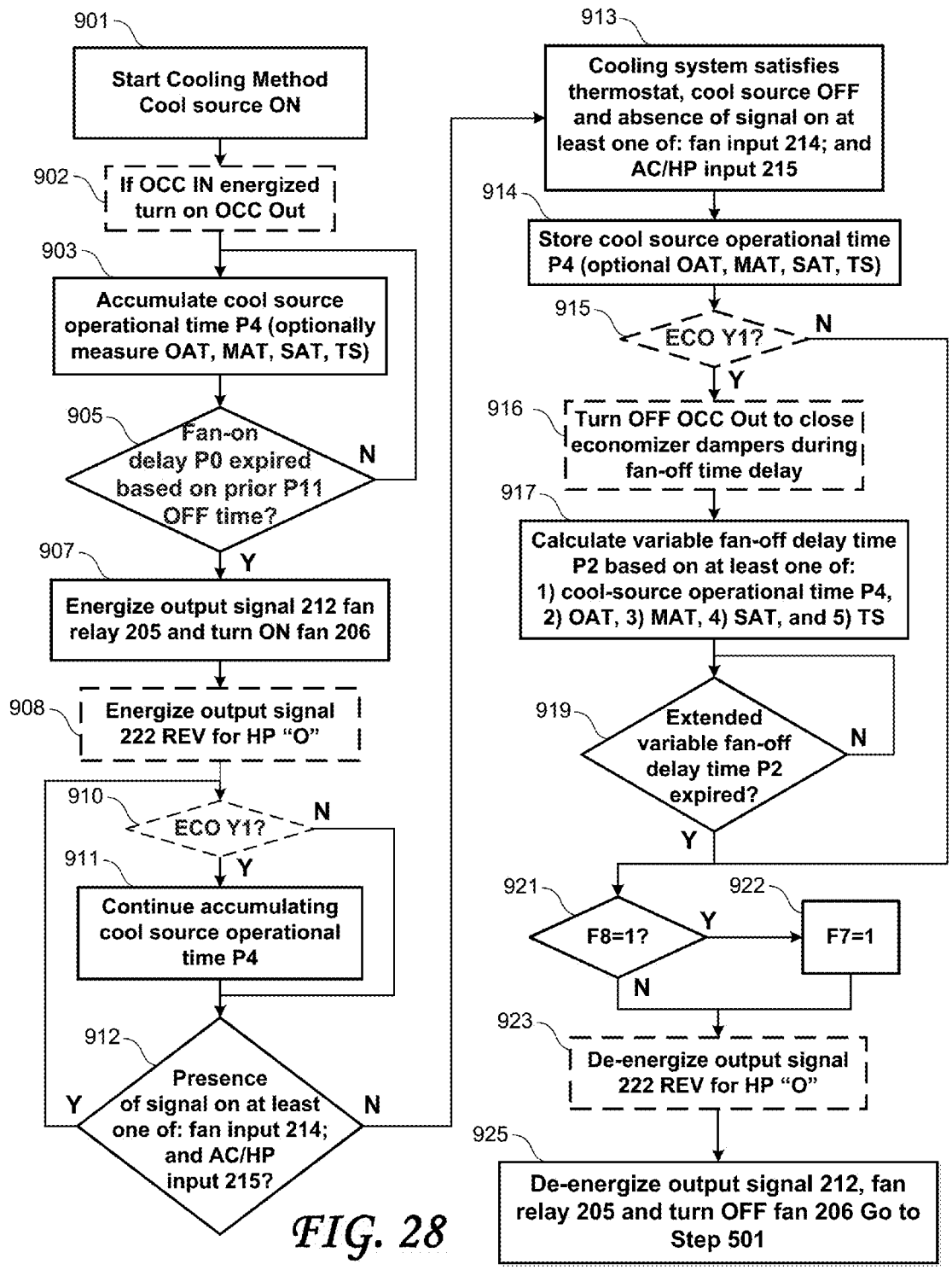
FIG. 28 shows a method for determining variable fan-on and fan-off time delays based on the cool-source operational time P4, according to the present invention.

At Step 523, if the fan controller detects an active input on 216 from thermostat signal HP REV "O" 235, then at Step 535 the fan controller determines the heat pump HVAC system 100 is operating in cooling mode, and at Step 537, the fan controller proceeds to Step 901 fan controller cooling methods with cooling source ON (FIG. 28).

Figure 24:
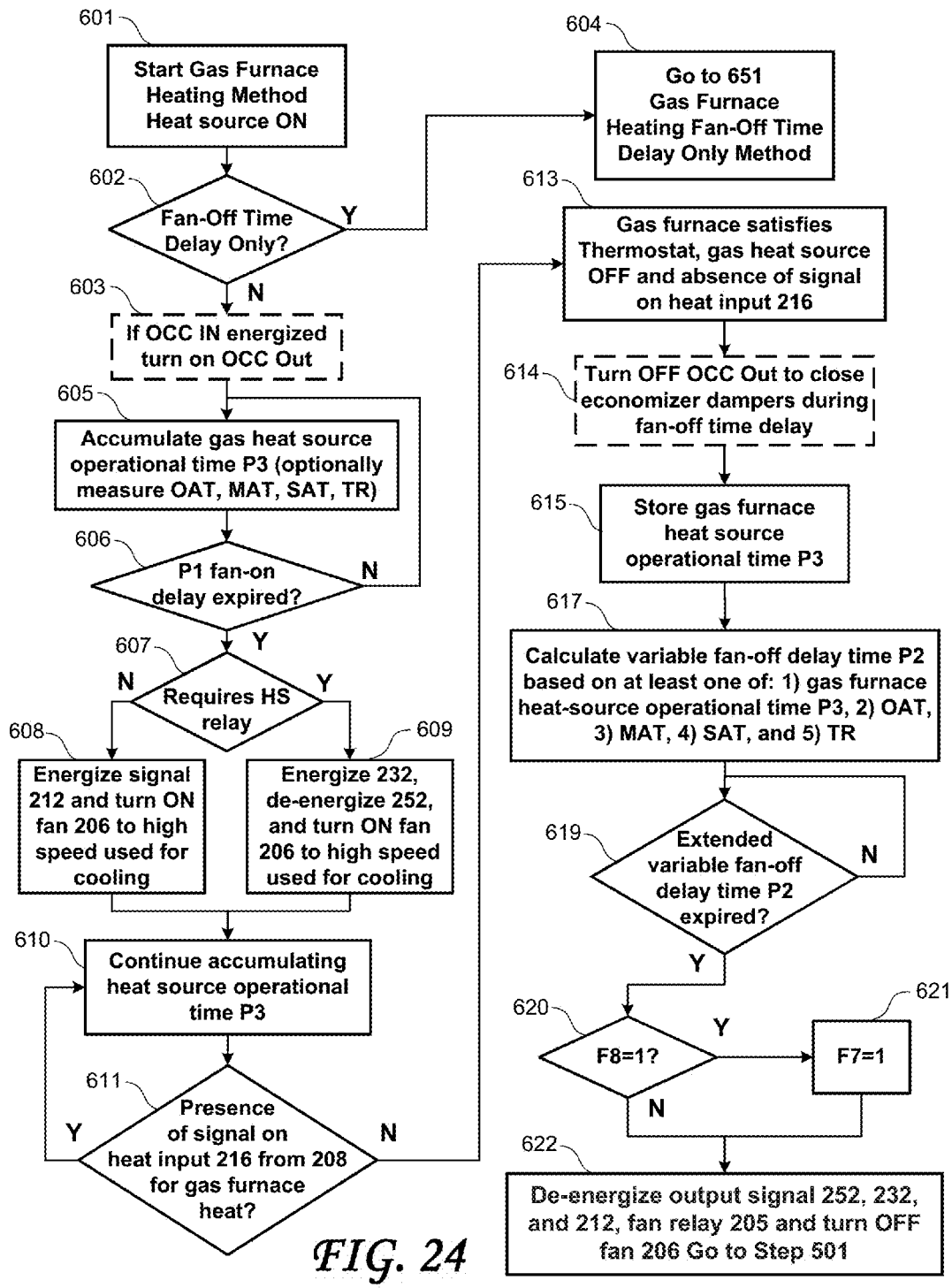
FIG. 24 shows a method for determining gas furnace fan-on time delay P1 to energize fan output 212 and fan relay 205 to turn on the fan 206 to the high speed used for cooling and determine the variable fan-off time delay P2 based on the heat-source operational time P3 for a gas furnace heating system, according to the present invention.

FIG. 24 shows a fan controller gas furnace heating method according to the present invention. At Step 601 the method starts with the heat-source ON. At Step 602, the method of installation determines if the HVAC system only has one fan-speed for heating and goes to Step 604 and Step 651 to perform the gas furnace heating fan-off time delay only method. At optional Step 603, if the fan controller is connected to an HVAC system with an economizer and occupancy sensor and if the Occupancy Signal Input (OCC IN) 219 is energized the fan controller will energize OCC OUT output 244 to enable the economizer.

At Step 605 the fan controller accumulates (i.e., measures) gas heat-source operational time P3. At Step 605, for HVAC systems with an economizer, the fan controller optionally measures OAT, MAT, SAT, and TR.

At Step 606 the fan controller determines whether or not the fan-on delay time period P1 has expired. The fan-on delay time period P1 is based on field and laboratory test data for how long it takes for the heat exchanger to reach a useful heating temperature required to deliver warm air to the conditioned space when the fan controller transitions the fan speed from the low speed used for heating to the high speed used for cooling.

In a preferred embodiment the fan-on delay time period P1 is 4 minutes, but P1 can vary or equal the heat-source operational time P3. For an embodiment where P1 is equal to P3, the fan controller output signal 222 is not energized until the thermostat is satisfied and the heat-source operational time P3 has ended. This is a default embodiment of a fan controller for a gas furnace HVAC system 100 with a one-speed fan/blower motor or a gas furnace HVAC system 100 where the low-voltage signal from the thermostat or equipment control terminal 204 controlling the fan relay 205 cannot switch the system fan/blower motor to the high fan speed used for cooling.

At Step 607, if the fan controller determines the HVAC system requires a high speed relay to operate the system fan/blower at high speed and the fan controller goes to Step 609 to energize the High-Speed Output (HS OUT) signal 232 to turn ON the system fan/blower 206 to high speed and de-energize Low-Speed Output (LS OUT) 252. Fan controller signal 232 connects the normally open contacts on switching device 316 and connected the high-voltage line input 233 to fan controller output 232 which then turns ON the high speed tap 15 to operate the system fan/blower 206 at the high speed used for cooling. At step 607, if a high speed relay is not required, the fan controller proceeds to Step 608 and energizes signal 212 to turn on the fan relay 205 and the system fan/blower 206. At Step 610, the fan controller continues to a loop to accumulate (or otherwise measure) heat-source operational time P3 until the thermostat 201 is satisfied and discontinues the call for heating. At Step 611 the Fan Controller checks if input 216 from a gas furnace heat-source on terminal 208 is ON. If Fan Controller input 216 is ON, the fan controller continues to accumulate heat-source operational time P3.

If at Step 611, the fan controller input 216 is OFF, then at Step 613 the fan controller determines that the gas furnace satisfies the thermostat and the heat-source is OFF. At optional Step 614 if the fan controller is connected to an HVAC system with an economizer and occupancy sensor, the fan controller turns OFF output Occupancy Output (OCC OUT) 242 to close the economizer dampers to reduce outdoor airflow into the economizer and HVAC system during the fan-off time delay P2 in order to maximize heat recovery from the heat exchanger and deliver as much heating capacity as possible to the building conditioned space. At Step 615 the fan controller stores the furnace heat-source operational time P3.

In FIG. 24 at Step 617 the fan controller calculates the variable fan-off time delay period P2 as a function of at least one of: 1) gas furnace heat-source operational time P3 based on signals present on thermostat or equipment terminals, 2) OAT, 3) MAT, 4) SAT, and 5) TR and the rate of change of these temperatures.

At Step 619 a loop provides the extended fan-off delay time P2 until P2 has expired. At optional Step 620, the fan controller examines the FAO F8 variable to determine if the gas furnace heating method 601 was entered from a condition where the fan was accidentally left on. If the fan was accidentally left on, the FDD method set the variable FAO F8 to "1". If the FAO F8 is a "1" the fan controller proceeds to Step 621. In Step 621 fan-on override, FO F7 variable is set to "1" which will later be used by the FDD method to turn off the fan. Step 621 proceeds to Step 622. If the FAO F8 variable is not set to "1" the fan controller proceeds to Step 622.

At Step 622, after P2 has expired, the fan controller de-energizes signal output signal 232 (HS OUT) and signal 252 (LS OUT) if using a high speed relay or de-energized FAN OUT 212, turning OFF the system fan/blower 206, and returns to Step 501 for the next cycle (FIG. 23).

Figure 25:
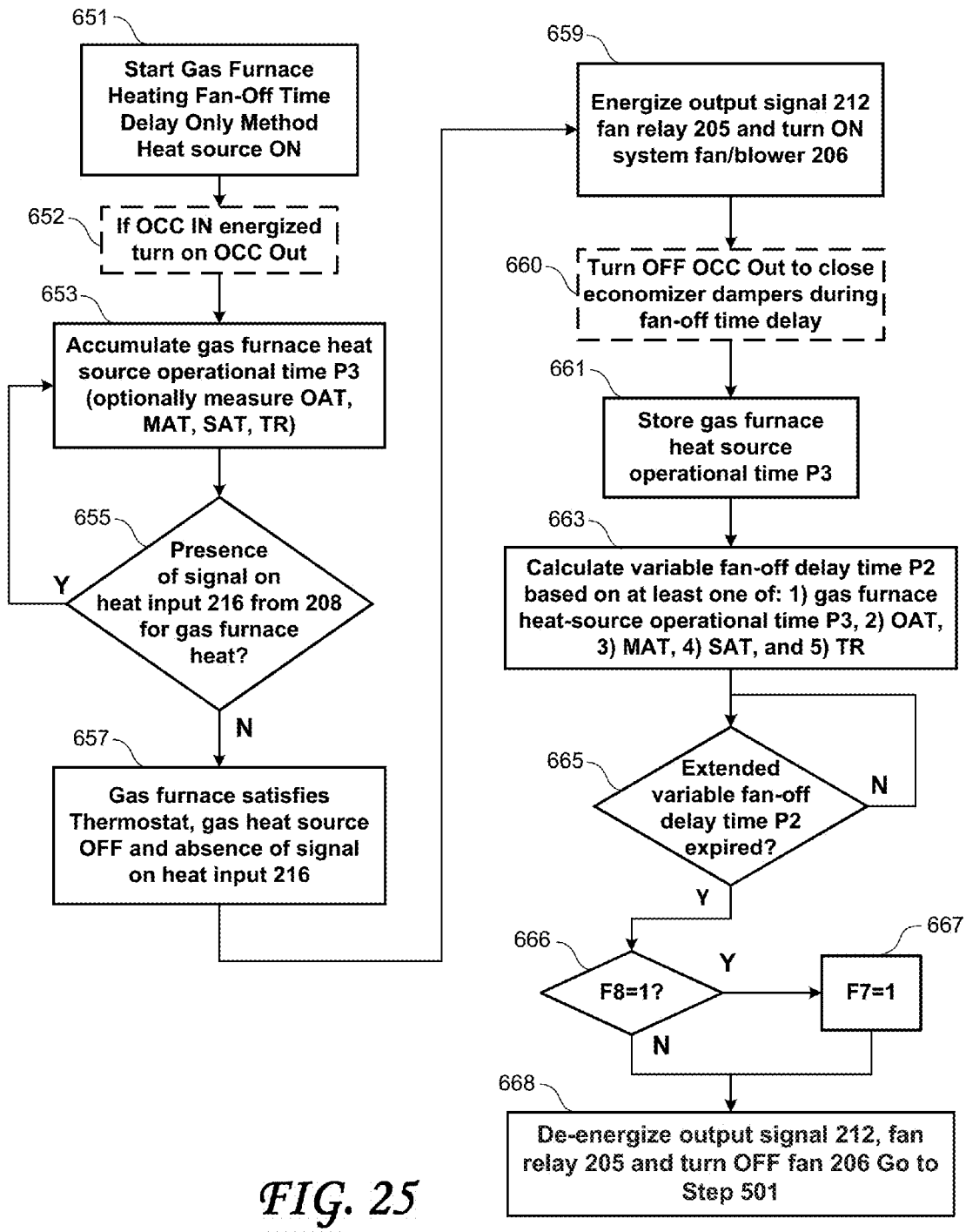
FIG. 25 shows a method for determining the variable fan-off time delay P2 based on the heat-source operational time P3 for a gas furnace heating system, according to the present invention

FIG. 25 shows a fan controller gas furnace heating fan-off time delay only method according to an embodiment of the present invention. This is the simplest embodiment of the present invention that works for any gas furnace HVAC system 100. FIG. 25 begins at Step 651 and starts the gas furnace heating fan-off time delay method with the heat-source ON. At optional Step 652, if the fan controller is connected to an HVAC system with an economizer and occupancy sensor and if OCC IN is energized, the fan controller energizes OCC OUT to enable the economizer.

At Step 653 the fan controller accumulates (i.e., measures) gas heat-source operational time P3. At Step 653, for HVAC systems with an economizer, the fan controller optionally measures OAT, MAT, SAT, and TR.

At Step 655 the fan controller checks if input 216 from the gas furnace heat-source on terminal 208 is ON. If fan controller input 216 is ON, then the fan controller continues to accumulate heat-source operational time P3. If at Step 655, the fan controller input 216 is OFF, then at Step 657 the fan controller determines that the gas furnace satisfied the thermostat based on an absence of a low-voltage signal on fan controller heat input 216, and the heat-source is OFF. At Step 659, after the gas furnace heat-source operational time P3 has expired, the fan controller energizes switch 301 which takes over control of the low-voltage fan signal from the thermostat"G" terminal (204) and provides a 24 VAC signal to fan controller output 212 which in turn activates the fan relay 205 and turns ON the system fan/blower fan 206. At optional Step 660 wherein the fan controller is connected to an HVAC system with an economizer and occupancy sensor, the fan controller turns OFF Occupancy Output (OCC OUT) 242 to close the economizer dampers to reduce outdoor airflow into the economizer and HVAC system during the fan-off time delay P2 in order to maximize heat recovery from the heat exchanger and deliver as much heating capacity as possible to the building conditioned space.

At Step 661, the fan controller stores the furnace heat-source operational time P3.

At Step 663, the fan controller calculates the variable fan-off delay time P2 based on at least one of: 1) gas furnace heat-source operational time P3 based on signals present on thermostat or equipment terminals, 2) OAT, 3) MAT, 4) SAT, and 5) TR and the rate of change of these temperatures.

At Step 665, a loop provides the extended fan-off delay time P2 until P2 has expired. At optional Step 666, the fan controller examines the FAO F8 variable to determine if the gas furnace heating fan-off time delay only method 651 was entered from a condition where the fan was accidentally left on. If the fan was accidentally left on, the FDD method set the variable FAO F8 to "1". If the FAO F8 is a "1" the fan controller proceeds to Step 667. In Step 667, fan-on override, FO F7 variable is set to "1" which will later be used by the FDD method to turn off the fan. Step 667 then proceeds to Step 668. If the FAO F8 variable is not set the fan controller proceeds to Step 668.

At Step 667, after P2 has expired, the fan controller de-energizes signal output 212, turns OFF the fan relay 205 and fan 206, and goes to Step 501 for the next cycle (FIG. 23).

Figure 26:
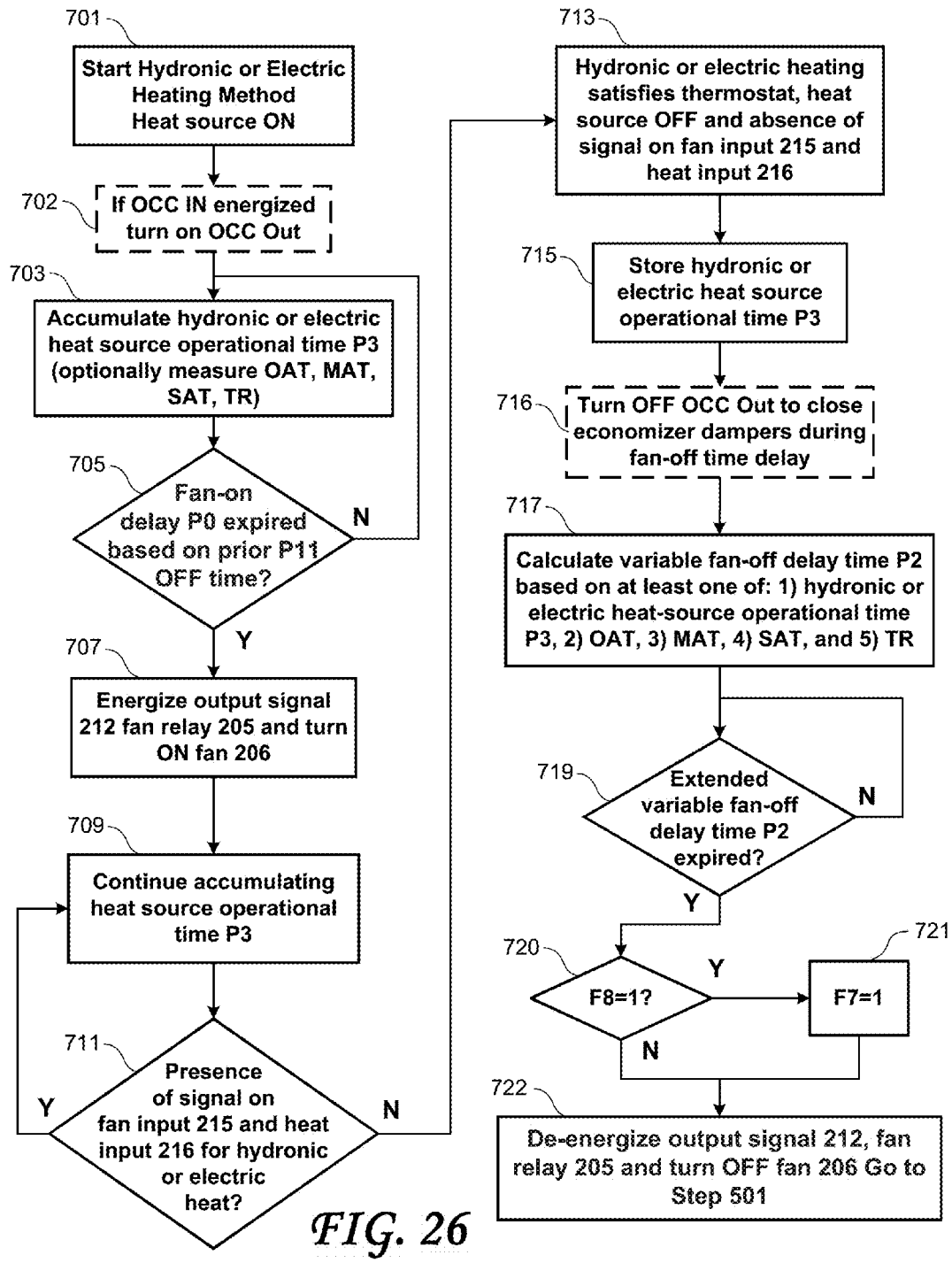
FIG. 26 shows a method for determining variable fan-on and fan-off time delays based on the heat mode operational time for a hydronic or electric resistance heating system, according to the present invention.

FIG. 26 shows a fan controller hydronic or electric heating method according to the present invention. At Step 701, the fan controller starts the hydronic or electric heating method with the heat-source ON. At optional Step 702, if the fan controller is connected to an HVAC system with an economizer and occupancy sensor and if OCC IN is energized, the fan controller energizes OCC OUT to enable the economizer.

At Step 703, the fan controller accumulates heat-source operational time P3. At Step 703, for HVAC systems with an economizer, the fan controller optionally measures OAT, MAT, SAT, and TR.

At Step 705, the fan controller determines whether or not the fan-on delay time P0 has expired based on the prior off-cycle duration P11. In one embodiment, if the hydronic or electric resistance heating system has been OFF for less than 5 minutes, then the fan-on delay time P0 is set to zero, and if the hydronic or electric resistance heating system has been OFF from 5 minutes to 30 minutes or longer, then the fan-on delay time can vary from 5 seconds minimum to 15 seconds maximum. The fan-on time delay P0 is increased from 0 to 15 seconds maximum based on off-cycle duration P11 because it takes longer for the heating coil (or electric resistance elements) to reach a useful heating temperature required to deliver warm air to the conditioned space. In another embodiment, the fan controller may set the fan-on time delay P0 to zero for any HVAC system 100 or mode of heating or cooling operation. In another embodiment, the fan controller may set the gas furnace heater fan-on time delay P1 to the heat-source operational time P3.

At Step 707, after the fan-on delay time P0 has expired, the fan controller energizes the switch 301 which provides a 24 VAC signal to fan controller output 212 which in turn activates the fan relay 205 and turns ON the blower fan 206. At Step 709 the fan controller initiates a loop that runs continuously to accumulate heat-source operational time P3 until the thermostat 201 is satisfied and discontinues the call for heating. At Step 711, the fan controller checks if the input signal 216 from terminal 208 is ON. If the fan controller input signal 216 is ON, the fan controller accumulates heat-source operational time P3. If fan controller input 216 is OFF, at Step 713 the fan controller determines that the hydronic or electric heating satisfies the thermostat. At Step 715 the fan controller stores heat-source operational time P3. At optional Step 716 wherein the fan controller is connected to an HVAC system with an economizer and occupancy sensor, the fan controller turns OFF output occupancy output (OCC OUT) 242 to close the economizer dampers to reduce outdoor airflow into the economizer and HVAC system during the fan-off time delay P2 in order to maximize heat recovery from the heat exchanger and deliver as much heating capacity as possible to the building conditioned space.

At Step 717, the fan controller calculates the variable fan-off delay time P2 based on at least one of: 1) hydronic or electric heat-source operational time P3 based on signals present on thermostat or equipment terminals, 2) OAT, 3) MAT, 4) SAT, and 5) TR and the rate of change of these temperatures.

At Step 719, the fan controller initiates a loop to operate the extended fan-off delay time until P2 has expired and when P2 has expired. At optional Step 720, the fan controller examines the FAO F8 variable to determine if the hydronic or electronic heating method 701 was entered from a condition where the fan was accidentally left on. If the fan was accidentally left on, the FDD method set the variable FAO F8 to "1". If the FAO F8 is a "1" the fan controller proceeds to Step 721. In Step 721, fan-on override, FO F7 variable is set to "1" which will later be used by the FDD method to turn off the fan. After Step 721, the fan controller proceeds to Step 722. If the FAO F8 variable is not set the fan controller proceeds to Step 722.

At Step 722, after the extended fan-off delay time P2 has expired, the fan controller de-energizes signal output 212, turns OFF the fan relay 205 and the fan 206, and returns to Step 501 for the next cycle (FIG. 23).

Figure 27:
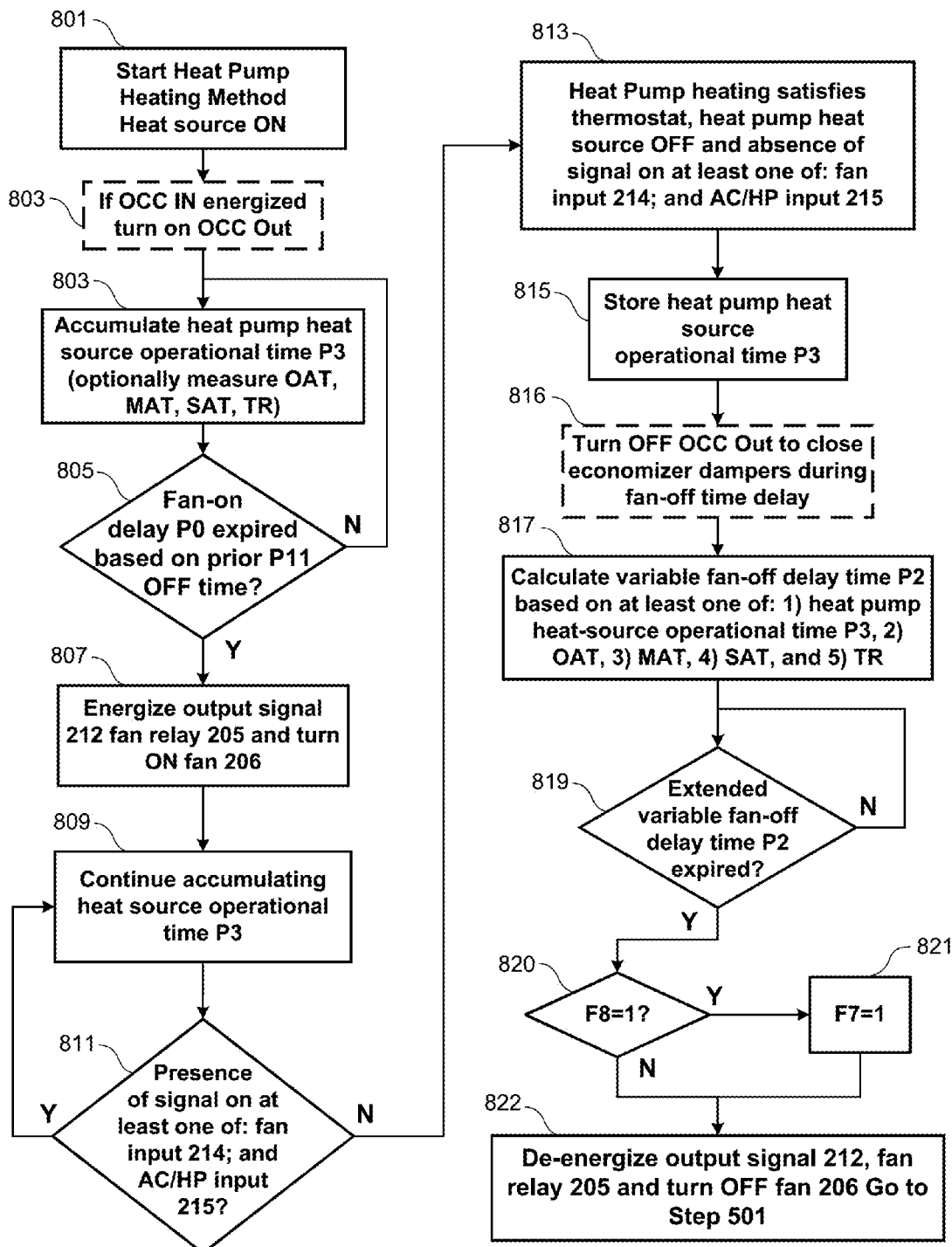
FIG. 27 shows a method for determining variable fan-on and fan-off time delays based on the heat mode operational time for a heat pump heating system, according to the present invention.

FIG. 27 shows a fan controller heat pump heating method according to the present invention. At Step 801, the fan controller starts the method with the heat pump heat-source ON. At optional Step 802, if the fan controller is connected to an HVAC system with an economizer and occupancy sensor and if OCC IN is energized, the fan controller energizes OCC OUT to enable the economizer.

At Step 803, the fan controller accumulates heat-source operational time P3. At Step 803, for HVAC systems with an economizer, the fan controller optionally measures OAT, MAT, SAT, and TR.

At Step 805, the fan controller determines whether or not the fan-on delay time P0 has expired based on prior off-cycle duration P11. In one embodiment, if the heat pump heating system has been OFF for less than 5 minutes, then the fan-on delay time P0 is set to zero, and if the heat pump heating system has been OFF from 5 minutes to 30 minutes or longer, then the fan-on delay time can vary from 5 seconds minimum to 15 seconds maximum. The fan-on time delay P0 is increased from 0 to 15 seconds maximum based on off-cycle duration P11 because it takes longer for the heating coil to reach a useful heating temperature required to deliver warm air to the conditioned space. In another embodiment, the fan controller may set the heat pump heating fan-on time delay P0 to zero.

At Step 807, after the fan-on delay time P0 has expired, the fan controller energizes switch 301 which drives a 24 VAC signal to fan controller output 212 which in turn activates the fan relay 205 and turns ON the blower fan 206. At Step 809 the fan controller initiates a loop which runs continuously to accumulate heat-source operational time P3.

At Step 811, the fan controller checks for the presence of a signal on at least one of: 1) fan input 214 from thermostat fan "G" terminal 204; and 2) AC/HP input 215 from the thermostat AC "Y" terminal 207. If either signal input 214 or 215 are ON, then the fan controller accumulates heat-source operational time P3 by continuing to loop through Step 811 and Step 809 until the thermostat 201 is satisfied and heating is discontinued.

If the heat pump enters a defrost cycle during heating mode, the fan controller signal inputs 214 (fan signal from thermostat "G" terminal 204) and 215 (AC/HP compressor signal from thermostat "Y" terminal 207) continues to be energized, but the reversing valve signal changes from heating to cooling mode (energized for "O" and de-energized for "BR") to operate the refrigeration cycle in reverse to defrost the outdoor coil. The fan controller allows the system to operate during the defrost cycle and continue to accumulate heat-source operational time P3. Defrost operation occurs when outdoor air temperatures are less than freezing (i.e., 32° F.). Lower outdoor air temperatures increase building heat losses and reduce heat pump condenser indoor-coil temperatures and heating energy available for heat recovery from extended fan operation after the heat-source has been de-energized (see FIG. 17). According to one embodiment of the present invention, the fan controller uses the heat-source operational time P3 as a proxy for lower OAT below freezing which causes defrost cycles to occur. The fan controller does not interfere with the heat pump defrost cycle. Nor does the heat pump defrost cycle interfere with the fan controller accumulation of heat-source operational time P3 used to calculate the extended fan-off time delay P2 to optimize heating efficiency.

If the fan controller determines that either of the fan controller signal inputs 214 or 215 are not energized, then the fan controller continues to Step 813 where the heat pump heating system satisfies the thermostat and the heat-source is OFF and the fan controller signal detects the absence a low-voltage signal on inputs 214 and 215.

At Step 815, the fan controller stores heat-source operational time P3.

At optional Step 816, wherein the fan controller is connected to an HVAC system with an economizer and occupancy sensor, the fan controller turns OFF output occupancy output (OCC OUT) 242 to close the economizer dampers to reduce outdoor airflow into the economizer and HVAC system during the fan-off time delay P2 in order to maximize heat recovery from the heat exchanger and deliver as much heating capacity as possible to the building conditioned space.

At Step 817, the fan controller calculates the fan controller variable fan-off delay time P2 based on at least one of: 1) heat pump heat-source operational time P3 based on signals present on thermostat or equipment terminals, 2) OAT, 3) MAT, 4) SAT, and 5) TR and the rate of change of these temperatures.

At Step 819, the fan controller initiates a loop to operate the extended fan-off delay time until P2 has expired.

At optional Step 820, the fan controller examines the FAO F8 variable to determine if the heat pump heating method 801 was entered from a condition where the fan was accidentally left on. If the fan was accidentally left on, the FDD method set the variable FAO F8 to "1". If the FAO F8 is a "1" the fan controller proceeds to Step 821. At Step 821, Fan-on Override, FO F7 variable is set to "1" which will later be used by the FDD method to turn off the fan. After Step 821 the fan controller proceeds to Step 822. If the FAO F8 variable is not set the fan controller proceeds to Step 822.

At Step 822, when P2 has expired, fan controller de-energizes fan signal output 212, to turn OFF the fan relay 205 and the fan 206, and returns to Step 501 for the next cycle (FIG. 23).

FIG. 28 shows a fan controller cooling method according to the present invention. At Step 901 the fan controller starts the method with the cool-source ON. At optional Step 902, if the fan controller is connected to an HVAC system with an economizer and occupancy sensor and if OCC IN is energized, the fan controller energizes OCC OUT to enable the economizer.

At Step 903, the fan controller accumulates cool-source operational time P4. At Step 903, for HVAC systems with an economizer, the fan controller optionally measures OAT, MAT, SAT, and TS.

At Step 905, the fan controller determines whether or not the fan-on delay time P0 has expired based on prior off-cycle duration P11. In one embodiment, if the cooling system has been OFF for less than 5 minutes, then the fan-on delay time P0 is set to zero, and if the cooling system has been OFF from 5 minutes to 30 minutes or longer, then the fan-on delay time can vary from 5 seconds minimum to 15 seconds maximum. The fan-on time delay P0 is increased from 0 to 15 seconds maximum based on off-cycle duration P11 because it takes longer for the cooling coil to reach a useful cooling temperature required to deliver cool air to the conditioned space. In another embodiment, the fan controller may set the cooling fan-on time delay P0 to zero.

At Step 907, after the fan-on delay time P0 has expired, the fan controller energizes switch 301 which drives a 24 VAC signal to fan controller output 212 which in turn activates the fan relay 205 and turns ON the blower fan 206.

At Step 908, for thermostats or controllers that de-energize the heat pump reversing valve at the end of the AC/HP compressor cooling operational time, the fan controller can optionally energize switch 304 which drives a 24 VAC signal to fan controller output 222 which in turn activates reversing valve 263 to maintain the normally energized position of the heat pump reversing valve 263 for the entire duration of the AC/HP compressor cool-source operational time and the fan-off time delay time period to maximize energy recovery.

At Step 910, the fan controller initiates a loop which runs continuously. If the ECO Y1I 231 signal is not energized, the economizer is using outdoor air to cool the conditioned space. At Step 910, if the fan controller determines outdoor air is being used, the fan controller skips to Step 921 and does not accumulate cool source operational time P4. In Step 910, if the fan controller determines that the compressor is ON, by detecting ECO Y1I 231 is energized, the fan controller proceeds to step 911 to accumulate cool-source operational time P4 until the thermostat 201 is satisfied and discontinues the call for cooling. At Step 912, the fan controller checks for the presence of a signal on at least one of: 1) fan input 214 from thermostat fan "G" terminal 204; and 2) AC/HP input 215 from the thermostat AC "Y" terminal 207. If either signal input 214 or 215 are ON, then the fan controller accumulates cool-source operational time P4. If the fan controller determines both signal inputs 214 or 215 are not energized, then the fan controller continues to Step 913 where the cooling system satisfies the thermostat and the cool source is OFF and the fan controller signal detects the absence a low-voltage signal on inputs 214 and 215. At Step 914 the fan controller stores cool-source operational time P4.

At Step 914, the fan controller can also optionally store the final OAT, MAT, SAT and TS temperature measurements.

At optional Step 915, the fan controller checks the economizer Y1 (ECO Y1) input signal indicating whether or not the AC compressor is de-energized in economizer mode. If ECO Y1 is de-energized (i.e., N), then the fan controller will go to Step 921 and provide no fan-off time delay since the evaporator would not be operating due to the economizer cooling the conditioned space without compressor cooling. At optional Step 915, if the ECO Y1 is energized (i.e., Y) then the fan controller goes to optional Step 916.

At optional Step 916 wherein the fan controller is connected to an HVAC system with an economizer and occupancy sensor, the fan controller turns OFF output occupancy output (OCC OUT) 242 to close the economizer dampers to reduce outdoor airflow into the economizer and HVAC system during the fan-off time delay P2 in order to maximize cooling recovery from the evaporator and deliver as much evaporative cooling capacity as possible to the building conditioned space.

At Step 917, the fan controller calculates the variable fan-off delay time P2 based on at least one of: 1) cool-source operational time P4 based on signals present on thermostat or equipment terminals, 2) OAT, 3) MAT, 4) SAT, and 5) TS and the rate of change of these temperatures.

At Step 919, the fan controller initiates a loop to operate the extended fan-off time delay P2 until it has expired. At Step 921, after P2 has expired, the fan controller de-energizes signal output 212, turns OFF the fan relay 205 and the fan 206.

At optional Step 921, the fan controller examines the FAO F8 variable to determine if the cooling method cool source on 901 was entered from a condition where the fan was accidentally left on. If the fan was accidentally left on, the FDD method set the variable FAO F8 to "1". If the FAO F8 is a "1" the fan controller proceeds to Step 922. In Step 922 fan-on override, FO F7 variable is set to "1" which will later be used by the FDD method to turn off the fan. After Step 922, the fan controller proceeds to Step 923. At Step 923, if the FAO F8 variable is not set to "1" the fan controller proceeds to Step 923. At Step 923, the fan controller can optionally de-energize output signal 222 to de-energize heat pump reversing valve 263.

At Step 925, the fan controller goes to Step 501 for the next cycle (FIG. 23).

Figure 29:
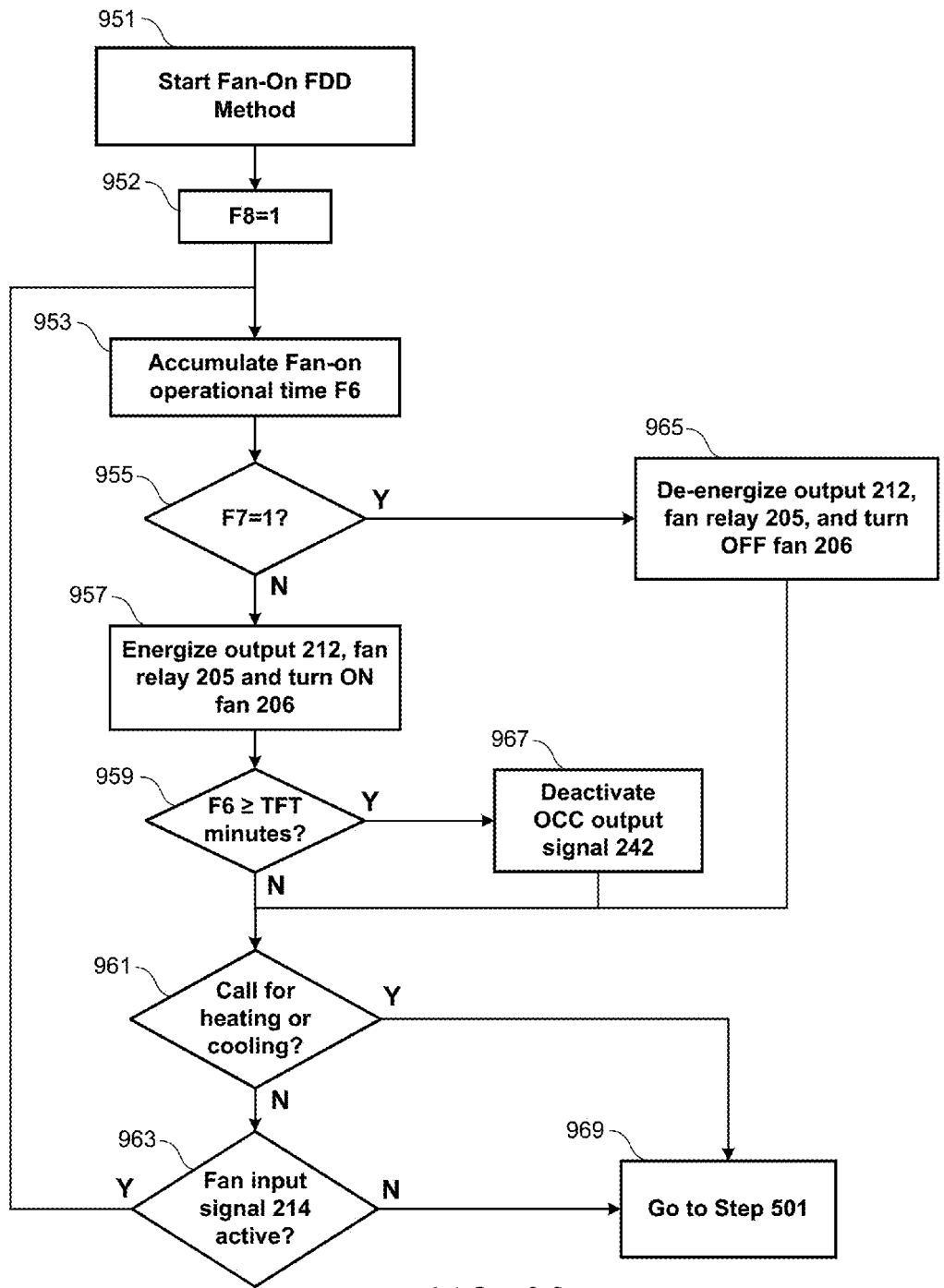
FIG. 29 shows a method for determining variable fan-on and fan-off time delays based on the cool-source operational time P4 and optionally energizing a heat pump (HP) reversing valve at the end of a cool-source operational time P4 to maintain low- and high-side refrigerant pressures and cold refrigerant temperature in the evaporator to maximize latent evaporative cooling during the fan-off time delay period P2, according to the present invention.

FIG. 29 shows a fan controller fan-on fault detection diagnostics method according to the present invention. At Step 951, the fan controller starts the method with the fan ON and no call for heating or cooling. At Step 952, the fan controller set the FAO F8 variable to "1" to indicate that the fan has been accidentally left on. This variable is examined at the end of all heating and cooling cycles to determine if the fan should be overridden to OFF while fan switch input 214 is energized. At Step 953, the fan controller accumulates fan-on operational time F6. At Step 953, the fan controller initiates a loop which runs continuously to accumulate the fan-on operational time F6 until the fan controller either receives a call for heating, a call for cooling, or the fan switch input 214 is de-energized. At Step 955 the fan controller determines whether or not the fan-on override FO F7 variable has been set to "1" by a previous heating or cooling cycle.

At Step 957, if the FO F7 variable is not set to "1", the fan controller energizes switch 301 which drives a 24 VAC signal to fan controller output 212 which in turn activates the fan relay 205 and turns ON the blower fan 206.

At Step 959, the fan controller determines if the fan-on time has exceeded the Threshold Fan-on Time TFT, in one embodiment, the TFT could be set to 10 minutes. If so, the fan controller proceeds to Step 967. If not the fan controller continues to Step 961.

At Step 961, the fan controller determines if there is a call for heating or cooling and if so, proceeds to Step 969. If there is not a call for heating or cooling, the fan controller continues to Step 963.

At Step 963, the fan controller determines if the fan signal input 214 is still energized and if so loops back to Step 953. If the fan switch input 214 is not active, the fan controller proceeds to step 969 and goes to Step 501 to determine system type and heating or cooling mode (FIG. 23).

At Step 965, if the FDD fan-on override variable FO F7 examined in Step 955 is set to a value of "1", based on a previous heating or cooling cycle where F7 is set to "1" to indicate that the fan 206 is accidentally turned ON with no call for heating or cooling and needs to be turned OFF. The fan controller in Step 965 de-energizes the output 212 which de-energizes the fan relay 205 and turns the fan 206 OFF. The fan controller then proceeds to Step 961 and continues the loop until there is a call for heating, a call for cooling, or the fan switch input 214 is de-energized. In this way, the fan controller will turn the system fan/blower 206 off if the thermostat fan switch is accidentally left in the ON position. For HVAC systems with economizers, the fan is turned off to save energy and prevent unconditioned outdoor air from entering the building through the economizer dampers which are automatically opened to the minimum damper position when the fan is operating to meet minimum outdoor air ventilation regulatory requirements. For HVAC systems without economizers, the fan is turned off to save energy and prevent unconditioned outdoor air from entering the building through fixed dampers which are always open to meet minimum outdoor air ventilation regulatory requirements.

During the cooling season, operating the fan continuously will cause frequent short cycling of the air conditioning compressor due to hot unconditioned outdoor air entering the building causing the indoor air temperature to increase above the thermostat set point. During the heating season, operating the fan continuously will cause frequent short cycling of the heat source due to cold unconditioned outdoor air entering the building causing the indoor air temperature to decrease below the thermostat set point.

At Step 959, the fan controller examines variable F6 and if the fan has been left on for greater than, a maximum fan-on threshold, MFT, for example 10 minutes, or some other threshold amount, then the fan controller will de-energize the OCC output 244 at Step 967. This operation causes the economizer 220 to close the outdoor air dampers and save energy by reducing unconditioned outdoor air from entering the building if the thermostat fan switch is accidentally left in the ON position.

Step 961 checks if the thermostat detects a call for heating or cooling. Step 963 checks if the fan input signal 214 is energized. This is the only exit from the fan-on fault detection diagnostics loop. At Step 969. the fan controller goes to Step 501 to determine system type and heating or cooling mode (FIG. 23).

Figure 32:
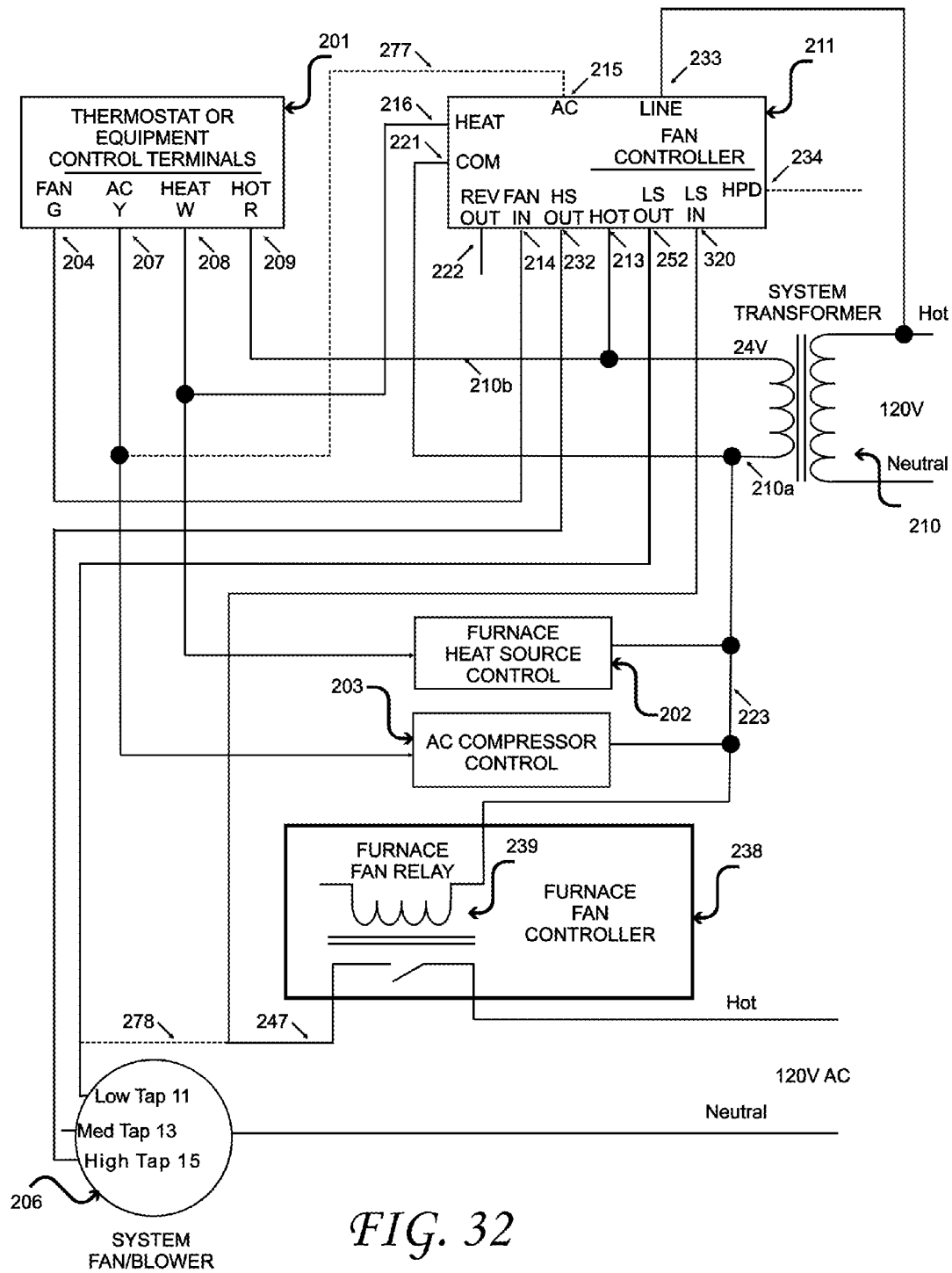
FIG. 32 shows a fan controller according to an embodiment of the present invention connected to a gas furnace HVAC system controlling the fan 206 speed using low- and high-voltage signals.

FIG. 32 shows a fan controller according to an embodiment of the present invention connected to a gas furnace HVAC system controlling the fan 206 using high-voltage signals. FIG. 32 is similar to FIG. 2. In FIG. 2, the system fan/blower 206 is controlled by the furnace controller 238 and the fan relay 205. FIG. 32 shows the fan controller taking direct control of the fan relay 206 using high-voltage signals. The high-voltage signal 247 from the furnace fan controller 238 would normally be connected to the low-speed tap 11 on the system fan/blower 206. FIG. 32 shows this normal connection broken by way of the dashed line 278. In this embodiment, the high-voltage signal 247 is connected to the fan controller 211 high-voltage input 320. The fan controller 211 input 230 is connected to the normally closed contacts of a switching relay inside the fan controller 211. The other side of the switching relay 252 is connected to the high-voltage low-speed tap 11 of the fan 206. This connection allows the furnace fan controller 238 to drive the fan 206 at a low speed during the time period P1.

The fan controller 211 has a high-voltage input 233 that connects to the line voltage. The input 233 is then connected to the normally open contacts of a switching relay to the output 232. During the time period P1, the fan controller 211 keeps both relays de-energized. This connects the furnace fan controller output 247 through the normally closed contacts to output 252 to the system fan/blower 206 low-speed tap 11. After time period P1 has expired, the fan controller 211 energizes both relays. This operation disconnects the high-voltage signal 247 from the furnace fan controller from the fan 206 low-speed tap 11, and connects the line voltage signal from fan controller 211 input 233 through normally open relay contact 232 to the fan 206 high-speed tap 15. This switches the fan 206 from low speed to high speed directly, rather than indirectly as in FIG. 2. After the fan-off delay P3, the fan controller de-energizes both relays and the high-voltage output 247 from the furnace fan controller 238 is re-established to the fan 206 low-speed tap ready for the next heating cycle. For air conditioning, the fan controller energizes both relays and directly drives the fan to high speed. An additional input to the fan controller 211 could be connected to the normally closed contact 335 of the switching relay 316 used to control the high-speed tap of the fan 206. This connection could from the signal going to the high-speed tap 15 from the fan relay. In this way, the fan controller could de-energize both relays 316 and 318 and all connections to the fan 206 would be intact in the event the fan controller failed, or if the thermostat was set to fan only operation.

Figure 33:
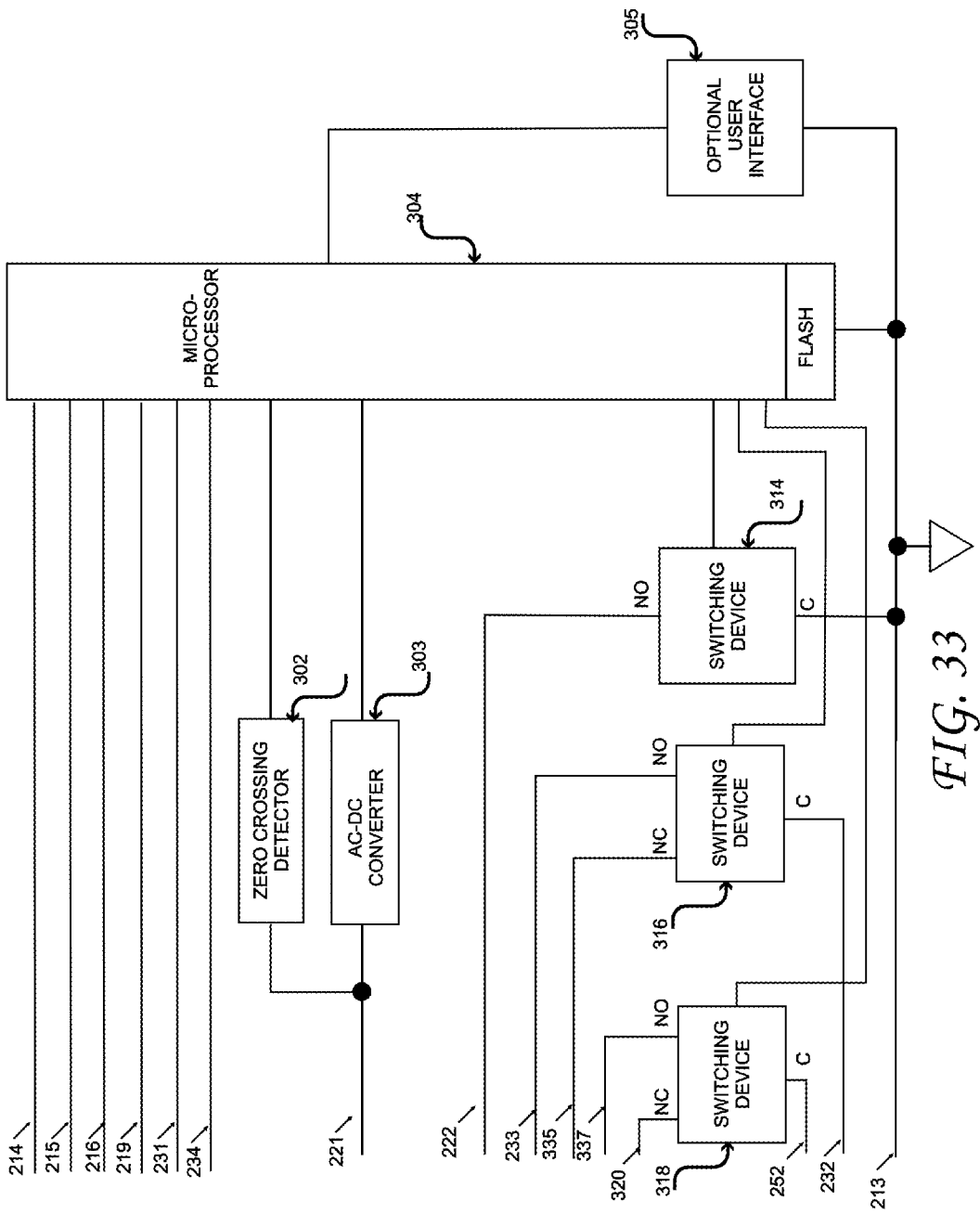
FIG. 33 shows elements of the fan controller according to an embodiment of the present invention with a two switching devices 316, and 318 which connect the fan controller high-voltage input signals 233 and 320 to the high-voltage taps 11 and 15 on the system fan/blower 206. These signals allow the fan 206 to operate is a low speed and then switch to a high speed after time period P1.

FIG. 33 shows elements of the fan controller according to an embodiment of the present invention with two switching devices 316, and 318 which connect the fan controller high-voltage input signals 233 and 320 to the high-voltage taps 11 and 15 on the system fan/blower 206. These signals allow the fan 206 to operate is a low speed and then switch to a high speed after time period P1.

Figure 34:
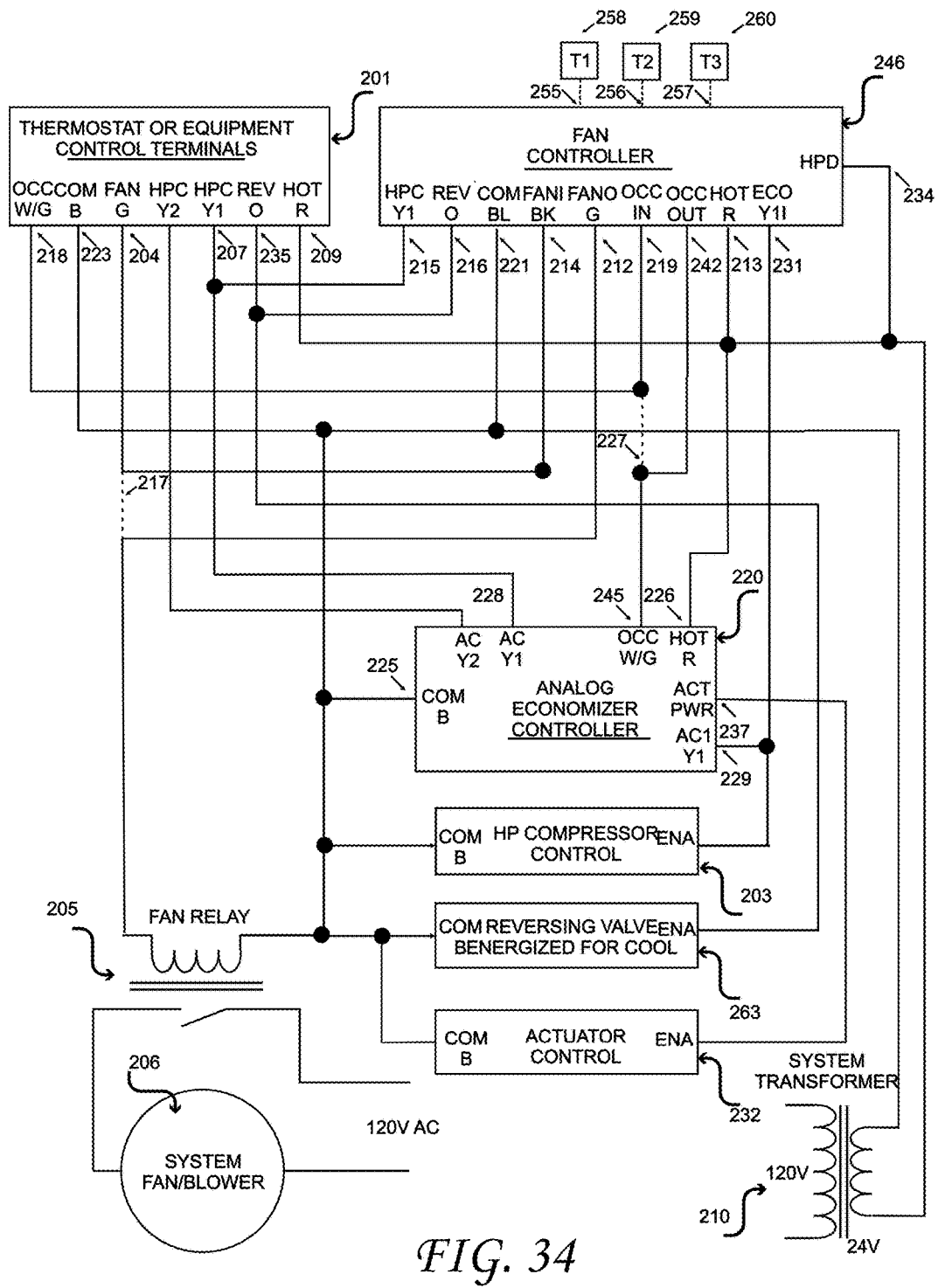
FIG. 34 shows a fan controller according to an embodiment of the present invention connected an HVAC system and economizer with an analog economizer control 220 and actuator control 232.

FIG. 34 shows a fan controller according to an embodiment of the present invention connected an HVAC system including an analog economizer controller 220 and an actuator 232. The economizer controller 220 provides voltage signals to the actuator 232 to open or close the economizer dampers to provide outdoor airflow into the HVAC system mixed air chamber. If the thermostat sends a signal to energize the cool source, i.e., compressor, in cooling mode and the outdoor air temperature is less than the economizer change over temperature, then the economizer controller 220 provides a maximum voltage signal, e.g., 10V, to actuator 232 to fully open the dampers and provide a maximum amount of outdoor airflow to the building without operating the cool source, i.e., air conditioning compressor. If the thermostat sends a signal to energize the cool source in cooling mode and the outdoor air temperature is greater than the economizer change over temperature, then the economizer controller 220 provides a minimum voltage signal to actuator 232, e.g., 2.8 to 6.1V, to open the dampers to the minimum damper position to provide a minimum amount of outdoor airflow, e.g., 15 to 50% outdoor air, to the building satisfy minimum outdoor airflow requirements while operating the cool source simultaneously. If the thermostat sends a signal to energize the heat source in heating mode, then the economizer controller 220 provides a minimum voltage signal to actuator 232, e.g., 2.8 to 6.1V, to open the dampers to the minimum damper position to provide a minimum amount of outdoor airflow, e.g., 15 to 50% outdoor air, to the building satisfy minimum outdoor airflow requirements while operating the heat source simultaneously. The minimum damper position allows outdoor air to mix with return air to meet minimum indoor air quality requirements in the occupied space.

If the fan controller uses Fault Detection Diagnostics (FDD) to determine whether or not the HVAC system fan is operating continuously prior to the thermostat calling for cooling or heating. If the fan is operating continuously prior to the thermostat calling for heating or cooling, then the economizer opens the dampers to a minimum open position to provide unconditioned outdoor airflow into the HVAC system and building. This can cause the building conditioned space temperature to increase above the thermostat set point in cooling mode or cause the conditioned space temperature to decrease below the thermostat set point in heating mode. If the outdoor air temperature is 20 degrees Fahrenheit (F) above the cooling set point or 20F below the heating set point and the fraction of outdoor airflow is 15 to 60% of the total system airflow, then the cool source or heat source can turn ON and OFF frequently causing a well-known fault referred to as "short cycling" characterizing an ON-OFF frequency of approximately 5 minutes. The fan controller uses FDD to de-energize the OCC OUT 242 and as outlined above, closes the dampers to a fully closed position, after a Threshold Fan-on Time (TFT). In one embodiment the TFT is approximately 10 minutes or adjustable based on Outdoor Air Temperature (OAT), TR, TS, occupancy sensor signals, an indoor air quality requirement, or user inputs. With the dampers closed, less unconditioned outdoor air is drawn into the economizer dampers, HVAC system, and building conditioned space when the fan is operating and this reduces the frequency and duration of cool-source operational time P4 and heat-source operational time P3.

In cooling mode the fan controller 246 monitors the AC1 Y1 237 signal from the economizer controller 220. If the fan controller input signal ECO Y1I 231 is not energized when the thermostat is calling for cooling, then the fan controller determines that the economizer controller 232 is enabling economizer cooling only without the compressor operating. At the end of the cooling cycle the fan controller can either add additional time to the fan-off time delay period P2 to supply more cool air to the occupied space or terminate the cooling cycle with no additional fan-off time delay period P2.

If the fan controller input 231 is energized when the thermostat is calling for cooling, then the fan controller determines that the HVAC system is using mechanical cooling to satisfy the thermostat. In this event, the fan controller waits until the thermostat has been satisfied and then de-energizes the OCC OUT 242 signal to close the economizer dampers while energizing the FANO G 212 signal for the entire fan-off time delay period P2. De-energizing the OCC OUT 242 output removes the signal from the economizer input OCC W/G 245 and signals the economizer that the conditioned space is unoccupied to close the dampers during the fan-off time delay period P2 after the cool source operational time P4.

Closing the dampers during the fan-off time delay period P2 allows the fan controller to recover more evaporatively cooled air from the air conditioning evaporator coil with only outdoor airflow that leaks into the economizer dampers when they are closed.

The economizer perimeter gap 126 of the economizer frame where it connects to the HVAC system cabinet allows unintended, uncontrolled, and unconditioned outdoor airflow to enter the economizer, HVAC system, and conditioned space whether or not the ventilation fan is operating. The economizer hood must be removed in order to properly seal the economizer perimeter gap.

Sealing around the perimeter gap of the economizer frame where it connects to the HVAC system cabinet can be performed with at least one of: adhesive tape sealant, adhesive sealant, mastic sealant, or weatherstripping to reduce untended outdoor air leakage through the economizer perimeter frame to allow the fan controller to recover more evaporatively cooled air from the air conditioning evaporator coil during the fan-off time delay period P2 in cooling mode.

In another embodiment, the fan controller 245 OCC OUT 244 signal can be connected to the economizer HOT R input 226. This configuration is used for economizers without an occupancy input. In another embodiment, the fan controller 245 OCC OUT 244 signal can be connected to the actuator control 232 HOT R input which when de-energized, will cause the actuator control to use an internal spring return mechanism to fully close the dampers.

When the HVAC system is operating in heating mode, the economizer opens the dampers to a minimum open position for the duration of the heat source operational time P3. When the fan controller determines that the system is in heating mode, the fan controller energizes the FANO G 212 and the OCC OUT 242. When the heat source operational time P3 has ended, the fan controller de-energizes the OCC OUT 242 to close the economizer dampers. Closing the dampers during the fan-off time delay period P2 allows the fan controller to recover more heat from the heat exchanger during the fan-off time delay period P2 following the heat source operational time P3.

Sealing around the perimeter gap of the economizer frame where it connects to the HVAC system cabinet with adhesive tape sealant, adhesive sealant, mastic sealant, or weather-stripping will reduce untended outdoor air leakage through the economizer perimeter frame to allow the fan controller to recover more heat from the heat source during the fan-off time delay period P2 in heating mode.

If the fan controller uses Fault Detection Diagnostics (FDD) to determine whether or not the HVAC system fan is operating continuously prior to the thermostat calling for cooling or heating. If the fan is operating continuously prior to the thermostat calling for heating or cooling, then the economizer opens the dampers to a minimum open position to provide unconditioned outdoor airflow into the HVAC system and building. This can cause the building conditioned space temperature to increase above the thermostat set point in cooling mode or cause the conditioned space temperature to decrease below the thermostat set point in heating mode. If the outdoor air temperature is 20 degrees Fahrenheit (F) above the cooling set point or 20 F below the heating set point and the fraction of outdoor airflow is 15 to 60% of the total system airflow, then the cool source or heat source can turn ON and OFF frequently causing a well-known fault referred to as "short cycling" characterizing an ON-OFF frequency of approximately 5 minutes. The fan controller uses FDD to de-energize the OCC OUT 242 and as outlined above, closes the dampers to a fully closed position, after a Threshold Fan-on Time (TFT). In one embodiment the TFT is approximately 10 minutes. With the dampers closed, less unconditioned outdoor air is drawn into the economizer dampers, HVAC system, and building conditioned space when the fan is operating and this reduces the frequency and duration of cool-source operational time P4 and heat-source operational time P3.

If the fan is operating continuously but the fan-only operational time does not reach the TFT before the thermostat calls for cooling or heating, then the fan controller FDD will de-energize the FANO G 212 signal after the fan-off time delay P2 following the cool-source operational time P4 or heat-source operational time P3. This embodiment of the fan controller FDD turns the system fan/blower 206 OFF even though the thermostat fan switch is in the ON position. This saves energy in two ways: 1) the fan is no longer operating and continuously drawing electric power, and 2) the fan is no longer causing unconditioned outdoor airflow into the building through the economizer dampers which can cause unnecessary thermostat calls for cooling or heating or "short cycling."

In one embodiment, the fan controller 245 can provide a user interface to select whether or not the fan turns off after a fan-off time delay P2 following a cool-source operational time P4 or a heat-source operational time P3 for maximum energy efficiency. In another embodiment the fan controller 245 can provide a user interface to select whether or not the dampers can be positioned to a fully closed position during continuous fan operation to reduce unconditioned outdoor airflow into the building through the economizer dampers which can cause unnecessary thermostat calls for cooling or heating or "short cycling."

In another embodiment, the fan controller 245 can close the dampers as described above during the cool-source or heat-source operation to save even more energy by reducing the introduction of unconditioned outdoor airflow during the cool-source or heat-source operational time. This embodiment can be used in conjunction with wireless or wired demand response technologies to reduce peak cooling or peak heating demand.

In another embodiment, one or more temperature sensors T1 258, T2 259, T3 260 can be connected to the fan controller 245. The temperature sensors can be placed in locations to measure outdoor air temperature (OAT), mixed air temperature (MAT) entering the heat exchanger heat source or evaporator cool-source, and supply air temperature (SAT) and the rate of change of these temperatures. The fan controller can use these temperature sensors to calculate the heating temperature rise (TR) as the difference between SAT and MAT in heating mode and the rate of change of TR. The fan controller can also use these temperature sensors to calculate the cooling temperature split (TS) as the difference between MAT and SAT in cooling mode and the rate of change of TS. The MAT entering the heat exchanger or evaporator is not equal to the conditioned space temperature due to return duct heat transfer and outdoor air leakage from attics, crawl spaces, garages, plenums, or economizers. In this embodiment, the cooling fan-off time delay P2 can be calculated as a function of at least one of the following independent variables: 1) cool-source operational time P4, 2) OAT, 3) MAT, 4) SAT, 5) TS, and 6) TT and the rate of change of these temperatures. In this embodiment, the heating fan-off time delay P2 can be calculated as a function of at least one of: 1) heat-source operational time P3, 2) OAT, 3) MAT, 4) SAT, 5) TR, 6) TT, and 7) HHWST and the rate of change of these temperatures.

In another embodiment, the fan controller can use these temperature measurements or the difference between these measurements or the rate of change of any or all of these temperature measurements to lengthen or reduce the fan-off time delay period P2 after the cool-source operational time P4 or the heat-source operational time P3.

Figure 35:
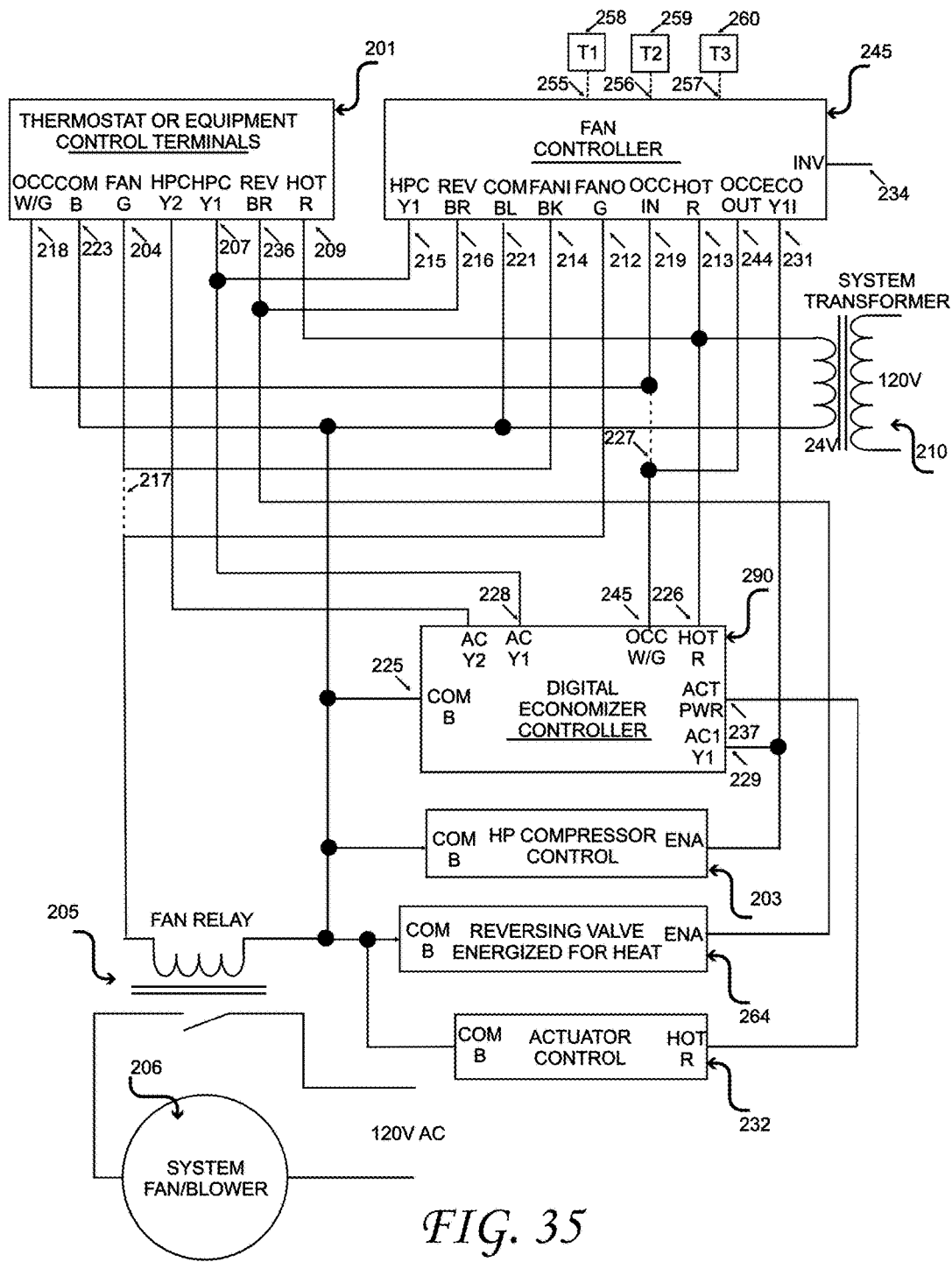
FIG. 35 shows a fan controller according to an embodiment of the present invention connected an HVAC system and economizer with a digital economizer control 290 and actuator control 232.

FIG. 35 shows a fan controller according to an embodiment of the present invention connected to HVAC system with a digital economizer 290 and actuator control 232. This figure is similar to FIG. 34 and the operation is similar.

Figure 36:
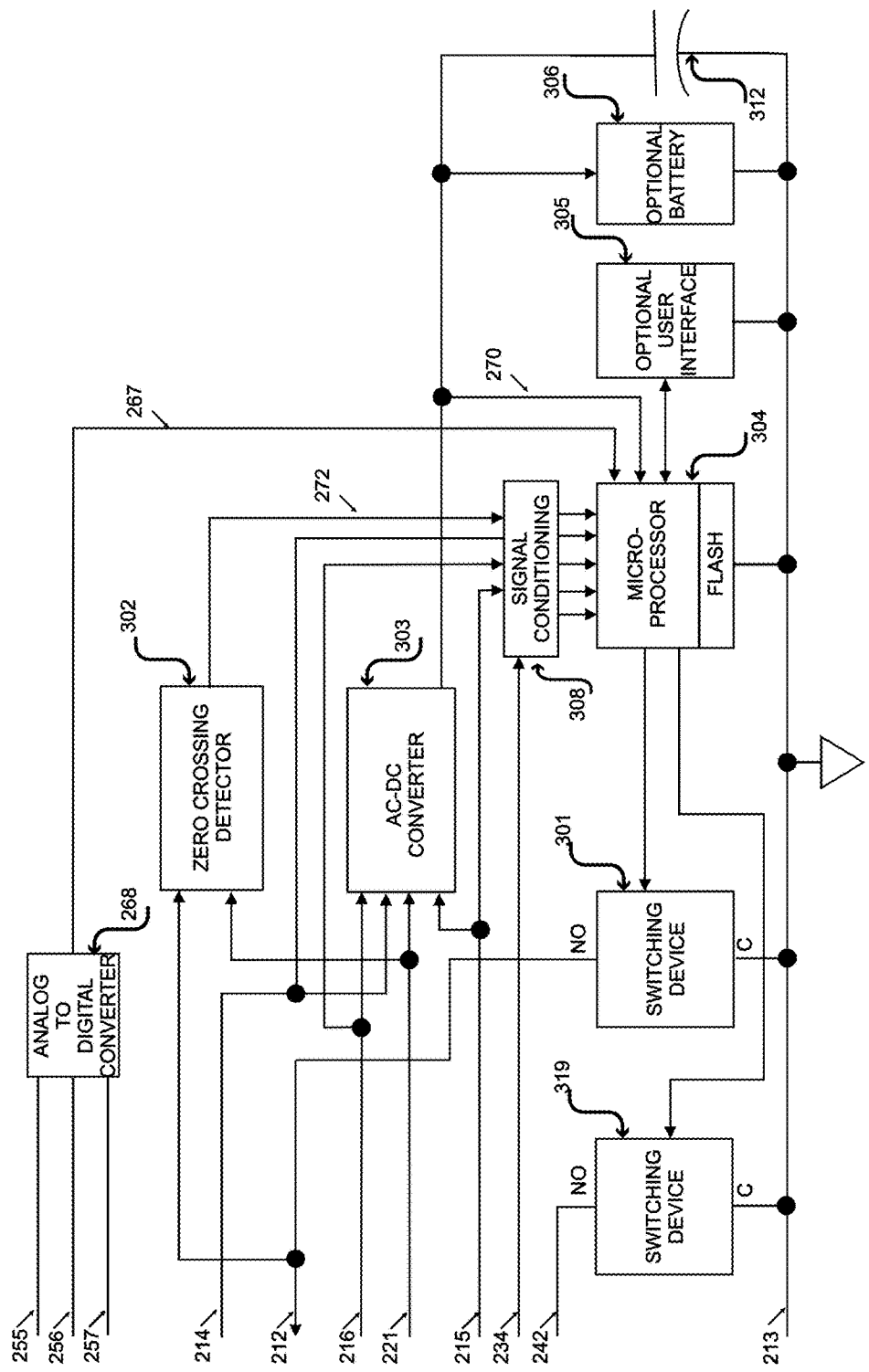
FIG. 36 shows elements of the fan controller according to an embodiment of the present invention with a second switching device 319 which connects the fan controller ground lead 213 which is the transformer hot lead 211b to an analog economizer control 220 or digital economizer control 290 and occupancy input 245 to control the actuator control 232 and economizer damper position.

FIG. 36 shows elements of the fan controller embodiment with a second switching device 319 which connects the fan controller ground lead 213 which is the transformer hot lead 211b to the economizer 220 OCC W/G 245 to control the actuator control 232 damper position. As described above, the switching device 319 can be connected to not only the OCC W/G 244 input of the economizer 220, but also to the HOT R 226 input or the actuator control 232 HOT R input. These embodiments allow the fan controller 245 to close the economizer dampers. Optional temperature sensors are connected to the fan controller through leads 255, 256, and 257. Analog to digital converter 268 converts the analog temperature readings into digital information for the microprocessor 304 to process and calculate the fan-off time delay P2.

While the present invention has been described as apparatus and methods for a fan controller, the apparatus and methods described above may be integrated into a thermostat, economizer controller, equipment controller, or any device including these apparatus and/or methods as intended to provide similar embodiments of the present invention.

While the invention herein disclosed has been described by means of specific embodiments and applications thereof, numerous modifications and variations can be made thereto by those skilled in the art without departing from the scope of the invention set forth in the claims.

LIST OF ELEMENTS

1—a display on the thermostat 200 embodiment.
2—a home button on the thermostat 200 embodiment.
3—an up button on the thermostat 200 embodiment.
4—a curve representing the delivered heating efficiency for a gas furnace HVAC system 100 with the known fixed fan-off time delay and low fan speed operation.
5—a down button on the thermostat 200 embodiment.
6—a curve representing the increase in delivered heating efficiency for the same gas furnace HVAC system 100 with the fan controller switching the blower fan from the low fan speed used for heating to the high fan speed used for cooling plus extended variable fan-off time delay P2 based on heat-source operational time P3.
7—a screen button on the thermostat 200 embodiment.
8—a curve representing the delivered sensible cooling efficiency for a direct-expansion air conditioning system with a known fixed fan-off time delay.
9—an occupancy sensor on the thermostat 200 embodiment.
10—a curve representing the increase in sensible cooling efficiency for the same direct-expansion air conditioning system with the fan controller providing an extended variable fan-off time delay P2 based on cool-source operational time P4.
11—a high-voltage low-speed tap on the system fan/blower 206 which when activated by line voltage drives the fan to a low speed.
12—a curve representing the delivered sensible heating efficiency COP for a heat pump or hydronic HVAC system 100 in heating mode with no fan-on time delay representing the negative value in sensible heating that occurs when the system fan/blower is activated before a heat pump or hydronic system has generated useful heat and no fan-off time delay.
13—a high-voltage medium-speed tap on the system fan/blower 206 which when activated by line voltage drives the fan to a medium speed.
14—a curve representing the increase in delivered heating efficiency COP for the same heat pump or hydronic HVAC system 100 in heating mode with the fan controller providing a short variable fan-on time delay based on the off-cycle duration P11 and an extended variable fan-off time delay P2 based on heat-source operational time P3 to increase delivered heating capacity and efficiency for the heat pump or hydronic heating system.
15—a high-voltage high-speed tap on the system fan/blower 206 which when activated by line voltage drives the fan to a high speed.
16—a curve representing the temperature rise above the return air temperature generated in a gas forced-air furnace operating for an equivalent heat-source operational time P3 and variable fan-only operational time P2.
18—a curve representing the temperature rise above the return air temperature generated in a hydronic heating system with supply water temperature of 140° F. operating for 10 minutes of heat-source operational time P3 and variable fan-only operational time P2.
20—a curve representing the temperature rise above the return air temperature generated in a hydronic heating system with supply water temperature of 130° F. operating for 10 minutes of heat-source operational time P3 and variable fan-only operational time P2.
22—a curve representing the temperature rise above the return air temperature generated in an electric resistance heating system operating for 10 minutes of heat-source operational time P3 and variable fan-only operational time P2.
24—a curve representing the temperature rise above the return air temperature generated in a heat pump system with an outdoor air temperature of 47° F. operating for 10 minutes of heat-source operational time P3 and variable fan-only operational time P2.
26—a curve representing the temperature rise above the return air temperature generated in a heat pump system with an outdoor air temperature of 17° F. operating for 10 minutes of heat-source operational time P3 and variable fan-only operational time P2.
27—a curve representing the temperature rise above the return air temperature generated in a heat pump system with an outdoor air temperature of 0° F. operating for 10 minutes of heat-source operational time P3 and variable fan-only operational time P2.
28—a curve representing the temperature rise above the return air temperature generated in a gas forced-air furnace with equivalent heating output to satisfy the thermostat based on varying the heat-source operational time P3 and variable fan-only operational time P2 for the fan control.
30—a curve representing the temperature rise above the return air temperature generated in a hydronic heating system with supply water temperature of 140° F. with equivalent heating output to satisfy the thermostat based on varying the heat-source operational time P3 and variable fan-only operational time P2 for the fan control.
32—a curve representing the temperature rise above the return air temperature generated in a hydronic heating system with supply water temperature of 130° F. with equivalent heating output to satisfy the thermostat based on varying the heat-source operational time P3 and variable fan-only operational time P2 for the fan control.
34—a curve representing the temperature rise above the return air temperature generated in an electric resistance heat furnace with equivalent heating output to satisfy the thermostat based on varying the heat-source operational time P3 and variable fan-only operational time P2 for the fan control.
36—a curve representing the temperature rise above the return air temperature generated in a heat pump system with an outdoor air temperature of 47° F. with equivalent heating output to satisfy the thermostat based on varying the heat-source operational time P3 and variable fan-only operational time P2 for the fan control.
38—a curve representing the temperature rise above the return air temperature generated in a heat pump system with an outdoor air temperature of 17° F. with equivalent heating output to satisfy the thermostat based on varying the heat-source operational time P3 and variable fan-only operational time P2 for the fan control.
40—a curve representing the temperature rise above the return air temperature generated in a heat pump system with an outdoor air temperature of 0° F. with equivalent heating output to satisfy the thermostat based on varying the heat-source operational time P3 and variable fan-only operational time P2 for the fan control.
50—a curve showing a known fan control with constant fan operation during unoccupied periods of time causing over ventilation and constant fan power consumption and increased heating power consumption.
52—a curve showing unoccupied fan-off control reduces fan and heating power consumption and energy usage according to an embodiment of the present invention.

54—a curve showing a known fan control with constant fan operation during unoccupied periods of time causing over ventilation and constant fan power consumption and increased cooling power consumption.

56—a curve showing unoccupied fan-off control reduces fan and cooling power consumption and energy usage according to an embodiment of the present invention.

57—a curve representing the energy efficiency of a gas furnace heating system with known control.

58—a curve representing the energy efficiency of a gas furnace with heater ventilation fan-off time delay operation for as long as the current dT/dt is greater than a constant, C1, multiplied times a previous heating off-cycle dT/dt-off1 according to the present invention.

59—a curve representing the energy efficiency of a gas furnace with heater ventilation fan-off time delay operation for as long as the current dT/dt is greater than a constant, C1, multiplied times a previous heating off-cycle dT/dt-off2 according to the present invention.

60—a curve representing indoor thermostat temperature for the on and off cycles of a gas furnace heating system.

63—a curve representing the energy efficiency of an air conditioning cooling system with known control.

64—a curve representing the energy efficiency of an air conditioning cooling system with cooling ventilation fan-off time delay operation for as long as the current dT/dt is less than a constant, C2, multiplied times a previous cooling off-cycle dT/dt-off1 according to the present invention.

65—a curve representing the energy efficiency of an air conditioning cooling system with cooling ventilation fan-off time delay operation for as long as the current dT/dt is less than a constant, C2, multiplied times a previous cooling off-cycle dT/dt-off2 according to the present invention.

66—a curve representing indoor thermostat temperature for the on and off cycles of an air conditioning cooling system.

70—a curve representing laboratory test data of cooling temperature split (° F.) across the evaporator (i.e., entering evaporator air dry-bulb temperature minus leaving evaporator dry-bulb temperature) for 5 minutes of cool-source operational time P4 and a 3-minute fan-off time delay P2 providing a 32% efficiency improvement compared to the same unit with no time delay.

72—a curve representing field test data of cooling temperature split (° F.) across the evaporator for 10 minutes of cool-source operational time P4 and a 4-minute fan-off time delay P2 providing a 15% efficiency improvement compared to the same unit with no time delay.

74—a curve representing field test data of cooling temperature split (° F.) across the evaporator for 15 minutes of cool-source operational time P4 and a 4-minute fan-off time delay P2 providing a 10% efficiency improvement compared to the same unit with no time delay.

76—a curve representing field test data of cooling temperature split (° F.) across the evaporator for 15-minutes of cool-source operational time P4 and an 8.5-minute fan-off time delay P2 providing a 6% efficiency improvement compared to the same unit with no time delay. The 8.5-minute (extra 4.5-minutes compared to curve 74) of fan-off delay reduced sensible efficiency by 34%.

80—a curve representing laboratory test data of sensible EER and total power (kW) for 5 minutes of cool-source operational time and a 3-minute fan-off time delay P2 providing a 32% efficiency improvement compared to the same unit with no time delay.

82—a curve representing laboratory test data of sensible EER and total power (kW) for 10 minutes of cool-source operational time and a 3-minute fan-off time delay P2 providing a 15% efficiency improvement compared to the same unit with no time delay.

84—a curve representing laboratory test data of sensible EER and total power (kW) for 15 minutes of cool-source operational time and a 4-minute fan-off time delay P2 providing a 10% efficiency improvement compared to the same unit with no time delay.

86—a curve representing laboratory test data of sensible EER and total power (kW) for 15 minutes of cool-source operational time P4 and a 8.5-minute fan-off time delay P2 providing a 6% efficiency improvement compared to the same unit with no time delay. The additional 4.5-minute fan-off time delay reduces the efficiency improvement by about 34% due to zero temperature split and sensible cooling delivered at the end of the fan-off time delay.

88—a curve representing laboratory test data of sensible EER and total power (kW) for 30 minutes of cool-source operational time P4 and a 4-minute fan-off time delay P2 providing a 5% efficiency improvement compared to the same unit with no time delay.

90—a curve representing a heat pump with reversing valve "O" energized throughout the cool source operational period of time P3 and the fan-off time delay period of time P2.

92—a curve representing the dry-bulb temperature split with the heat pump with reversing valve "O" energized throughout the cool source operational period of time P3 and the fan-off time delay period of time P2.

94—a curve representing the application energy efficiency ratio (EER*) with the heat pump with reversing valve "O" energized throughout the cool source operational period of time P3 and the fan-off time delay period of time P2.

96—a curve representing the application energy efficiency ratio (EER*) with the heat pump with reversing valve "O" de-energized throughout the cool source operational period of time P3 and the fan-off time delay period of time P2.

100—an HVAC system.

101—a control board on an HVAC system.

103—a combustion air inducer on an HVAC system with a gas furnace.

105—an igniter on an HVAC system with a gas furnace.

107—a gas valve an HVAC system with a gas furnace.

109—a burner on an HVAC system with a gas furnace.

111—a heat exchanger on an HVAC system including a gas furnace heat exchanger, electric resistance coil, or hydronic heating coil.

113—a pressure switch on an HVAC system with a gas furnace.

115—a gas manifold on an HVAC system with a gas furnace.

117—an AC or HP compressor.

119—an evaporator in cooling mode or a condenser on a heat pump in heating mode.

121—a condenser in cooling mode or an evaporator on a heat pump in heating mode.

123—a condenser fan.

125—an economizer.

126—a perimeter gap of the economizer frame where it connects to the HVAC system cabinet and this gap allows unintended and uncontrolled outdoor airflow to enter the economizer, HVAC system, and conditioned space whether or not the ventilation fan is operating.

200—a thermostat.
201—a thermostat or equipment control terminals.
202—a furnace heat-source control used to indicate a device that when energized, produces heating for the system.
203—an AC compressor control used to indicate a device that when energized produces cooling for the system when the system is a direct-expansion cooling system; In a heat pump, this device is energized in both heating and cooling. The heating or cooling mode is determined by the reversing valve 263, and 264.
204—a FAN "G" terminal of a thermostat energized when the system fan is ON or the thermostat calls for air conditioning.
205—a high-speed relay used to indicate a device that when energized connects 120 VAC to the high speed tap of the system fan/blower 206.
206—a system fan/blower used to indicate a multiple speed motor with a low, medium, and high fan speed tap or setting.
207—an AC compressor thermostat "Y" terminal of the thermostat energized when the thermostat calls for cooling.
208—a heat thermostat "W" terminal energized when the thermostat calls for heating.
209—a Hot thermostat "R" terminal connected to the Hot leg 210b of the 24 VAC system transformer 210.
210—a system transformer used to step down the input voltage of 120 VAC to the 24 VAC system voltage with a neutral leg 210a and a hot leg 210b.
210a—a neutral or common leg 210a of the system transformer 210.
210b—a Hot leg 210b of the system transformer 210.
211—an embodiment of the fan controller 211.
212—a fan controller output signal to activate the fan relay 205 and when energized turns on the system fan/blower 206 to high speed and when de-energized can either stop the system fan/blower 206 or return control of the system fan/blower 206 to the low-speed relay on the furnace fan controller 238.
213—a fan Controller input signal connected to the Hot leg 210b of the system transformer where this signal is actually the system ground signal for the fan controller 211.
214—a fan controller fan signal input used to detect the presence or absence of a low-voltage fan signal on a thermostat "G" terminal 204 to determine system type and cooling or heating mode of operation based on other fan controller inputs, allow measurement of an off-cycle time P11, and used as a proxy to measure cool-source operational time P4 or heat-source operational time P3 in order to calculate a fan-off time delay P2. The fan controller fan signal input 214 is active when the fan is on, or when the AC compressor is on, or for a heat pump when the thermostat is calling for heating or cooling based on the signal to the reversing valve. The fan controller fan signal input 214 can be used as a proxy for the compressor operation and therefore, be used to measure the duration of compressor cool-source operational time P4. For a heat pump system, the fan controller fan signal input 214 can be used to determine the duration of the cool-source operational time P4 or heat-source operational time P3 depending on the status of the signal to the reversing valve 216 and the HPD signal input 234.
215—an optional fan controller AC compressor input signal used to detect the presence or absence of a low-voltage fan signal on the AC thermostat "Y" terminal 207 to determine system type and cooling or heating mode of operation based on other fan controller inputs, allow measurement of an off-cycle time P11, and used as a proxy to measure cool-source operational time P4 or heat-source operational time P3 in order to calculate a fan-off time delay P2. The fan controller AC signal input 215 is active when the AC compressor is on, or for a heat pump when the thermostat is calling for heating or cooling based on the signal to the reversing valve. The fan controller fan signal input 215 can be used to measure the duration of compressor cool-source operational time P4. For a heat pump system, the fan controller fan signal input 215 can be used to determine the duration of the cool-source operational time P4 or heat-source operational time P3 depending on the status of the signal to the reversing valve 216 and the HPD signal input 234.
216—a fan controller heat-source or HP reversing valve signal input used to detect the presence or absence of a low-voltage heat signal on the thermostat "W" terminal 208 to determine system type and cooling or heating mode of operation based on other fan controller inputs, allow measurement of an off-cycle time P11, or to allow measurement of a cool-source operational time P4 or heat-source operational time P3 in order to calculate the fan-off time delay P2, or to detect the presence or absence of a low-voltage heat pump reversing valve signal on a thermostat "O" terminal (235) normally energized for cooling or a HP low-voltage reversing valve signal on the thermostat "BR" terminal (236) normally energized for heating.
217—a dashed line to indicate the disconnection of the FAN G terminal of the thermostat to the fan relay 205.
219—a fan controller 246 input signal from a building's occupancy sensor.
220—an economizer control used to control an economizer to provide minimum outdoor airflow into the HVAC system 100 and building conditioned space to meet minimum indoor air quality regulatory requirements and provide maximum outdoor airflow when the outdoor air temperature (or humidity and enthalpy conditions) are less than the economizer change over settings to cool the conditioned building space without direct-expansion compressor cooling.
221—a fan controller input signal from the system transformer neutral side.
222—a fan controller output signal to activate the reversing valve 263 or 264 to maintain the position of the reversing valve for the entire duration of HP compressor operational time and fan-off delay time to maximize sensible energy recovery from a heat pump.
223—a neutral side of the system transformer connected to other elements of the system.
224—a dashed line to indicate the disconnection of the reversing valve thermostat or equipment terminal 235 or 236 to the reversing valve 263 or 264.
225—an input to the economizer 220 that supplies power to the economizer through the system transformer 210 neutral leg 210A.
226—an input to the economizer 220 that supplies power to the economizer through the system transformer 210 hot leg 210B.
227—a dashed line used to indicate a broken connection between the thermostat 201 occupancy signal output 218 and the economizer 220 occupancy sensor input 245. The economizer 220 occupancy input 245 is connected to the fan controller 246 output 242.

228—an input to an economizer 220 from the thermostat terminal 207 which is activated if the thermostat calls for cooling.
229—an output from the economizer 220 which is energized when mechanical cooling is required for the building.
231—a fan controller 246 input signal which is activated by the economizer 220 output
233 when mechanical cooling is required to cool the building.
232—an actuator control used to close and open economizer dampers in the HVAC system
100 to provide minimum outdoor airflow into the HVAC system 100 and building conditioned space per indoor air quality regulatory requirements and provide maximum outdoor airflow when the outdoor air temperature and humidity conditions are less than the economizer change over settings to cool the conditioned building space without direct-expansion compressor cooling.
233—a fan controller line voltage input used to supply power to the system fan/blower 206 high-speed tap 15 through switching device 316.
234—a fan controller HPD signal input used by the fan controller to detect the presence or absence of a low-voltage signal from the system transformer hot 210b to determine whether or not a heat pump is connected. If the HPD signal input 234 is not connected to the system transformer hot 210b, then the fan controller determines it is connected to a gas, hydronic, or electric HVAC system 100 type in cooling or heating mode of operation depending on the low-voltage signals on other fan controller signal inputs. If the HPD signal input 234 is connected by a wire 265 to the system transformer hot 210b, then the fan controller HPD signal input 216 receives an unrectified low-voltage signal and determine it is connected to a heat pump HVAC system 100 with reversing valve "O" energized in cooling mode and de-energized in heating mode where the mode of cooling or heating operation is detected by the presence or absence of a low-voltage signal on fan controller input 216 based on a connection to the REV "O" thermostat terminal 235 (see waveform 350 in FIG. 11). If the HPD signal input 234 is connected to the system transformer hot 210b with a wire and a diode 275 in either polarity, then the fan controller HPD signal input 216 receives a rectified low-voltage signal and determine it is connected to a heat pump with reversing valve "BR" energized in heating mode where the mode of cooling or heating operation is detected by the presence or absence of a low-voltage signal on fan controller input 216 based on a connection to the REV "BR" thermostat terminal
236 (see waveform 351 and 352 in FIG. 11).
235—a heat pump REV "O" terminal of the thermostat energized for cooling and de-energized for heating.
236—a heat pump REV "BR" terminal of the thermostat de-energized for cooling and energized for heating.
237—an output from the economizer 220 which is energized there is a requirement for movement by the actuator controller 232.
238—a furnace fan controller for controlling a low-speed fan relay (239) by the Original Equipment Manufacturer (OEM) controller which includes more elements than the low-speed relay 239 and the high-speed relay 205.
239—a low-speed relay representing a relay used to connect 120 VAC from the line input to the low-speed tap of the multiple speed system fan/blower 206.
240—a hydronic heat-source control used to indicate a device that when energized, produces heating for the hydronic HVAC system 100 using a coil heat exchanger with hot water circulated through the coil from a water heating tank or boiler.
241—an electric resistance heat-source control used to indicate a device that when energized, produces heating for the electric resistance HVAC system 100.
242—a fan controller 246 output signal connected to the economizer 220 occupancy input 245.
243—a heat pump compressor control used to indicate a device that when energized, produces air conditioning cooling and heat pump heating for the heat pump HVAC system 100.
245—an input signal to the economizer 220 that is energized when the building is occupied.
246—an embodiment of the fan controller 246 when used with economizer systems.
247—a high-voltage output signal from the furnace fan controller 238 normally connected to the low-speed tap 11 of the system fan/blower 206.
252—an output from the fan controller 211 to the high-voltage low-speed tap 11 on the system fan/blower 206. This output is normally closed to the fan controller 211 high-voltage input 320 which comes from the furnace fan controller 238 and is used to operate the system fan/blower 206 are a low speed normally used for heating.
255—an optional connection to a temperature sensor T1.
256—an optional connection to a temperature sensor T2.
257—an optional connection to a temperature sensor T3.
258—an optional temperature sensor.
259—an optional temperature sensor.
260—an optional temperature sensor.
263—a reversing valve energized for cooling used to indicate a reversing valve on a heat pump system that is energized for cooling and de-energized for heating and referred to as an Orange ("O") reversing valve.
264—a reversing valve energized for heating used to indicate a reversing valve on a heat pump system that is energized for heating and de-energized for cooling and referred to as a Brown ("BR") reversing valve.
265—a connection between the system transformer hot 210b and the fan controller HPD signal input 234 when connected with a wire as shown in FIG. 3 where the fan controller signal input 216 is connected to the heat pump REV "O" thermostat terminal 235 energized for cooling and de-energized for heating.
267—a digital bus with digitized temperature information.
268—an analog to digital converter that is used to convert temperature sensor T1 258, T2
259, and T3 260 analog inputs into digital information for the microprocessor 304.
270—a DC rail voltage that powers the microprocessor and associated circuitry as well as charges a super capacitor 312 where the rail voltage can originate from the AC-DC converter, or the optional battery 306.
272—a signal from the zero crossing detector 302 to the microprocessor 304 indicating a transition on the 24 VAC signal either from a positive voltage to a negative voltage, or from a negative voltage to a positive voltage.
275—a diode used in the path between the system transformer hot 210b and the fan controller HPD signal input 234 where the system transformer Hot leg 210b provides a 24 VAC signal. In the preferred orientation, the diode 275 allows current flow in a positive cycle, and blocks current flow in a negative cycle (see waveform 351 in FIG. 11). The fan controller HPD signal input 234 is designed to accommodate the condition with the diode 275 reversed with current flowing in the negative cycle and blocked in the positive cycle (see waveform 352 in FIG. 11). If the diode were not in place as shown in FIG. 3, then the current into the fan controller HPD signal input 234 is allowed in both positive and negative cycles (see waveform 350 in FIG. 11). When this diode the connected in either orientation, the fan controller signal input 216 is defined as energized for heating and de-energized for cooling.

277—a dashed line used to indicate an optional connection between the thermostat AC "Y" terminal 207 and the fan controller AC signal input 215 where the low-voltage signal on the thermostat fan "G" terminal 204 is also active during cooling and can be used as a proxy for the low-voltage signal on the thermostat AC "Y" terminal 207.

277—a dashed line used to indicate a broken connection between high-voltage output from the furnace fan controller 238 and the high-voltage low-speed tap on the system fan/blower 206. The high-voltage signal from the furnace fan controller 238 is instead routed to the fan controller 211 high-voltage input signal 320.

290—a digital economizer control used to control an economizer to provide minimum outdoor airflow into the HVAC system 100 and building conditioned space to meet minimum indoor air quality regulatory requirements and provide maximum outdoor airflow when the outdoor air temperature (or humidity and enthalpy conditions) are less than the economizer change over settings to cool the conditioned building space without direct-expansion compressor cooling.

301—a switching device used to indicate a device which connects the fan controller Hot signal input 213 to the fan controller fan signal output 212 to activate the high-speed fan relay 205.

302—a zero crossing detector used to indicate a function that signals to the microprocessor that the 24 VAC input to the fan controller has changed from either a positive voltage to a negative voltage, or from a negative voltage to a positive voltage.

303—an AC-DC converter taking multiple AC inputs and rectifies one or all to create a DC voltage to power the fan controller.

304—a microprocessor with flash memory used to indicate a device that is programmable to carry out the various tasks to enable the fan controller device to function.

305—an optional user interface used to indicate a function that allows a user to interact with the microprocessor. This interaction can be as simple as DIP switches to configure parameters, a key pad and display, or a communication interface such as USB or a wireless communication.

306—an optional battery used to indicate an optional power source in the event the fan controller is unable to generate sufficient power from the input signals.

308—signal conditioning used to indicate a function that receives 24 VAC signals and conditions them to a level that can be safely read by the microprocessor 304.

309—a relay used to connect the thermostat fan "G" terminal 204 to the high-speed relay 205 which eliminates the dashed line 217 to provide a hard connection. The purpose of this switch is to provide a fail-safe connection in the event the fan controller fails so the HVAC system 100 operates as though the fan controller were not connected to the circuit.

312—indicates an optional super capacitor which can be charged from the AC-DC converter and used to power the fan controller until sufficient voltage can be generated again from the fan controller input signals.

314—a switching device used to indicate a device which connects the fan controller Hot signal input 213 to the reversing valve control output 222 to keep the reversing valve 263 or 264 in the its last state, heating or cooling for the duration of the fan-off time P3.

316—a switching device capable of high-voltage switching used to indicate a device which uses the normally open contacts 232 to switch a line voltage input signal 233 to the fan controller output 232 which connects to the system fan/blower 206 high-voltage high-speed tap 15. When activated, this switching device causes the system fan/blower 206 to operate at a high speed.

318—a switching device capable of high-voltage switching used to indicate a device which uses the normally closed contacts 252 to switch a line-voltage input signal 320 to the fan controller output 252 which connects to the system fan/blower 206 high-voltage low-speed tap 11. When not activated, and a high-voltage signal is present on fan controller 211 high-voltage input 320, this switching device causes the system fan/blower 206 to operate at a low speed.

319—a switching device used to indicate a device which connects the fan controller Hot signal input 213 to the fan controller fan signal output 242 to activate the occupancy input 224 to an economizer 220. This switching device could also connect to the hot input 226 in the event there was no occupancy sensor on the economizer 220.

320—a high-voltage input to the fan controller 211 that is normally closed to the high-voltage output 252 which connects to the high-voltage low-speed tap 11 on the system fan/blower 206 to drive the fan at a low speed during the P1 time of the heating cycle.

335—the normally closed output from switching device 316.

337—the normally open output from switching device 318.

350—a curve representing the signal received by HPD signal input 234 when connected by a wire 265 to system transformer Hot lead 210b.

351—a curve representing the signal received by HPD signal input 234 when a wire with a diode 275 are connected between HPD signal input 234 and the system transformer Hot leg 210b with the cathode pointing toward the fan controller 211.

352—a curve representing the signal received by HPD signal input 234 when a wire and a diode 275 are connected between HPD signal input 234 and the system transformer Hot leg 210b with the anode pointing toward the fan controller 211.

We claim:

1. A method for efficiently controlling either a heating ventilation fan or a cooling ventilation fan, the method comprising:
performing at least one action selected from the group consisting of:
energizing either a heat source in a heater in a heating mode or energizing a cool source in an air conditioner in a cooling mode,
energizing a heating ventilation fan at the same time the heat source is first energized,
energizing the heating ventilation fan after waiting for a first time period P1 after the heat source is first energized,
energizing a cooling ventilation fan at the same time the cool source is first energized,
energizing the cooling ventilation fan after waiting for a first time period P1 after the cool source is first energized, and energizing an economizer to enable the economizer to position the economizer dampers;
monitoring and storing at least one parameter selected from the group consisting of:
a heat-source operational time P3,
a cool-source operational time P4, and
a computed rate of change of the thermostat temperature with respect to time;
waiting until either the heat source has been de-energized or the cool source has been de-energized;
determining a variable fan-off time delay period P2 based on the HVAC system mode of operation and at least one parameter selected from the group consisting of:
a length of the heat-source operational time P3,
a length of the cool-source operational time P4, and
the rate of change of the thermostat temperature with respect to time;
performing at least one action at an end of the heat-source operational time P3 or the cool-source operational time P4, selected from the group consisting of:
energizing a fan relay to continue energizing the heating ventilation fan or the cooling ventilation fan for the variable fan-off time delay period P2,
energizing an economizer to enable the economizer to position the economizer dampers, and
de-energizing an economizer to enable the economizer to close the economizer dampers;
performing at least one action at the end of the variable fan-off time delay P2 selected from the group consisting of:
de-energizing the fan relay, and
de-energizing an economizer to enable the economizer to close the economizer dampers.

2. The method of claim 1, wherein the fan relay is normally controlled by a thermostat "G" terminal, and operating in the heating mode or the cooling mode, the method further including:
waiting the first time period P1 selected from the group consisting of:
a time period when the heat source is first energized,
a time period after the heat source is first energized,
a time period between when the heat source is first energized and the heat-source operational time P3,
the heat-source operational time P3,
a time period when the cool source is first energized,
a time period after the cool source is first energized,
a time period between when the cool source is first energized and the cool-source operational time P4, and
the cool-source operational time P4;
energizing the fan relay at the end of the first time period P1, wherein the heating ventilation fan or the cooling ventilation fan is set to a speed selected from the group consisting of:
a default heater fan speed,
a default cooling fan speed,
a fan speed controlled by the thermostat "G" terminal, and
a fan speed normally used for cooling.

3. The method of claim 1, wherein the fan relay is a high-voltage relay element of a fan controller connected to a high-speed tap on a fan/blower motor to operate the fan/blower at a high speed, and operating in the heating mode, the method further including:
waiting the first time period P1 selected from the group consisting of:
a time period when the heat source is first energized,
a time period after the heat source is first energized,
a time period between when the heat source is first energized and the heat-source operational time P3,
the heat-source operational time P3,
a time period when the cool source is first energized,
a time period after the cool source is first energized,
a time period between when the cool source is first energized and the cool-source operational time P4, and
the cool-source operational time P4;
energizing the high-voltage relay at the end of the first time period P1.

4. The method of claim 1, further including automatically determining the HVAC system type and the HVAC mode of operation during heating or cooling, comprising:
automatically determining the HVAC system type based on a combination of signals present or absent on the thermostat or equipment terminals, wherein the HVAC system type is determined from the group consisting of:
a gas furnace heating and direct expansion cooling system with or without an economizer,
a heat pump heating and cooling system with or without an economizer,
a hydronic heating and direct expansion cooling system with or without an economizer,
an electric heating and direct expansion cooling system with or without an economizer,
a gas furnace heating system with no cooling system,
a heat pump heating system with no cooling system,
a hydronic heating system with no cooling system, and
an electric heating system with no cooling system; and
automatically determining the HVAC mode of operation during heating or cooling based on a combination of signals present or absent on the thermostat or equipment terminals, wherein the HVAC mode of operation is determined from the group consisting of:
a thermostat call for heating,
a thermostat call for cooling,
a gas furnace heating mode,
a heat pump heating mode,
a hydronic heating mode,
an electric resistance heating mode, and
a direct expansion cooling mode.

5. The method of claim 1, wherein, while in the heating mode and the heat source is de-energized or the cooling mode and the cool source is de-energized, monitoring and storing at least two thermostat temperatures and two coincident times used to compute the computed rate of change of the thermostat temperature with respect to time and computing a rate of change of the thermostat temperature with respect to time, and determining the variable fan-off time delay period P2 based on the computed rate of change of the thermostat temperature with respect to time.

6. The method of claim 1, wherein energizing a fan relay to continue energizing the heating ventilation fan or cooling ventilation fan comprises energizing the fan relay not immediately previously energized to maintain the fan speed.

7. The method of claim 1, wherein monitoring and storing at least one parameter further comprises monitoring and storing at least two thermostat temperatures and two coincident times used to compute and store the computed rate of change of the thermostat temperature with respect to time, during a period selected from the group consisting of:

the heat-source operational time P3,
the cool-source operational time P4,
the fan-off delay time period P2, and
an off-cycle time duration P11.

8. The method of claim 1, wherein determining the variable fan-off time delay period P2 comprises selecting the variable fan-off time delay period P2 from a table including at least two different values for both the heat-source operational time P3 and cool-operational time P4 and different values for P2 corresponding to the value of the heat-source operational time P3 and the cool-operational time P4 providing different lengths of time of the variable fan-off time delay period P2 based on the length of the heat-source operational time P3 and the cool-operational time P4.

9. A method for efficiently controlling either a heating ventilation fan or a cooling ventilation fan, the method comprising:
  performing at least one action selected from the group consisting of:
    energizing either a heat source in a heater in a heating mode or energizing a cool source in an air conditioner in a cooling mode,
    energizing a heating ventilation fan at the same time the heat source is first energized,
    energizing the heating ventilation fan after waiting for a first time period P1 after the heat source is first energized,
    energizing a cooling ventilation fan at the same time the cool source is first energized,
    energizing the cooling ventilation fan after waiting for a first time period P1 after the cool source is first energized, and
    energizing an economizer to enable the economizer to position the economizer dampers;
  monitoring at least one parameter selected from the group consisting of:
    an HVAC system type with or without an economizer,
    an HVAC system mode of operation,
    a heat-source operational time P3,
    a cool-source operational time P4,
    heating system parameters,
    cooling system parameters, and
    HVAC system parameters;
  waiting until either the heat source has been de-energized or the cool source has been de-energized;
  calculating the fan-off time delay period P2 based on at least one parameter selected from the group consisting of:
    the HVAC system type with or without an economizer,
    the HVAC system mode of operation,
    the heat-source operational time P3,
    the cool-source operational time P4,
    heating system parameters,
    cooling system parameters, and
    HVAC system parameters;
  for the heat source including a heat pump operating in the heating mode or the cool source including a heat pump operating in the cooling mode, the method further comprises:
    interrupting and supplying an alternative heat pump reversing valve signal from the thermostat or equipment terminals to the heat pump reversing valve;
    setting the heat pump reversing valve signal to de-energized for a heat pump where the reversing valve is normally de-energized for heating throughout the heat pump heat-source operational time P3 plus the fan-off time delay P2;
    setting the heat pump reversing valve signal to energized for a heat pump where the reversing valve is normally energized for heating throughout the heat pump heat-source operational time P3 plus fan-off time delay P2;
    setting the heat pump reversing valve signal to either energized for a heat pump where the reversing valve is normally energized for cooling throughout the heat pump cool-source operational time P4 plus fan-off time delay P2;
    setting the heat pump reversing valve signal to de-energized for a heat pump where the reversing valve is normally de-energized for cooling throughout the heat pump cool-source operational time P4 plus fan-off time delay P2;
  performing at least one action at an end of the heat-source operational time P3 or the cool-source operational time P4, selected from the group consisting of:
    energizing a fan relay to continue energizing the heating ventilation fan or the cooling ventilation fan for the variable fan-off time delay period P2,
    energizing an economizer to enable the economizer to position the economizer dampers, and
    de-energizing an economizer to enable the economizer to close the economizer dampers;
  performing at least one action at the end of the variable fan-off time delay P2 selected from the group consisting of:
    de-energizing the fan relay, and
    de-energizing an economizer to enable the economizer to close the economizer dampers.

10. A method for efficiently controlling either a heating ventilation fan or a cooling ventilation fan, the method comprising:
  performing at least one action selected from the group consisting of:
    energizing either a heat source in a heater in a heating mode or energizing a cool source in an air conditioner in a cooling mode,
    energizing a heating ventilation fan at the same time the heat source is first energized,
    energizing the heating ventilation fan after waiting for a first time period P1 after the heat source is first energized,
    energizing a cooling ventilation fan at the same time the cool source is first energized,
    energizing the cooling ventilation fan after waiting for a first time period P1 after the cool source is first energized, and
    energizing an economizer to enable the economizer to position the economizer dampers;
  monitoring at least one parameter selected from the group consisting of:
    an HVAC system type with or without an economizer,
    an HVAC system mode of operation,
    a heat-source operational time P3,
    a cool-source operational time P4,
    heating system parameters,
    cooling system parameters, and
    HVAC system parameters;
  waiting until either the heat source has been de-energized or the cool source has been de-energized;
  calculating a fan-off time delay period P2 based on at least one parameter selected from the group consisting of:
    the HVAC system type with or without an economizer,
    the HVAC system mode of operation,
    the heat-source operational time P3, the cool-source operational time P4,
heating system parameters,
cooling system parameters, and
HVAC system parameters;
performing at least one action at an end of the heat-source operational time P3 or the cool-source operational time P4, selected from the group consisting of:
energizing a fan relay to continue energizing the heating ventilation fan or the cooling ventilation fan for the fan-off time delay period P2,
energizing an economizer to enable the economizer to position the economizer dampers, and
de-energizing an economizer to enable the economizer to close the economizer dampers;
wherein for HVAC systems with an economizer energizing an economizer to enable the economizer to position the economizer dampers, comprises energizing the economizer to enable the economizer to position the economizer dampers to at least one position selected from the group consisting of:
a minimum position to a fully open position any time the HVAC system is cooling with only the economizer,
the minimum position to the fully open position any time the HVAC system is cooling with the economizer plus direct-expansion cooling,
a minimum position during the heat-source operational time P3 or the cool-source operational time P4,
a minimum position during the fan-off time delay P2,
a closed position during the fan-off time delay period P2, and
a closed position during the heating or cooling off cycle.

11. The method of claim 10, when a perimeter gap of an economizer frame is present between the economizer frame and a system cabinet, the method further including;
sealing the perimeter gap using a material selected from the group consisting of:
adhesive tape sealant, adhesive sealant, mastic sealant, or weatherstripping;
the material residing around the entire economizer perimeter gap including the metal surfaces on either side of the economizer perimeter gap wherein decreasing unintended, uncontrolled and unconditioned outdoor air leakage through the economizer perimeter gap to reduce heating or cooling loads in the conditioned space or increase heating or cooling capacity delivered to the conditioned space during at least one period of time selected from the group consisting of:
the heat-source operational time P3,
the cool-source operational time P4,
the fan-off time delay P2 in heating mode, the fan-off time delay P2 in cooling mode, the off-cycle, and
a fan-only operation.

12. The method of claim 10, wherein calculating the fan-off time delay period P2 based on HVAC system parameters comprises calculating a fan-off time delay period P2 based on the rate of change of the thermostat temperature with respect to time.

13. A method for efficiently controlling either a heating ventilation fan or a cooling ventilation fan, the method comprising:
performing at least one action selected from the group consisting of:
energizing either a heat source in a heater in a heating mode or energizing a cool source in an air conditioner in a cooling mode,
energizing a heating ventilation fan at the same time the heat source is first energized,
energizing the heating ventilation fan after waiting for a first time period P1 after the heat source is first energized,
energizing a cooling ventilation fan at the same time the cool source is first energized,
energizing the cooling ventilation fan after waiting for a first time period P1 after the cool source is first energized, and
energizing an economizer to enable the economizer to position the economizer dampers;
monitoring at least one parameter selected from the group consisting of a heat-source operational time P3 and a cool-source operational time P4,
waiting until either the heat source has been de-energized or the cool source has been de-energized;
while operating in heating mode and at the end of the heat-source operational time P3, calculating the fan-off time delay period P2 based on heat source operational time P3, or while operating in cooling mode and at the end of the cool-source operational time P4, calculating the fan-off time delay period P2 based on the cool source operating time P4;
performing at least one action at an end of the heat-source operational time P3 or the cool-source operational time P4, selected from the group consisting of:
energizing a fan relay to continue energizing the heating ventilation fan or the cooling ventilation fan for the fan-off time delay period P2,
energizing an economizer to enable the economizer to position the economizer dampers, and
de-energizing an economizer to enable the economizer to close the economizer dampers.

14. A method for efficiently controlling either a heating ventilation fan or a cooling ventilation fan, the method comprising:
performing at least one action selected from the group consisting of:
energizing either a heat source in a heater in a heating mode or energizing a cool source in an air conditioner in a cooling mode,
energizing a heating ventilation fan at the same time the heat source is first energized,
energizing the heating ventilation fan after waiting for a first time period P1 after the heat source is first energized,
energizing a cooling ventilation fan at the same time the cool source is first energized,
energizing the cooling ventilation fan after waiting for a first time period P1 after the cool source is first energized, and
energizing an economizer to enable the economizer to position the economizer dampers;
monitoring at least one parameter selected from the group consisting of:
an HVAC system type with or without an economizer,
an HVAC system mode of operation,
a heat-source operational time P3,
a cool-source operational time P4,
heating system parameters,
cooling system parameters, and
HVAC system parameters;
waiting until either the heat source has been de-energized or the cool source has been de-energized;
calculating a fan-off time delay period P2 based on at least one parameter selected from the group consisting of:
the HVAC system type with or without an economizer,
the HVAC system mode of operation, the heat-source operational time P3,
the cool-source operational time P4,
heating system parameters,
cooling system parameters, and
HVAC system parameters;
performing at least one action at an end of the heat-source operational time P3 or the cool-source operational time P4, selected from the group consisting of:
energizing a fan relay to continue energizing the heating ventilation fan or the cooling ventilation fan for the fan-off time delay period P2 to increase fan speed,
energizing an economizer to enable the economizer to position the economizer dampers, and
de-energizing an economizer to enable the economizer to close the economizer dampers.

15. A method for sealing an economizer perimeter gap for a Heating, Ventilating, Air Conditioning (HVAC) system with an economizer when a perimeter gap of an economizer frame is present between the economizer frame and a system cabinet, the method comprising:
disconnecting electrical power to the HVAC unit,
locating the economizer perimeter gap between the economizer frame and the system cabinet, where the economizer perimeter gap is generally provided to facilitate easy installation and removal of the economizer from the HVAC system and generally left unsealed to facilitate easy removal and replacement of the economizer, wherein the economizer perimeter gap allows outdoor air to be unintentionally drawn into the HVAC system by a heating or cooling ventilation fan and where the unintended outdoor airflow mixes with a return airflow causing increased heating and cooling loads when the economizer dampers are closed or in a minimum economizer damper position to provide a minimum outdoor airflow to meet a minimum indoor air quality recommendation;
cleaning a metal surface on both sides of the economizer perimeter gap specifically between the economizer frame and the system cabinet prior to sealing the economizer perimeter gap between the economizer frame and the system cabinet;
applying a material over or into the economizer perimeter gap between the economizer frame and the system cabinet to reduce unintended outdoor airflow and mixing of the outdoor airflow drawn through the economizer perimeter gap by the heating or cooling ventilation fan with the return airflow, the material selected from the group consisting of:
adhesive tape sealant, adhesive sealant, mastic sealant, and weatherstripping; and
reconnecting electrical power to the HVAC unit.

16. A fan controller configured to control either a heating ventilation fan or a cooling ventilation fan, the fan controller comprising:
a microprocessor (304),
a low-voltage DC power source electrically connected to the microprocessor (304), the DC power source selected from the group consisting of:
a low-voltage battery (306),
an AC-DC converter (303), and
a super capacitor (312);
electrical inputs configured to receive electrical signals from an Heating, Ventilation, Air Conditioning (HVAC) thermostat or equipment control terminals (201), with at least one electrical input selected from the group consisting of:
a fan signal input (214),
a heat source or reversing valve signal input (216),
a cool source signal input (215),
a heat pump detection (HPD) signal input (234),
a temperature sensor input (255),
an economizer compressor control signal input (231),
an occupancy sensor signal input (219),
a low-voltage common input (221) configured to receive the neutral signal from the system transformer, and
a low-voltage hot input (213) configured to receive the hot signal from the system transformer;
at least one switching device selected from the group consisting of:
a first switching device (301) configured to receive a low-voltage control signal from the microprocessor to switch a signal selected from the group consisting of:
a low-voltage signal, and
a high-voltage signal;
a second switching device (314) configured to receive a low-voltage control signal from the microprocessor to switch the signal selected from the group consisting of:
the low-voltage signal, and
the high-voltage signal; and
a third switching device (319) configured to receive a low-voltage control signal from the microprocessor to switch the signal selected from the group consisting of:
the low-voltage signal, and
the a high-voltage signal;
at least one electrical output selected from the group consisting of:
a fan controller signal output (212) from the first switching device (301) configured to electrically connect to a fan relay (205) to control a system fan/blower (206) to the fan speed normally controlled by a thermostat "G" terminal,
a fan controller signal output (232) from a fourth switching device (316) configured to electrically connect to a system fan/blower (206) high speed tap (15),
a fan controller signal output (222) from the second switching device (314) configured to electrically connect to a heat pump reversing valve signal input (263) to provide a signal selected from the group consisting of:
a floating signal to de-energize a heat pump reversing valve (263), and
a low-voltage signal to energize a heat pump reversing valve (263), and
a fan controller signal output (242) from the third switching device (319) configured to electrically connect to an economizer controller.

17. The fan controller of claim 16, wherein the fan controller is configured to:
detect that the heat source is energized or the cool source is energized based on at least one value selected from the group consisting of:
signals present on the thermostat or equipment terminals,
a thermostat temperature below a heating setpoint, and
a thermostat temperature above a cooling setpoint;

wait a first time period P1 selected from the group consisting of:
 a time period when the heat source is first energized,
 a time period after the heat source is first energized,
 a time period between when the heat source is first energized and a heat-source operational time P3,
 the heat-source operational time P3,
 a time period when the cool source is first energized,
 a time period after the cool source is first energized,
 a time period between when the cool source is first energized and a cool-source operational time P4, and
 the cool-source operational time P4;
after the first time period P1, energize either the heating ventilation fan or the cooling ventilation fan to a speed selected from the group consisting of:
 a default fan speed,
 a fan speed controlled by a system fan relay, and
 a fan speed higher than the default fan speed;
for a system with an economizer, energize the economizer to enable the economizer to position the economizer dampers to at least one position selected from the group consisting of:
 a minimum position,
 a fully open position,
 a closed position, and
 a position in between the closed position and the fully open position;
monitor and store at least one parameter selected from the group consisting of:
 a Heating, Ventilating, Air Conditioning (HVAC) system type with or without an economizer,
 an HVAC system mode or operation,
 the heat-source operational time P3,
 the cool-source operational time P4, and
 HVAC system parameters;
wait until the heat source or cool source has been de-energized;
for a system with an economizer, energize the economizer to enable the economizer to position the economizer dampers to at least one position selected from the group consisting of:
 the minimum position,
 the fully open position,
 the closed position, and
 the position in between the closed position and the fully open position;
calculate a fan-off time delay period P2 based on at least one value selected from the group consisting of:
 the HVAC system type with or without an economizer,
 the HVAC system mode or operation,
 the heat-source operational time P3,
 the cool-source operational time P4, and
 HVAC system parameters;
energize the fan relay to continue energize the HVAC fan for the fan-off time delay period P2;
for a system with an economizer, energize the economizer to enable the economizer to position the economizer dampers to at least one position selected from the group consisting of:
 the minimum position,
 the fully open position,
 the closed position, and
 the position in between the closed position and the fully open position;

de-energize the fan relay after the fan-off time delay period P2 has expired; and
for a system with an economizer, close the economizer dampers.

18. The fan controller of claim 17, wherein the fan controller is configured to monitor and store HVAC system parameters where at least one parameter is selected from the group consisting of:
 an Outdoor Air Temperature (OAT),
 a Mixed Air Temperature (MAT) entering a heat exchanger,
 a Supply Air Temperature (SAT) leaving the heat exchanger,
 a Temperature Rise (TR) across the heat exchanger defined as the SAT leaving the heat exchanger minus the MAT entering a heat exchanger,
 a rate of change of the TR with respect to time (dTR/dt),
 the MAT entering an evaporator,
 a SAT leaving the evaporator,
 a Temperature Split (TS) across the evaporator defined as the MAT entering the evaporator minus the SAT leaving the evaporator,
 a rate of change of the TS with respect to time (dTS/dt),
 a thermostat temperature (TT),
 a rate of change of the TT with respect to time (dT/dt),
 an off-cycle Thermostat Temperature (TT-off),
 a rate of change of the TT-off with respect to time (dT/dt-off), and
 a Hydronic Hot Water Supply Temperature (HHWST).

19. The fan controller of claim 17, wherein the fan controller is configured to:
 calculate the fan-off time delay period P2 in heating mode based on HVAC system parameters wherein at least one parameter is selected from the group consisting of:
  the HVAC system type with or without an economizer,
  the HVAC mode of operation, the heat-source operational time P3,
  an Outdoor Air Temperature (OAT),
  a Temperature Rise (TR) across the heat exchanger defined as a Supply Air Temperature (SAT) leaving the heat exchanger minus a Mixed Air Temperature (MAT) entering the heat exchanger,
  a rate of change of the TR with respect to time (dTR/dt),
  a Thermostat Temperature (TT),
  a rate of change of the TT with respect to time (dT/dt),
  an off-cycle thermostat temperature (TT-off), and
  a rate of change of the off-cycle TT with respect to time (dT/dt-off), and
  a Hydronic Hot Water Supply Temperature; and
 calculate the fan-off time delay period P2 in cooling mode based on HVAC system parameters comprises calculating a fan-off time delay period P2 based on HVAC system parameters wherein at least one parameter is selected from the group consisting of:
  the HVAC system type with or without an economizer,
  the HVAC mode of operation,
  the cool-source operational time P4,
  the OAT,
  a Temperature Split (TS) across the evaporator defined as the MAT entering the evaporator minus the SAT leaving the evaporator,
  a rate of change of the TS with respect to time (dTS/dt),
  the TT,
  the dT/dt,
  the TT-off, and
  the dT/dt-off.

20. The fan controller of claim 17, wherein, while either the heat source or the cool source are de-energized, the fan controller is configured to monitor at least one value selected from the group consisting of:
   an off-cycle thermostat temperature (TT-off), and
   a rate of change of the off-cycle TT with respect to time (dT/dt-off).

21. The fan controller of claim 17, wherein the fan controller is configured to:
   determine the HVAC system type based on a combination of signals present or absent on the thermostat or equipment terminals, from at least one system type selected from the group consisting of:
      a gas furnace heating and direct expansion cooling system with or without an economizer,
      a heat pump heating and cooling system with or without an economizer,
      a hydronic heating and direct expansion cooling system with or without an economizer,
      an electric heating and direct expansion cooling system with or without an economizer,
      a gas furnace heating system with no cooling system,
      a heat pump heating system with no cooling system,
      a hydronic heating system with no cooling system, and
      an electric heating system with no cooling system; and
   determine an HVAC mode of operation based on a combination of signals present or absent on the thermostat or equipment terminals, from at least one mode of operation selected from the group consisting of:
      a thermostat call for heating,
      a thermostat call for cooling,
      a gas furnace heating mode,
      a heat pump heating mode,
      a hydronic heating mode,
      an electric resistance heating mode, and
      a direct expansion cooling mode.

22. The fan controller of claim 17, wherein the fan controller is configured to determine the HVAC system type based on user selected inputs.

23. The fan controller of claim 17, for the heat source including a heat pump operating in the heating mode or the cool source including a heat pump operating in the cooling mode, the fan controller configured to:
   interrupt and supply an alternative heat pump reversing valve signal from the thermostat or equipment terminals to the heat pump reversing valve;
   set the heat pump reversing valve signal to de-energized for a heat pump where the reversing valve is normally de-energized for heating throughout the heat pump heat-source operational time P3 plus fan-off time delay P2,
   set the heat pump reversing valve signal to energized for a heat pump where the reversing valve is normally energized for heating throughout the heat pump heat-source operational time P3 plus fan-off time delay P2,
   set the heat pump reversing valve signal to either energized for a heat pump where the reversing valve is normally energized for cooling throughout the heat pump cool-source operational time P4 plus fan-off time delay P2, and
   set the heat pump reversing valve signal to de-energized for a heat pump where the reversing valve is normally de-energized for cooling throughout the heat pump cool-source operational time P4 plus fan-off time delay P2.

24. The fan controller of claim 17, wherein the fan controller is configured to energize the economizer to enable the economizer to position the economizer dampers to at least one position selected from the group consisting of:
   a minimum position to a fully open position any time the HVAC system is cooling with only the economizer,
   the minimum position to the fully open position any time the HVAC system is cooling with the economizer plus direct-expansion cooling,
   a minimum position during the heat-source operational time P3 or the cool-source operational time P4,
   a minimum position during the fan-off time delay P2,
   a closed position during the fan-off time delay period P2, and
   a closed position during the heating or cooling off cycle.

25. The fan controller of claim 17, for the HVAC system type with an economizer and a perimeter gap of an economizer frame is present between the economizer frame and a system cabinet, and the perimeter gap is sealed with at least one material selected from the group consisting of:
   adhesive tape sealant, adhesive sealant, mastic sealant, and weatherstripping;
   the material residing around the entire economizer perimeter gap including the metal surfaces on either side of the economizer perimeter gap wherein decreasing unintended, uncontrolled and unconditioned outdoor air leakage through the economizer perimeter gap reduces heating or cooling loads in the conditioned space or increase heating capacity or cooling capacity delivered to the conditioned space during at least one time period selected from the group consisting of:
      the heat-source operational time P3,
      the cool-source operational time P4,
      the fan-off time delay P2,
      the off-cycle, and
      a period of fan-only operation.

26. A method for performing a fan-only Fault Detection Diagnostic (FDD) procedure for a Heating, Ventilating, Air Conditioning (HVAC) fan control having AUTO and ON settings and correcting the fan-only fault by de-energizing a fan relay to override the ON setting and turn off the HVAC fan control when it is accidentally turned to the ON setting, the method comprising:
   monitoring signals present or absent on a thermostat or an equipment terminals to determine if the HVAC fan control has been accidentally set to the ON setting which results in continuous fan operation;
   detecting the presence of a fan-only operation based on the presence of a fan signal and the absence of a heating signal or a cooling signal on the thermostat or equipment terminals or the presence of the HVAC fan control ON setting without a thermostat call for heating or a thermostat call for cooling;
   if the fan-only operation continues until a Threshold Fan-only Time (TFT), then performing at least one action selected from the group consisting of:
      de-energizing the fan relay to override the ON setting and turn off the HVAC fan,
      de-energizing the economizer for an HVAC system with an economizer, and
      monitoring the HVAC system parameters during the off cycle;
   if the HVAC fan control turns off prior to reaching the TFT, then performing at least one action selected from the group consisting of:
      de-energizing the fan relay and turning off the HVAC fan,
      de-energizing the economizer for an HVAC system with an economizer, and monitoring the HVAC system parameters during the off cycle;
if the heating signal or the cooling signal are detected or the thermostat call for heating or the thermostat call for cooling are detected during what was previously the fan-only operation and prior to reaching the TFT, then performing at least one action selected from the group consisting of:
energizing the fan relay to continue energizing the HVAC fan,
energizing the economizer for an HVAC system with an economizer,
monitoring the HVAC system parameters,
waiting for the completion of either the heat-source operational time P3 or the cool-source operational time P4 while continuing to energize the HVAC fan,
upon completion of either the heat-source operational time P3 or the cool-source operational time P4, performing at least one action selected from the group consisting of:
calculating a fan-off time delay P2,
energizing the fan relay to continue energizing the HVAC fan for the fan-off time delay P2,
waiting for the completion of the fan-off time delay P2,
de-energizing the fan relay to turn off the HVAC fan at the end of the fan-off time delay P2, and
de-energizing the economizer for an HVAC system with an economizer to enable the economizer to position the economizer dampers to a closed position.

27. The method of claim 26, wherein monitoring the HVAC system parameters includes monitoring at least one parameter selected from the group consisting of:
an HVAC system type with or without an economizer,
an HVAC mode of operation,
the heat-source operational time P3,
the cool-source operational time P4,
the occupancy sensor signal input,
an Outdoor Air Temperature (OAT),
a Mixed Air Temperature (MAT) entering the heat exchanger,
a Supply Air Temperature (SAT) leaving the heat exchanger,
a Temperature Rise (TR) across the heat exchanger defined as the SAT leaving the heat exchanger minus the MAT entering the heat exchanger,
a rate of change of the TR with respect to time (dTR/dt),
the MAT entering the evaporator,
the SAT leaving the evaporator,
a Temperature Split (TS) across the evaporator defined as the MAT entering the evaporator minus the SAT leaving the evaporator,
a rate of change of the TS with respect to time (dTS/dt),
a Thermostat Temperature (TT),
a rate of change of the TT with respect to time (dT/dt),
a Hydronic Hot Water Supply Temperature,
an off-cycle thermostat temperature (TT-off), and
a rate of change of the off-cycle TT with respect to time (dT/dt-off).

28. The method of claim 26, wherein calculating the fan-off time delay period P2 comprises:
calculating the fan-off time delay period P2 in heating mode based on at least one value selected from the group consisting of:
the HVAC system type with or without an economizer,
the HVAC mode of operation,
the heat-source operational time P3,
an Outdoor Air Temperature (OAT),
a Temperature Rise (TR) across the heat exchanger defined as a Supply Air Temperature (SAT) leaving the heat exchange minus a Mixed Air Temperature (MAT) entering the heat exchanger,
a rate of change of the TR with respect to time (dTR/dt),
a Thermostat Temperature (TT),
a rate of change of the TT with respect to time (dT/dt),
an off-cycle thermostat temperature (TT-off), and
a rate of change of the off-cycle TT with respect to time (dT/dt-off), and
a Hydronic Hot Water Supply Temperature;
calculating the fan-off time delay period P2 in cooling mode comprises calculating a fan-off time delay period P2 based on at least one value selected from the group consisting of:
the HVAC system type with or without an economizer,
the HVAC mode of operation,
the cool-source operational time P4,
the OAT,
a Temperature Split (TS) across the evaporator defined as the MAT entering the evaporator minus the SAT leaving the evaporator,
a rate of change of the TS with respect to time (dTS/dt),
the TT,
the dT/dt,
the TT-off, and
the dT/dt-off.

29. The method of claim 26, wherein energizing the economizer for an HVAC system with an economizer, comprises energizing the economizer to enable the economizer to position the economizer dampers to at least one position selected from the group consisting of:
a minimum position to a fully open position any time the HVAC system is cooling with only the economizer,
the minimum position to the fully open position any time the HVAC system is cooling with the economizer plus direct-expansion cooling,
a minimum position during the heat-source operational time P3 or the cool-source
operational time P4,
a minimum position during the fan-off time delay P2,
a closed position during the fan-off time delay period P2, and
a closed position during the heating or cooling off cycle.

30. The method of claim 26, for an HVAC system wherein the fan controller Threshold Fan-only Time (TFT) is at least one time selected from the group consisting of:
10 minutes,
adjustable based on occupancy sensor signals,
adjustable based on the OAT,
adjustable based on the TS,
adjustable based on the TR, and
adjustable based on an indoor air quality requirement, and
adjustable based on user input.

* * * * *